US012099708B2

(12) United States Patent
Chung et al.

(10) Patent No.: US 12,099,708 B2
(45) Date of Patent: Sep. 24, 2024

(54) ELECTRONIC DEVICE COMPRISING FLEXIBLE DISPLAY MODULE AND METHOD FOR OPERATING SAME

(71) Applicant: SAMSUNG ELECTRONICS CO., LTD., Suwon-si (KR)

(72) Inventors: Jinkyo Chung, Suwon-si (KR); Younghak Oh, Suwon-si (KR); Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/102,919

(22) Filed: Jan. 30, 2023

(65) Prior Publication Data

US 2023/0176721 A1 Jun. 8, 2023

Related U.S. Application Data

(63) Continuation of application No. PCT/KR2021/010008, filed on Jul. 30, 2021.

(30) Foreign Application Priority Data

Jul. 30, 2020 (KR) ........................ 10-2020-0095574

(51) Int. Cl.
*G06F 3/04845* (2022.01)
*G06F 1/16* (2006.01)
(Continued)

(52) U.S. Cl.
CPC ........ *G06F 3/04845* (2013.01); *G06F 1/1616* (2013.01); *G06F 1/1652* (2013.01);
(Continued)

(58) Field of Classification Search
CPC ............ G06F 3/04845; G06F 3/04817; G06F 3/0488; G06F 1/1616; G06F 1/1652; G06F 1/1681
(Continued)

(56) References Cited

U.S. PATENT DOCUMENTS 10,592,051 B1 * 3/2020 Yildiz .................. G06F 1/1694
2010/0064244 A1 * 3/2010 Kilpatrick, II ...... H04M 1/0243
345/1.3
(Continued)

FOREIGN PATENT DOCUMENTS

KR 10-2004-0083178 10/2004
KR 10-2011-0092865 8/2011
(Continued)

OTHER PUBLICATIONS

International Search Report for PCT/KR2021/010008 mailed Nov. 5, 2021, 6 pages.
(Continued)

*Primary Examiner* — Kwin Xie
(74) *Attorney, Agent, or Firm* — Nixon & Vanderhye P.C.

(57) ABSTRACT

An electronic device may include: a foldable housing including at least one hinge structure; a flexible display module of which at least a partial area is exposed through the foldable housing; and at least one processor provided inside the foldable housing. The display module may include: a plurality of areas; and at least one foldable area which is disposed between at least the plurality of areas so as to correspond to the at least one hinge structure and can be folded according to the state of the at least one hinge structure. The at least one processor may be configured to: when the state of the at least one hinge structure is a first state, display a first execution screen of a first application on the display module, wherein in the first state, a first foldable
(Continued)

area of the at least one foldable area is in a folded state; while the first foldable area of the at least one foldable area is in the folded state, detect a touch and drag input into the first foldable area from an object included in the first execution screen; and after detecting the touch and drag input, on the basis of the state of the at least one hinge structure changing from the first state to a second state, display, on the display module, a second execution screen of a second application which is obtained by using at least a part of the object and is different from the first application.

17 Claims, 44 Drawing Sheets

(51) Int. Cl.
  *G06F 3/04817* (2022.01)
  *G06F 3/0488* (2022.01)
(52) U.S. Cl.
  CPC ........ *G06F 1/1681* (2013.01); *G06F 3/04817* (2013.01); *G06F 3/0488* (2013.01)
(58) Field of Classification Search
  USPC .................................................. 345/173–174
  See application file for complete search history.

(56) References Cited

U.S. PATENT DOCUMENTS

| | | | |
|---|---|---|---|
| 2011/0072344 A1 | 3/2011 | Harris et al. | |
| 2011/0197155 A1 | 8/2011 | Lee et al. | |
| 2012/0084709 A1* | 4/2012 | Sirpal | G06F 3/04847 715/781 |
| 2013/0275910 A1 | 10/2013 | Kim et al. | |
| 2014/0101575 A1 | 4/2014 | Kwak et al. | |
| 2014/0204037 A1 | 7/2014 | Kim | |
| 2016/0132074 A1 | 5/2016 | Kim et al. | |
| 2016/0299578 A1 | 10/2016 | Kim et al. | |
| 2017/0102738 A1* | 4/2017 | Park | G06F 3/04883 |
| 2017/0168769 A1 | 6/2017 | Jeon et al. | |
| 2018/0032246 A1 | 2/2018 | Kim | |
| 2018/0059721 A1* | 3/2018 | Akimoto | G06F 1/1677 |
| 2018/0088633 A1* | 3/2018 | Whitman | G06F 1/1677 |
| 2018/0164851 A1 | 6/2018 | Park et al. | |
| 2019/0034147 A1* | 1/2019 | Koki | G06F 1/1616 |
| 2019/0064950 A1* | 2/2019 | Hsu | G06F 1/1616 |
| 2019/0101578 A1* | 4/2019 | Lawrence | G06F 3/041661 |

FOREIGN PATENT DOCUMENTS

| | | |
|---|---|---|
| KR | 10-2014-0095347 | 8/2014 |
| KR | 10-2014-0146992 | 12/2014 |
| KR | 10-2015-0135060 | 12/2015 |
| KR | 10-2015-0137436 | 12/2015 |
| KR | 10-2016-0055646 | 5/2016 |
| KR | 10-2017-0079549 | 7/2017 |

OTHER PUBLICATIONS

Written Opinion of the ISA for PCT/KR2021/010008 mailed Nov. 5, 2021, 5 pages.

* cited by examiner

ELECTRONIC DEVICE COMPRISING FLEXIBLE DISPLAY MODULE AND METHOD FOR OPERATING SAME

CROSS REFERENCE TO RELATED APPLICATIONS

This application is a continuation of International Application No. PCT/KR2021/010008 filed on Jul. 30, 2021, designating the United States, in the Korean Intellectual Property Receiving Office, and claiming priority to Korean Patent Application No. KR 10-2020-0095574, filed Jul. 30, 2020, the disclosures of which are all hereby incorporated by reference herein in their entireties.

BACKGROUND

Field

Various example embodiments relate to an electronic device including a flexible display module and/or a method for operating the same.

Description of Related Art

Various electronic devices are commonplace, such as smartphones, tablet PCs, portable multimedia players (PMPs), personal digital assistants (PDAs), laptop personal computers (PCs), and wearable devices.

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

Recently, various electronic devices having a large screen display have been developed and distributed. For example, electronic devices with a foldable display or flexible display and devices with a rollable display have been developed and distributed. As large screen display-equipped devices are distributed, various methods may be provided for use of the large screen.

In the case of an electronic device including a display module, when the execution screen of an application is displayed on the display module, the ratio of the execution screen of the application may be determined depending on the size and resolution of the display area of the display module and the ratio of the horizontal and vertical lengths.

In the case of an electronic device including a flexible display module, a specific area of the display module exposed on the front surface of the electronic device viewed by the user may be determined according to the folded state or unfolded state of the flexible display module. When the execution screen of an application is displayed in a specific area of the display module exposed on the front surface, suitability of the user's work environment may vary depending on the size and ratio of the specific area where the execution screen is displayed.

For example, when the vertical length is relatively longer than the horizontal length of the specific area of the flexible display module exposed on the front surface of the electronic device, work efficiency may be increased by working on the application suitable for the screen in which the vertical length is relatively larger than the horizontal length and, when the horizontal length is relatively larger than the vertical length of the specific area of the flexible display module exposed to the front surface of the electronic device, work efficiency may be increased by working on the application suitable for the screen in which the horizontal length is relatively larger than the vertical length.

In the case of an electronic device, such as a foldable device, it may sometimes be desired to manipulate an application on a larger screen using an object included in one application screen. For example, there may be such an occasion where an image included in the execution screen of a web browsing application needs to be edited through an application capable of image editing. In this case, an object included in one application screen may be temporarily stored, and then, a command for returning to the home screen is input to the electronic device. After another application is executed on the home screen, a command for loading the temporarily stored object may be input. However, there is no disclosure as to a configuration for separately processing touch input on the folding area in the folding state and touch input on the folding area in the unfolding state.

Further, a foldable device which is foldable multiple times may expose the screen of three or more areas as it is able to fold multiple times, but no discussion has been made about an interface differentiated from the conventional one for the exposed screen of three or more areas.

SUMMARY

According to various example embodiments, an electronic device including a flexible display module (comprising at least one display) and operation method thereof may display an execution screen of an application suitable for a specific area of the display module exposed to the front surface of the electronic device viewed by the user.

According to various example embodiments, an electronic device may comprise a foldable housing including at least one hinge structure, a flexible display module comprising at least one display and having at least a partial area exposed through the foldable housing, and at least one processor provided in the foldable housing. The display module may include a plurality of areas and at least one foldable area disposed between the plurality of areas corresponding to the at least one hinge structure to be foldable according to a state of the at least one hinge structure. The at least one processor may be configured to, when a state of the at least one hinge structure is a first state, display a first execution screen of a first application on the display module, in the first state, a first foldable area among the at least one foldable area being in a folded state, while the first foldable area among the at least one foldable area is in the folded state, detect a touch drag input to the first foldable area from an object included in the first execution screen, and display, on the display module, a second execution screen of a second application different from the first application, obtained using at least a portion of the object, based on a change in the state of the at least one hinge structure from the first state to a second state after detecting the touch drag input.

According to various example embodiments, an electronic device may comprise a foldable housing including at least one hinge structure, a flexible display module having at least a partial area exposed through the foldable housing, and at least one processor provided in the foldable housing. a flexible display module having at least a partial area exposed through the foldable housing, the display module including a plurality of areas and at least one foldable area disposed between the plurality of areas corresponding to the at least one hinge structure to be foldable according to a state of the at least one hinge structure; and The at least one processor may be configured to, when a state of the at least one hinge structure is a first state, display a first execution screen of a first application on the display module, in the first state, a first foldable area among the at least one foldable area being in a folded state, identify at least one object included in the first execution screen in response to a first user input, display a second execution screen of a second application obtained using at least a portion of the identified at least one object, in at least one area set corresponding to a second state, based on a change in the state of the at least one hinge structure from the first state to the second state, and display a third execution screen of a third application different from the second application, obtained using at least a portion of the identified at least one object, in at least one area set corresponding to a third state based on a change in the state of the at least one hinge structure from the first state to the third state.

According to various example embodiments, an electronic device may comprise a housing, a rollable display module that may be drawn out from the housing, and at least one processor provided in the housing. The at least one processor may be configured to display, on the display module, a first execution screen of a first application in a state in which a first area of the display module is drawn out from the housing to be exposed to an outside, detect a touch drag input to an edge area of the first area from an object included in the first execution screen, and display, on the display module, a second execution screen of a second application different from the first application obtained using at least a portion of the object based on a second area of the display module being drawn out from the housing to be exposed to the outside after detecting the touch drag input.

According to various example embodiments, there may be provided an electronic device and an operation method thereof, which may separately process touch input on the foldable area in the folded state and touch input on the foldable area in the unfolded state. Accordingly, there may be provided an interface differentiated for the electronic device including a flexible display module.

According to various example embodiments, there may be provided an electronic device including a flexible display module and an operation method thereof, which may display an execution screen of an application suitable for a specific area of a display module exposed to the front surface of the electronic device viewed by the user. Accordingly, the user may work on the suitable application, increasing work efficiency.

According to various example embodiments, there may be provided an electronic device and an operation method thereof, which may display an execution screen of a preset application depending on the exposed area of the flexible display module. Accordingly, there may be provided an interface differentiated from the conventional one, according to the exposed area.

BRIEF DESCRIPTION OF THE DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
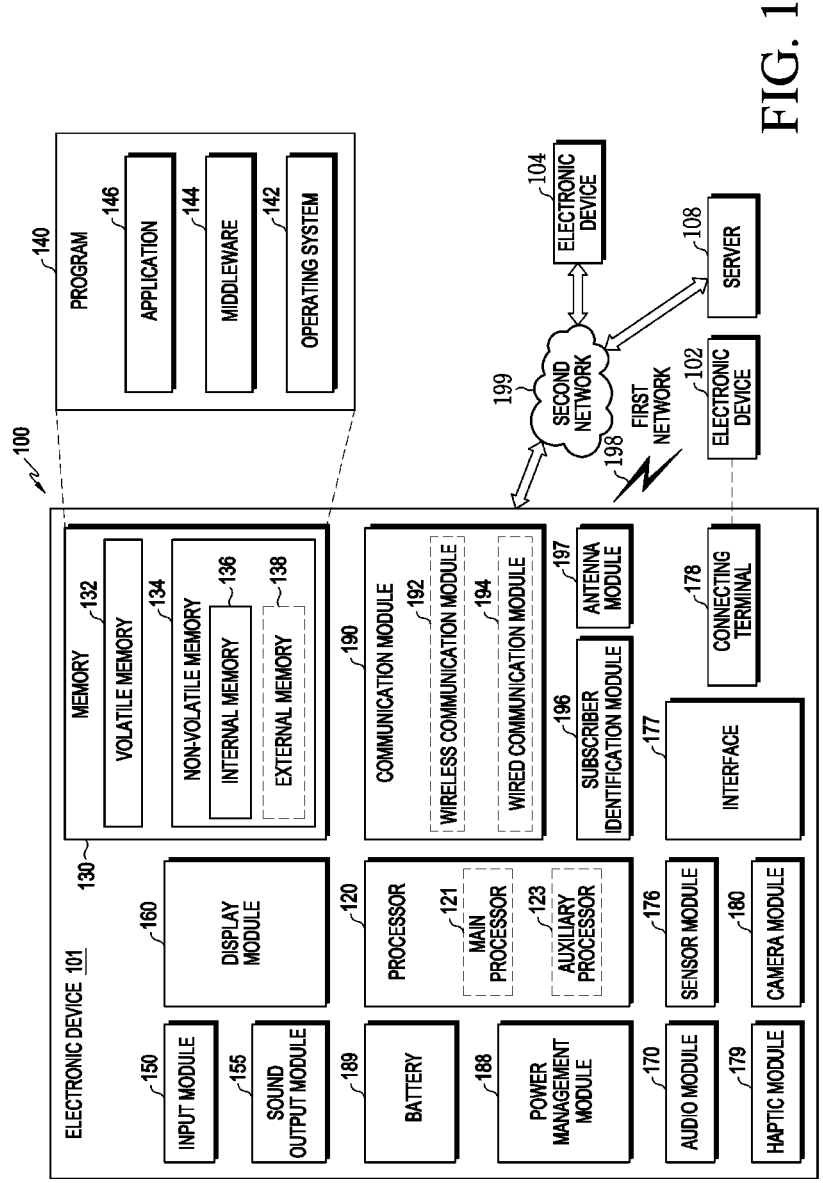
FIG. 1 is a view illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
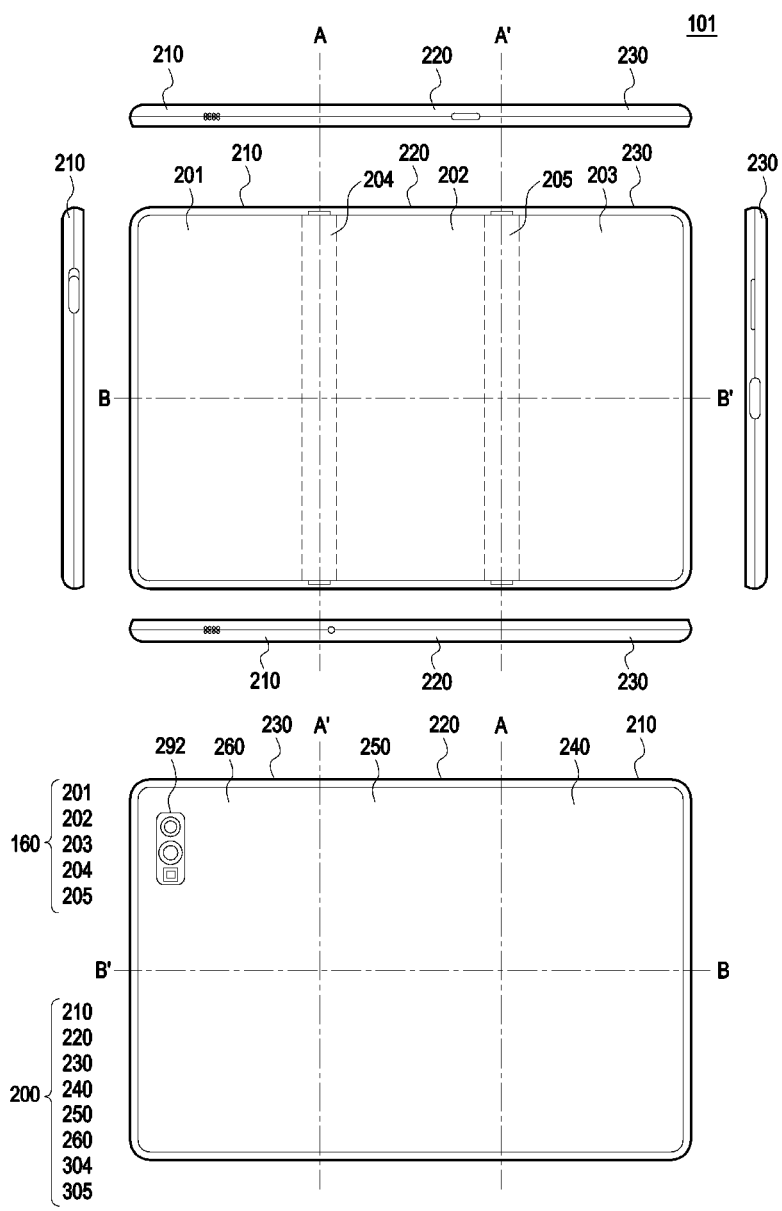
FIG. 2 is a view illustrating an unfolded state of an electronic device according to an example embodiment.

FIG. 2 is a view illustrating an unfolded state of an electronic device 101 according to an embodiment.

In an embodiment, referring to FIG. 2, an electronic device 101 may include a foldable housing 200 and a display module 160, comprising at least one display, disposed in a space formed by the foldable housing 200. At least a portion of the display module 160 may be flexible or foldable. The surface where the display module 160 is disposed (or the surface where the display module 160 is viewed from the outside of the electronic device 101) may be the front surface of the electronic device 101. The opposite surface of the front surface may be a rear surface of the electronic device 101. The surface surrounding the space between the front and back surfaces may be a side surface of the electronic device 101.

According to an embodiment, the foldable housing 200 may include a first housing structure 210, a second housing structure 220, a third housing structure 230, a first back cover 240, a second back cover 250, a third back cover 260, and a hinge structure (e.g., the first hinge structure 304 and second hinge structure 305 of FIG. 3A described below). The foldable housing 200 of the electronic device 101 are not limited to the shape and coupling shown in FIG. 2 but may rather be implemented in other shapes or via a combination and/or coupling of other components. For example, according to another embodiment, the first housing structure 210 and the first back cover 240 may be integrally formed with each other, and the second housing structure 220 and the second back cover 250 may be integrally formed with each other. The third housing structure 230 and the third back cover 260 may be integrally formed with each other.

According to an embodiment, the first housing structure 210 may be connected, directly or indirectly, to the first hinge structure (e.g., the first hinge structure 304 of FIG. 3A described below) and may include a first surface facing in a first direction and a fourth surface facing in a fourth direction opposite to the first direction. The second housing structure 220 may be connected, directly or indirectly, to the first hinge structure (e.g., the first hinge structure 304 of FIG. 3A described below) and the second hinge structure (e.g., the second hinge structure 305 of FIG. 3A described below) and may include a second surface facing in a second direction and a fifth surface facing in a fifth direction opposite to the second direction. The third housing structure 230 may be connected, directly or indirectly, to the second hinge structure (e.g., the second hinge structure 305 of FIG. 3A described below) and may include a third surface facing in a third direction and a sixth surface facing in a sixth direction opposite to the third direction.

According to an embodiment, the first housing structure 210 may be rotated about the first hinge structure (e.g., the first hinge structure 304 of FIG. 3A described below) (or first folding axis A) from the second housing structure 220. Thus, the electronic device 101 may switch the state between a folded state or unfolded state. For example, the state of the first hinge structure (e.g., the first hinge structure 304 of FIG. 3A described below) of the electronic device 101 may be switched between the folded state and the unfolded state. For example, in the folded state of the first hinge structure 304 of the electronic device 101, the first direction in which the first surface of the first housing structure 210 faces may be substantially opposite to the second direction in which the second surface of the first housing structure 220 faces. In the unfolded state of the first hinge structure 304 of the electronic device 101, the first direction may be substantially the same as the second direction.

According to an embodiment, the third housing structure 230 may be rotated about the second hinge structure (e.g., the second hinge structure 305 of FIG. 3A described below) (or second folding axis A') from the second housing structure 220. Thus, the electronic device 101 may switch the state between a folded state or unfolded state. For example, the state of the second hinge structure (e.g., the second hinge structure 305 of FIG. 3A described below) of the electronic device 101 may be switched between the folded state and the unfolded state. For example, in the folded state of the second hinge structure 305 of the electronic device 101, the second direction in which the second surface of the second housing structure 220 faces may be substantially opposite to the third direction in which the third surface of the third housing structure 230 faces. In the unfolded state of the second hinge structure 305 of the electronic device 101, the second direction may be substantially the same as the third direction. Here, the direction may be a direction of the normal to the surface, but is not limited thereto.

According to an embodiment, the first housing structure 210 and the second housing structure 220 may be disposed on two opposite sides of the first folding axis A. The second housing structure 220 and the third housing structure 230 may be disposed on two opposite sides of the second folding axis A'. As described below, the angle or distance between the first housing structure 210, the second housing structure 220, and the third housing structure 230 may be varied depending on whether the electronic device 101 is in the unfolded state, the folded state, or the partially unfolded (or partially folded) intermediate state.

According to an embodiment, at least a portion of the first housing structure 210, the second housing structure 220, and the third housing structure 230 may be formed of a metal or a non-metal material having a predetermined degree of rigidity to support the display module 160. At least a portion formed of metal may provide a ground plane of the electronic device 101 and may be electrically connected, directly or indirectly, with a ground line formed on the printed circuit board.

According to an embodiment, the first rear cover 240 may be disposed on one side of the first folding axis A of the rear surface of the electronic device 101 and have, e.g., a substantially rectangular periphery which may be surrounded by the first housing structure 210. Similarly, the second rear cover 250 may be disposed on the other side of the first folding axis A of the rear surface of the electronic device 101 and may have, e.g., a substantially rectangular periphery which may be surrounded by the second housing structure 320. Similarly, the third rear cover 260 may be disposed on the other side of the second folding axis A' of the rear surface of the electronic device 101 and may have, e.g., a substantially rectangular periphery which may be surrounded by the third housing structure 230.

According to an embodiment, the first rear cover 240, the second rear cover 250, the third rear cover 260, the first housing structure 210, the second housing structure 220, and the third housing structure 230 may form a space where various components (e.g., a printed circuit board or battery) of the electronic device 101 may be arranged. For example, one or more components or sensors may be arranged or visually exposed on/through the rear surface of the electronic device 101. For example, one or more components or sensors may be visually exposed through a rear surface area 292 of the third rear cover 260 corresponding to the third housing structure 230. For example, the sensor exposed through the rear surface area 292 may include a proximity sensor or a rear camera.

According to an embodiment, the display module 160 may be disposed in a space formed by the foldable housing 200. For example, the display module 160 may be seated on a recess formed by the foldable housing 200 and may occupy most of the front surface of the electronic device 101. For example, the first housing structure 210, the second housing structure 220, and the third housing structure 230 of the foldable housing 200 together may form a recess for receiving the display module 160.

According to an embodiment, the front surface of the electronic device 101 may include the display module 160, a partial area of the first housing structure 210, a partial area of the second housing structure 220, and a partial area of the third housing structure 230, which are adjacent to the display module 160.

According to an embodiment, the rear surface of the electronic device 101 may include the first rear cover 240, a partial area of the first housing structure 210, which is adjacent to the first rear cover 240, the second rear cover 250, a partial area of the second housing structure 220, which is adjacent to the second rear cover 250, the third rear cover 260, and a partial area of the third housing structure 230, which is adjacent to the third rear cover 260.

According to an embodiment, the display 160 may be a display module at least a portion of which may be transformed into a flat or curved surface. For example, the display module 160 may include a first foldable area 204, a second foldable area 205, a first area 201 disposed on one side of the first foldable area 204 (e.g., the left side of the first foldable area 204 shown in FIG. 2), a second area 202 disposed on the other side of the first foldable area 204 (e.g., the right side of the first foldable area 204 shown in FIG. 2) and disposed on one side of the second foldable area 205 (e.g., the left side of the second foldable area 205 of FIG. 2), and a third area 203 disposed on the other side of the second foldable area 205 (e.g., the right side of the second foldable area 205 of FIG. 2).

In an embodiment, the foldable area (e.g., the first foldable area 204 or the second foldable area 205) of the display module 160 may correspond to the area where the hinge structure (e.g., the first hinge structure 304 or the second hinge structure 305) is positioned. For example, the first foldable area 204 may correspond to the area where the first hinge structure 304 is positioned, and the second foldable area 205 may correspond to the area where the second hinge structure 305 is positioned. For example, the foldable area (e.g., the first foldable area 204 or the second foldable area 205) may be folded corresponding to the folding of the hinge structure (e.g., the first hinge structure 304 or second hinge structure 305) and be unfolded correspond to the unfolding thereof.

Meanwhile, the segmentation of the display module 160 as shown in FIG. 2 is merely an example, and the display module 160 may be divided into a plurality of (e.g., six or more, or four or less) areas depending on the structure or function of the display module 160. Further, the first area 201, the second area 202, the third area 203, the first foldable area 204, and the second foldable area 205 of the display module 160 may be logically separated areas for convenience of description, but may not be physically separated areas.

Figure 3A:
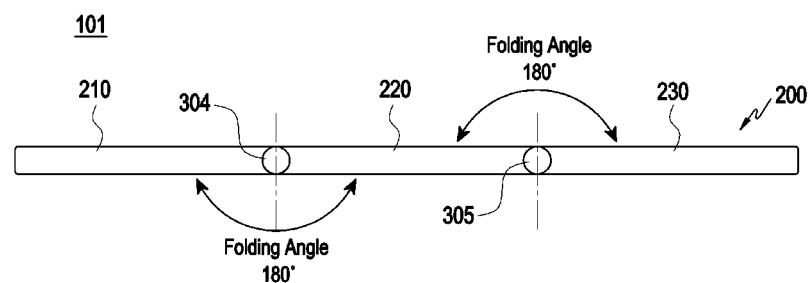
FIG. 3A is a view illustrating an unfolded state of an electronic device according to an example embodiment.
Figure 3B:
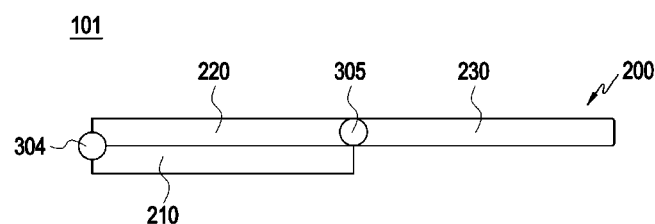
FIG. 3B is a view illustrating a folded state of an electronic device according to an example embodiment.
Figure 3C:
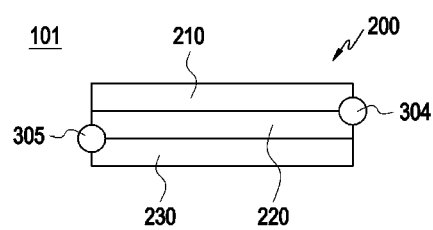
FIG. 3C is a view illustrating a folded state of an electronic device according to an example embodiment.

FIG. 3A is a view illustrating an unfolded state of an electronic device 101 according to an embodiment. FIG. 3B is a view illustrating a folded state of an electronic device 101 according to an embodiment. FIG. 3C is a view illustrating a folded state of an electronic device 101 according to an embodiment. FIGS. 3A, 3B, and 3C are cross-sectional views schematically illustrating the electronic device 101 shown in FIG. 2 taken along the reference line B-B'.

According to an embodiment, the electronic device 101 may identify the unfolded state or the folded state of the electronic device 101 by at least one sensor (e.g., the sensor module 176 of FIG. 1, comprising at least one sensor). For example, the at least one sensor (e.g., the sensor module 176 of FIG. 1) may include at least one of an angle sensor, a distance sensor, a gyroscope, or a hall sensor. For example, the electronic device 101 may identify whether the state of the electronic device 101 is the unfolded state or the folded state using the inclination, acceleration, and gravity for at least one housing of the electronic device 101 and the distance between the housing structures (e.g., the first housing structure 210, the second housing structure 220 or the third housing structure 230) of the foldable housing 200 provided in the electronic device 101, detected through at least one sensor (e.g., the sensor module 176 of FIG. 1). For example, the electronic device 101 may identify whether the state of the electronic device 101 is the unfolded state or the folded state using the unfolded state or folded state of the hinge structure (e.g., the first hinge structure 304 or the second hinge structure 305) detected through at least one sensor (e.g., the sensor module 176 of FIG. 1). For example, the electronic device 101 may identify the folded state or unfolded state of the electronic device 101 using the rotation direction or rotation angle of the at least one hinge structure (e.g., the first hinge structure 304 or the second hinge structure 305) provided in the electronic device 101 through the at least one sensor (e.g., the sensor module 176 of FIG. 1).

Referring to FIGS. 3A, 3B, and 3C, according to an embodiment, a foldable housing 200 of an electronic device 101 may include a first hinge structure 304, a second hinge structure 305, a first housing structure 210, a second housing structure 220, and a third housing structure 230.

FIG. 3A illustrates an example in which the first hinge structure 304 and the second hinge structure 305 both are unfolded. For convenience of description, the folding angle in the fully unfolded state of the hinge structure (e.g., the first hinge structure 304 or the second hinge structure 305) may be 180 degrees for example. However, this is for convenience of description, and the folding angle in the fully unfolded state of the hinge structure (e.g., the first hinge structure 304 or the second hinge structure 305) may also be 0 degrees for example.

FIG. 3B illustrates an example in which the first hinge structure 304 is in the folded state, and the second hinge structure 305 is in the unfolded state. According to an embodiment, FIG. 3B illustrates an example state in which in the folded state of the first hinge structure 304, the first rear cover (e.g., the first rear cover 240 of FIG. 2) corresponding to the first housing structure 210 and the second rear cover (e.g., the second rear cover 250 of FIG. 2) corresponding to the second housing structure 220 face each other. For convenience of description, the folded state of the first hinge structure 304 and the unfolded state of the second hinge structure 305 are described with reference to FIG. 3B. Although not shown, such an occasion may exist where the first hinge structure 304 is in the unfolded state, and the second hinge structure 305 is in the folded state.

FIG. 3C illustrates an example in which the first hinge structure 304 and the second hinge structure 305 both are folded. According to an embodiment, FIG. 3C illustrates an example in which in the folded state of the first hinge structure 304, the first rear cover (e.g., the first rear cover 240 of FIG. 2) corresponding to the first housing structure 210 and the second rear cover (e.g., the second rear cover 250 of FIG. 2) corresponding to the second housing structure 220 are disposed to face each other and, in the folded state of the second hinge structure 305, the second area (e.g., the second area 202 of FIG. 2) corresponding to the second housing structure 220 and the third area (e.g., the third area 203 of FIG. 2) corresponding to the third housing structure 230 are disposed to face each other. For convenience of description, the state in which the first hinge structure 304 and the second hinge structure 305 both are folded is described with reference to FIG. 3C. Although not shown, in the folded state of the first hinge structure 304, the first area (e.g., the first area 201 of FIG. 2) corresponding to the first housing structure 210 and the second area (e.g., the second area 202 of FIG. 2) corresponding to the second housing structure 220 may be disposed to face each other and, in the folded state of the second hinge structure 305, the second rear cover (e.g., the second rear cover 250 of FIG. 2) corresponding to the second housing structure 220 and the third rear cover (e.g., the third rear cover 260 of FIG. 2) corresponding to the third housing structure 230 may be disposed to face each other. Although not shown, in the folded state of the first hinge structure 304, the first rear cover (e.g., the first rear cover 240 of FIG. 2) corresponding to the first housing structure 210 and the second rear cover (e.g., the second rear cover 250 of FIG. 2) corresponding to the second housing structure 220 may be disposed to face each other and, in the folded state of the second hinge structure 305, the third rear cover (e.g., the third rear cover 260 of FIG. 2) corresponding to the third housing structure 230 and the first area (e.g., the first area 201 of FIG. 2) corresponding to the first housing structure 210 may be disposed to face each other. Although not shown, in the folded state of the second hinge structure 305, the third rear cover (e.g., the third rear cover 260 of FIG. 2) corresponding to the third housing structure 230 and the second rear cover (e.g., the second rear cover 250 of FIG. 2) corresponding to the second housing structure 220 may be disposed to face each other and, in the folded state of the first hinge structure 304, the first rear cover (e.g., the first rear cover 240 of FIG. 2) corresponding to the first housing structure 210 and the third area (e.g., the third area 203 of FIG. 2) corresponding to the third housing structure 230 may be disposed to face each other.

Figure 3D:
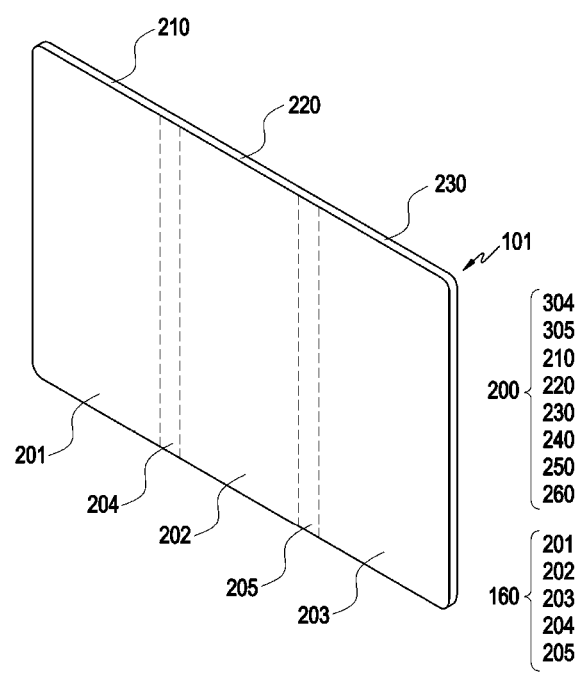
FIG. 3D is a view illustrating an unfolded state of an electronic device according to an example embodiment.
Figure 3E:
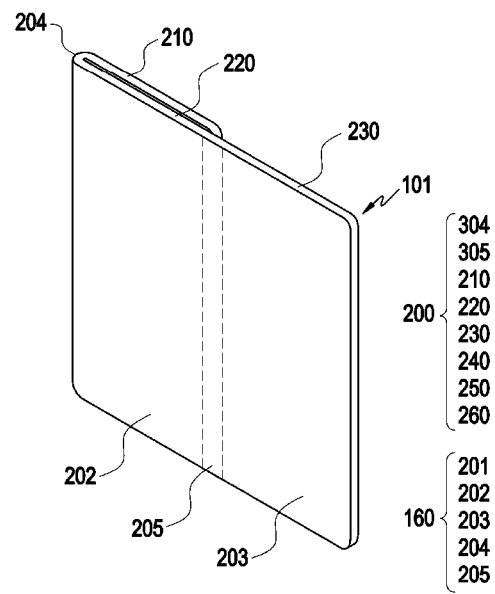
FIG. 3E is a view illustrating a folded state of an electronic device according to an example embodiment.
Figure 3F:
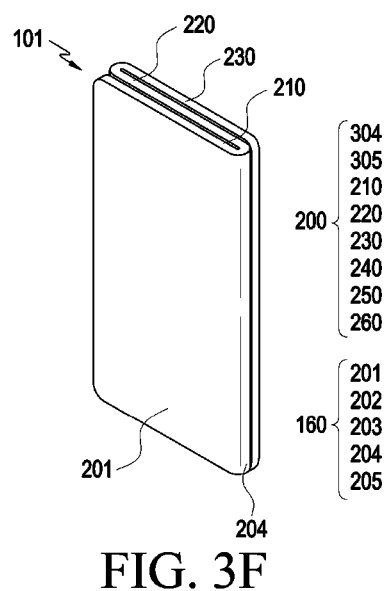
FIG. 3F is a view illustrating a folded state of an electronic device according to an example embodiment.

FIG. 3D is a perspective view illustrating an unfolded state of an electronic device 101 according to an embodiment. FIG. 3E is a perspective view illustrating a folded state of an electronic device 101 according to an embodiment. FIG. 3F is a perspective view illustrating a folded state of an electronic device 101 according to an embodiment.

Referring to FIGS. 3D, 3E, and 3F, according to an embodiment, a foldable housing 200 of an electronic device 101 may include a first hinge structure (e.g., the first hinge structure 304 of FIG. 3A), a second hinge structure (e.g., the second hinge structure 305 of FIG. 3A), a first housing structure 210, a second housing structure 220, and a third housing structure 230. Further, the display module 160 of the electronic device 101 may include a first area 201, a second area 202, a third area 203, a first foldable area 204, and a second foldable area 205.

FIG. 3D exemplarily illustrates a state in which the first hinge structure (e.g., the first hinge structure 304 of FIG. 3A) and the second hinge structure (e.g., the second hinge structure 305 of FIG. 3A) both are unfolded. FIG. 3D is a perspective view illustrating an electronic device 101 corresponding to the electronic device 101 of FIG. 3A.

According to an embodiment, referring to FIG. 3D, in a state in which the first hinge structure (e.g., the first hinge structure 304 of FIG. 3A) and the second hinge structure (e.g., the second hinge structure 305 of FIG. 3A) both are unfolded, the first housing structure 210, the second housing structure 220, and the third housing structure 230 may be disposed to face in the same direction, with an angle of 180 degrees therebetween. In this case, the surface of the first area 201, surface of the second area 202, and surface of the third area 203 of the display module 160 may be angled at 180 degrees therebetween while facing in the same direction (e.g., forward of the front surface of the electronic device 101). In this case, the first foldable area 204 and the second foldable area 205 may be flush with the first area 201, second area 202, and third area 203.

FIG. 3E exemplarily illustrates a state in which the first hinge structure (e.g., the first hinge structure 304 of FIG. 3A) is folded, and the second hinge structure (e.g., the second hinge structure 305 of FIG. 3A) is unfolded. FIG. 3E is a perspective view illustrating an electronic device 101 corresponding to the electronic device 101 of FIG. 3B.

According to an embodiment, referring to FIG. 3E, in a state in which the first hinge structure (e.g., the first hinge structure 304 of FIG. 3A) is in the folded state, and the second hinge structure (e.g., the second hinge structure 305 of FIG. 3A) is in the unfolded state, the surface of the second area 202 and the surface of the third area 203 of the display module 160 may be angled at 180 degrees therebetween while facing in the same direction (e.g., forward of the front surface of the electronic device 101). In this case, the second foldable area 205 may be coplanar with the second area 202 and the third area 203. In this case, the surface of the first area (e.g., the first area 201 of FIG. 2) of the display module 160 may face in a direction (e.g., the backward of the electronic device 101) opposite to the direction in which the surface of the second area 202 faces. In this case, at least a portion of the first foldable area 204 may have a curved surface with a predetermined curvature.

FIG. 3F exemplarily illustrates a state in which the first hinge structure (e.g., the first hinge structure 304 of FIG. 3A) and the second hinge structure (e.g., the second hinge structure 305 of FIG. 3A) both are folded. FIG. 3F is a perspective view illustrating an electronic device 101 corresponding to the electronic device 101 of FIG. 3C.

According to an embodiment, referring to FIG. 3F, in a state in which the first hinge structure (e.g., the first hinge structure 304 of FIG. 3A) and the second hinge structure (e.g., the second hinge structure 305 of FIG. 3A) are folded, the first area 201 of the display module 160 may face forward of the electronic device 101. In this case, at least a portion of the first foldable area 204 may have a curved surface with a predetermined curvature. In this case, the surface of the second area (e.g., the second area 202 of FIG. 2) of the display module 160 and the surface of the third area (e.g., the third area 203 of FIG. 2) may form a narrow angle therebetween while facing each other.

Figure 4:
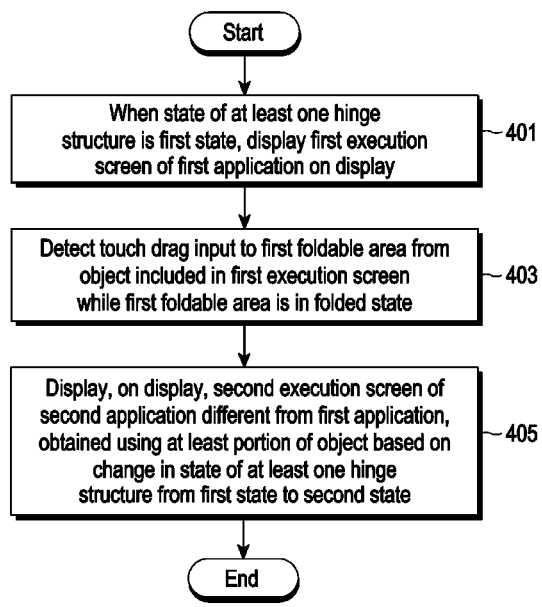
FIG. 4 is a flowchart illustrating a method for operating an electronic device according to an example embodiment.
Figure 5:
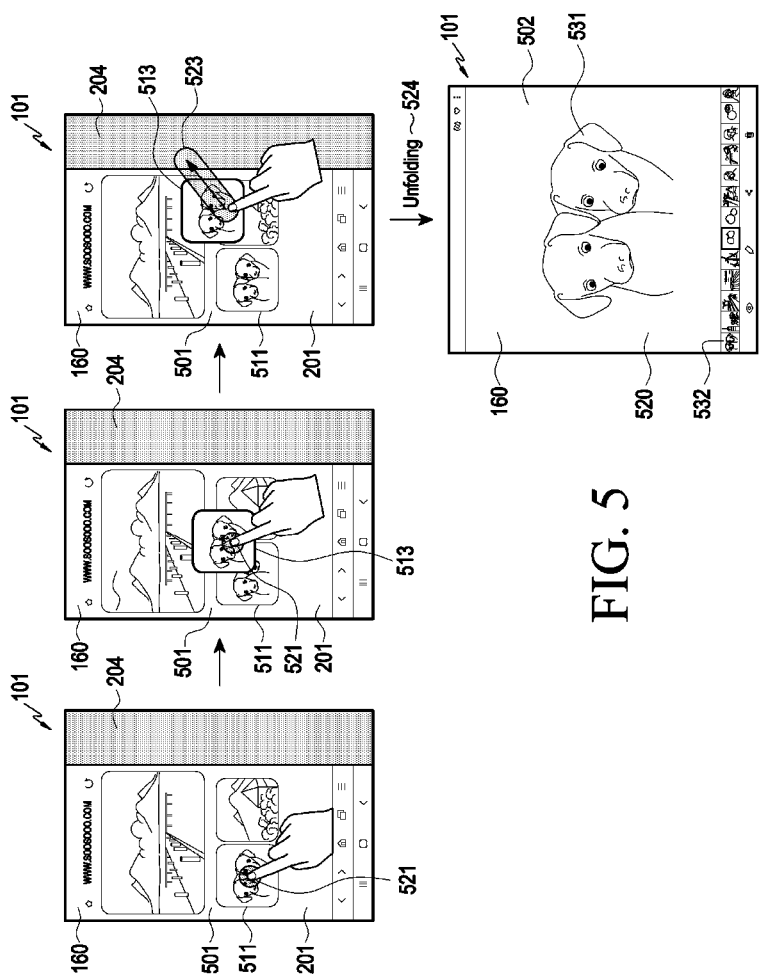
FIG. 5 is a view illustrating operations of an electronic device according to an example embodiment.
Figure 6:
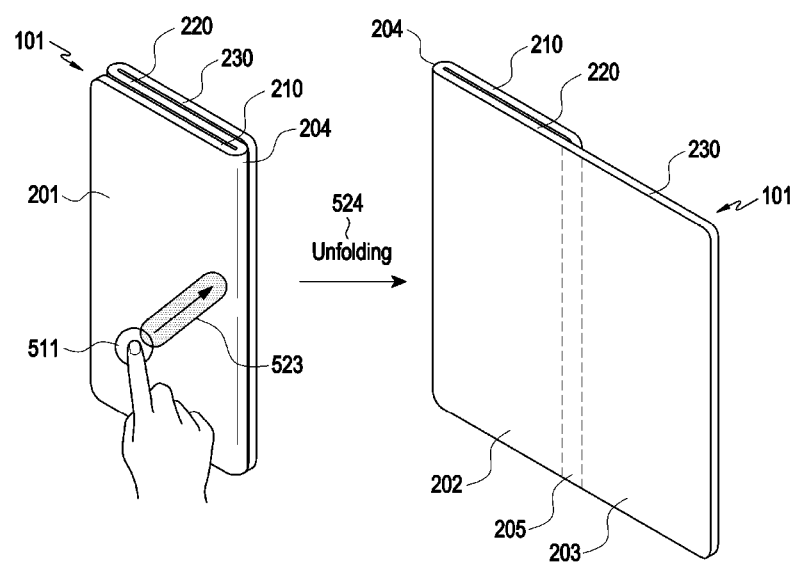
FIG. 6 is a perspective view illustrating operations of an electronic device according to an example embodiment.

FIG. 4 is a flowchart illustrating a method for operating an electronic device according to an embodiment. The embodiment of FIG. 4 is described with reference to FIGS. 5 and 6. FIG. 5 is a view illustrating operations of an electronic device according to an embodiment. FIG. 6 is a perspective view illustrating operations of an electronic device according to an embodiment.

In the disclosure, "electronic device 101 performs a particular operation" may also indicate that the processor 120 performs the specific operation or the processor 120 controls another piece of hardware to perform the specific operation. Or, 'electronic device 101 performs a particular operation' may also be appreciated as 'the particular operation is performed by the processor 120 or other hardware as instructions stored in the memory 130 are executed.' Each "processor" herein comprises processing circuitry.

According to an embodiment, referring to FIGS. 4, 5, and 6, in operation 401, the electronic device 101 (e.g., the processor 120 of FIG. 1) may display a first execution screen 501 of a first application on the display module 160 when the hinge structure (e.g., the first hinge structure 304 or the second hinge structure 305 of FIG. 3A) provided in the electronic device 101 is in a first state. For example, in the first state of the electronic device 101, e.g., in a state in which the first hinge structure 304 and the second hinge structure 305 both are folded, the first area 201 of the display module 160 may be exposed to the front surface, and at least a portion of the first foldable area 204 of the display module 160 may form a curved surface having a predetermined curvature. For example, in the first state, e.g., in a state in which the first hinge structure 304 and the second hinge structure 305 both are folded, the electronic device 101 may display the first execution screen 501 of the first application in the first area 201 of the display module 160. FIG. 5 illustrates that the first execution screen 501 is not displayed in the first foldable area 204. However, this is merely an example. In another embodiment, the first execution screen 501, together with the first area 201 and a portion of the first foldable area 204, may be displayed.

For convenience of description, in the figures for describing the operation of the electronic device 101, like FIG. 5, when the hinge structure (e.g., the first hinge structure 304) of the electronic device 101 is in the folded state, the foldable area (e.g., the first foldable area 204) of the display module 160 is illustrated as being flat. However, this is merely an example for convenience of description. When the hinge structure (e.g., the first hinge structure 304) of the electronic device 101 is in the folded state, the foldable area (e.g., the first foldable area 204) of the display module 160 may be in the folded state, e.g., at least a portion of the foldable area (e.g., the first foldable area 204) may form a curved surface having a predetermined curvature, which may be applied to other embodiments.

According to an embodiment, referring to FIGS. 4, 5, and 6, in operation 403, while the first foldable area 204 is in the folded state, the electronic device 101 may detect a touch drag input (e.g., 523) to the first foldable area 204 from an object (e.g., the first object 511) included in the first execution screen 501 of the first application. For example, the electronic device 101 may identify a touch 521 to the first object 511 and identify that the first object 511 is selected corresponding to the position of the touch 521. The electronic device 101 may display another object 513 corresponding to the first object 511, corresponding to the position of the touch 521, based on selection of the first object 511. The other object 513 may be an object indicating the first object 511, and may have the same shape and/or same size as the first object 511. Or, the other object 513 may be implemented as any object, such as a thumbnail image or ghost view of the first object 511, but its implementation is not limited. The electronic device 101 may move the other object 513 according to the moved contact position based on the touch drag input (e.g., 523 of FIG. 5).

According to an embodiment, referring to FIGS. 4, 5, and 6, in operation 405, the electronic device 101 may display, on the display module 160, a second execution screen 502 of a second application, different from the first application, obtained using at least a portion of the object (e.g., the first object 511), based on a change in the state of the hinge structure (e.g., the first hinge structure 304 or the second hinge structure 305 of FIG. 3A) from the first state to the second state. For example, the electronic device 101 may display, in a specific area 520 of the display module 160 (e.g., an area including the second area 202, third area 203, and second foldable area 205 of the display module 160), the second execution screen 502 of the second application different from the first application, obtained using at least a portion of the first object 511, based on a change (e.g., unfolding 524) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded, to the second state, e.g., a state in which the first hinge structure (e.g., the first hinge structure 304 of FIG. 3A) is folded, and the second hinge structure (e.g., the second hinge structure 305 of FIG. 3A) is unfolded, after detecting a touch drag input to the first foldable area 204 from the first object 511 included in the first execution screen 501 of the first application. For example, the electronic device 101 may execute the second application and allocate the selected object, e.g., the first object 511, to the second application. The second application may configure the second execution screen 502 using the allocated first object 511, and the electronic device 101 may display the configured second execution screen 502. For example, in the embodiment of FIG. 5, the first object 511, e.g., an image file, included in the first execution screen 501 of the first application which is a web browsing application may be selected. The electronic device 101 may allocate the first object 511, e.g., an image file, to a second application, e.g., a gallery application. The gallery application may store the allocated image file in storage within the gallery application. The gallery application may configure a second execution screen 502 including a thumbnail 532 indicating that the image file is stored and the image file as an entire screen 531, and the electronic device 101 may display the configured second execution screen 502. The second application may configure the second application execution screen using the selected object, e.g., entire information about the first object 511 or partial information. Meanwhile, the above-described scheme of processing the allocated object of the gallery application is merely an example, and it will be appreciated by one of ordinary skill in the art that the scheme of processing the allocated object may be configured to differ per application. Further, the execution application is exemplary, and the execution application may be determined based on the attribute of the object (e.g., the first object 511). For example, when the attribute of the object (e.g., the first object 511) is text, a text editing application may be executed. When the attribute of the object (e.g., the first object 511) is link, an application related to the corresponding link may be executed. The execution application is not limited.

According to an embodiment, the electronic device 101 may detect a touch drag input 523 to the first foldable area 204 from the first object 511 included in the first execution screen 501 of the first application displayed in the first area 201 of the display module 160 while the first foldable area 204 of the display module 160 is in the folded state. Thereafter, the electronic device 101 may identify a change (e.g., unfolding 524) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the second state, e.g., a state in which the first hinge structure (e.g., the first hinge structure 304 of FIG. 3A) is folded, and the second hinge structure (e.g., the second hinge structure 305 of FIG. 3A) is unfolded, within a preset time. The electronic device 101 may display, in the specific area 520 of the display module 160 (e.g., an area including the second area 202, third area 203, and second foldable area 205 of the display module 160) of the display module 160, the second execution screen 502 of the second application different from the first application, obtained using at least a portion of the first object 511, based on detection of the state change. For example, the preset time is exemplary, and may be set by the user. In another example, the electronic device 101 may be configured to display the second execution screen 502 in response to a folding state change without determining whether there is a change in folding state within the preset time. It will be appreciated by one of ordinary skill in the art that determining whether there is a change in folding state within the preset time described in the disclosure may be omitted.

Figure 7:
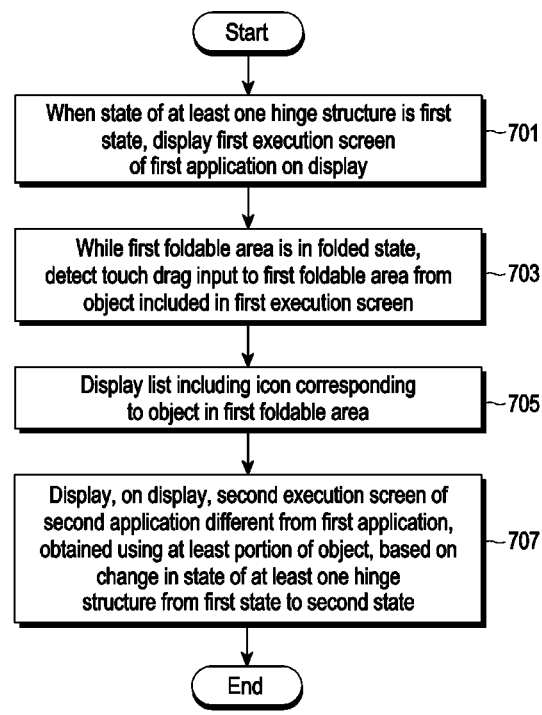
FIG. 7 is a flowchart illustrating a method for operating an electronic device according to an example embodiment.
Figure 8:
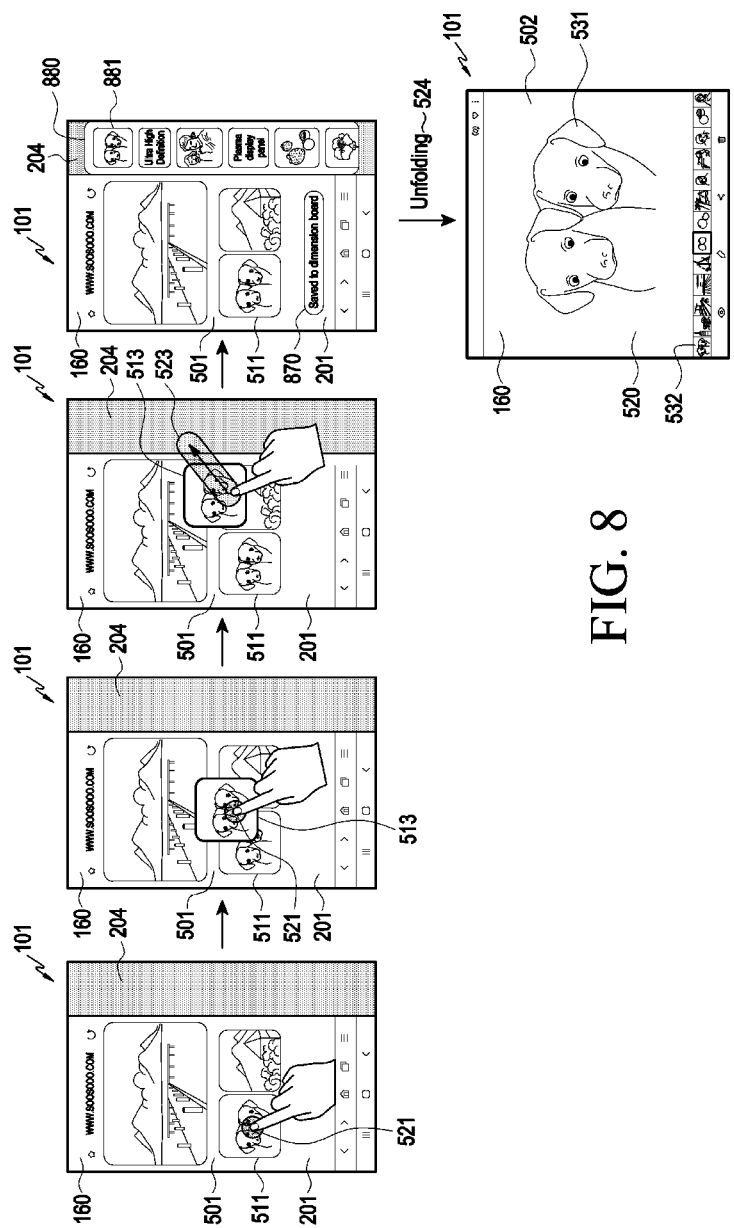
FIG. 8 is a view illustrating operations of an electronic device according to an example embodiment.

FIG. 7 is a flowchart illustrating a method for operating an electronic device according to an embodiment. The embodiment of FIG. 7 is described with reference to FIG. 8. FIG. 8 is a view illustrating operations of an electronic device according to an embodiment.

According to an embodiment, referring to FIGS. 7 and 8, in operation 701, the electronic device 101 (e.g., the processor 120 of FIG. 1) may display a first execution screen 501 of a first application on the display module 160 when the hinge structure (e.g., the first hinge structure 304 or the second hinge structure 305 of FIG. 3A) provided in the electronic device 101 is in a first state. For example, operation 701 may be described similarly to operation 401 of FIG. 4.

According to an embodiment, referring to FIGS. 7 and 8, in operation 703, the electronic device 101 may detect a touch drag input (e.g., 523) to the first foldable area 204 from the object (e.g., the first object 511) included in the first execution screen 501 of the first application while the first foldable area 204 is in the folded state. For example, operation 703 may be described similarly to operation 403 of FIG. 4.

According to an embodiment, referring to FIGS. 7 and 8, in operation 705, the electronic device 101 may display, in the first foldable area 204, a list (e.g., the list 880) including an icon (e.g., the first icon 881) corresponding to the object (e.g., the first object 511), based on detecting the touch drag input 523 to the first foldable area 204 from the object (e.g., the first object 511) included in the first execution screen 501 of the first application and detecting the folded state of the first foldable area 204. For example, the electronic device 101 may display, in the first foldable area 204, the list 880 including the first icon 881 corresponding to the first object 511 based on detecting the touch drag input to the first foldable area 204 from the first object 511. The first icon 881 may be an icon indicating the first object 511 and may have the same shape and/or size as, e.g., the first object 511. Or, the first icon 881 may be an icon configured using the entire information or partial information about the first object 511. Or, the first icon 881 may be implemented as any object, such as a thumbnail image or ghost view of the first object 511, but its implementation is not limited. Or, the first icon 881 may be an icon corresponding to another object 513 indicating the first object 511 and may have the same shape and/or size as the other object 513 or may have the same shape as, but a size smaller than, the other object 513.

According to an embodiment, referring to FIG. 8, the electronic device 101 may store information related to the object (e.g., the first object 511) in temporary storage of the electronic device 101, based on detecting the touch drag input to the first foldable area 204 from the object (e.g., the first object 511) included in the first execution screen 501 of the first application and detecting the folded state of the first foldable area 204. The electronic device 101 may display, on the display module 160, a notification screen (e.g., the first notification screen 870) indicating that the information related to the object (e.g., the first object 511) is stored in the temporary storage. For example, the electronic device 101 may store information related to the first object 511 in the temporary storage based on the touch drag input to the first foldable area 204 from the first object 511 and display, in the first area 201 of the display module 160, the first notification screen 870 indicating that the information related to the first object 511 is stored in the temporary storage. For example, the notification screen (e.g., the first notification screen 870) may be displayed in a partial area of the first area 201 of the display module 160. For example, the notification screen (e.g., the first notification screen 870) may be displayed overlapping the screen (e.g., the first screen 501) displayed in the first area 201 of the display module 160, and the scheme of displaying the notification screen (e.g., the first notification screen 870) or the displayed position are not limited. In FIG. 8, other icons than the first icon 881 may be included in the list 880, indicating the object temporarily stored before the first icon 881 is temporarily stored. As shown in FIG. 8, the electronic device 101 may temporarily store a plurality of objects and provide an interface (e.g., the list 880) that may be recognized and/or selected by the user.

According to an embodiment, referring to FIGS. 7 and 8, in operation 707, the electronic device 101 may display, on the display module 160, a second execution screen 502 of a second application, different from the first application, obtained using at least a portion of the object (e.g., the first object 511), based on a change in the state of the hinge structure (e.g., the first hinge structure 304 or the second hinge structure 305 of FIG. 3A) from the first state to the second state. For example, the electronic device 101 may display, in a specific area 520 of the display module 160 (e.g., an area including the second area 202, third area 203, and second foldable area 205 of the display module 160), the second execution screen 502 of the second application different from the first application, obtained using at least a portion of the first object 511, based on a change (e.g., unfolding 524) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded, to the second state, e.g., a state in which the first hinge structure (e.g., the first hinge structure 304 of FIG. 3A) is folded, and the second hinge structure (e.g., the second hinge structure 305 of FIG. 3A) is unfolded, after displaying the list 880 including the first icon 881 corresponding to the first object 511 in the first foldable area 204. For example, operation 707 may be described similarly to operation 405 of FIG. 4.

For example, the electronic device 101 may display, in a specific area 520 of the display module 160 (e.g., an area including the second area 202, third area 203, and second foldable area 205 of the display module 160), the second execution screen 502 of the second application different from the first application, obtained using at least a portion 531 of the first object 511, based on a change (e.g., unfolding 524) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded, to the second state, e.g., a state in which the first hinge structure (e.g., the first hinge structure 304 of FIG. 3A) is folded, and the second hinge structure (e.g., the second hinge structure 305 of FIG. 3A) is unfolded, within a preset time after displaying, in the first foldable area 204, the list 880 including the first icon 881 corresponding to the first object 511. For example, the preset time is exemplary, and may be set by the user.

Figure 9:
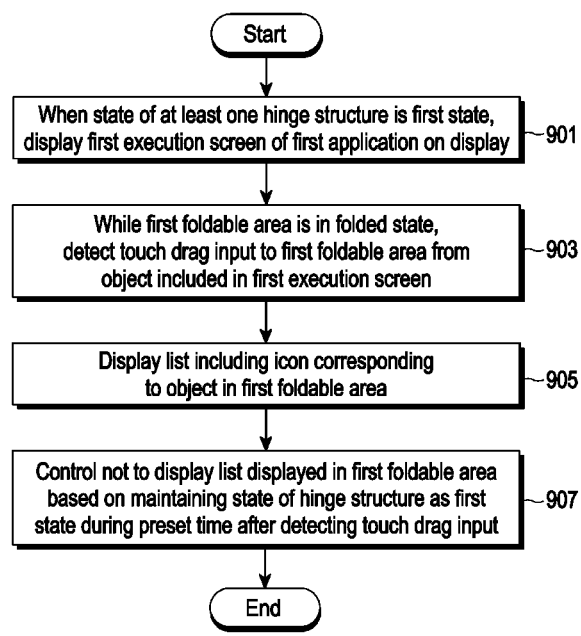
FIG. 9 is a flowchart illustrating a method for operating an electronic device according to an example embodiment.
Figure 10:
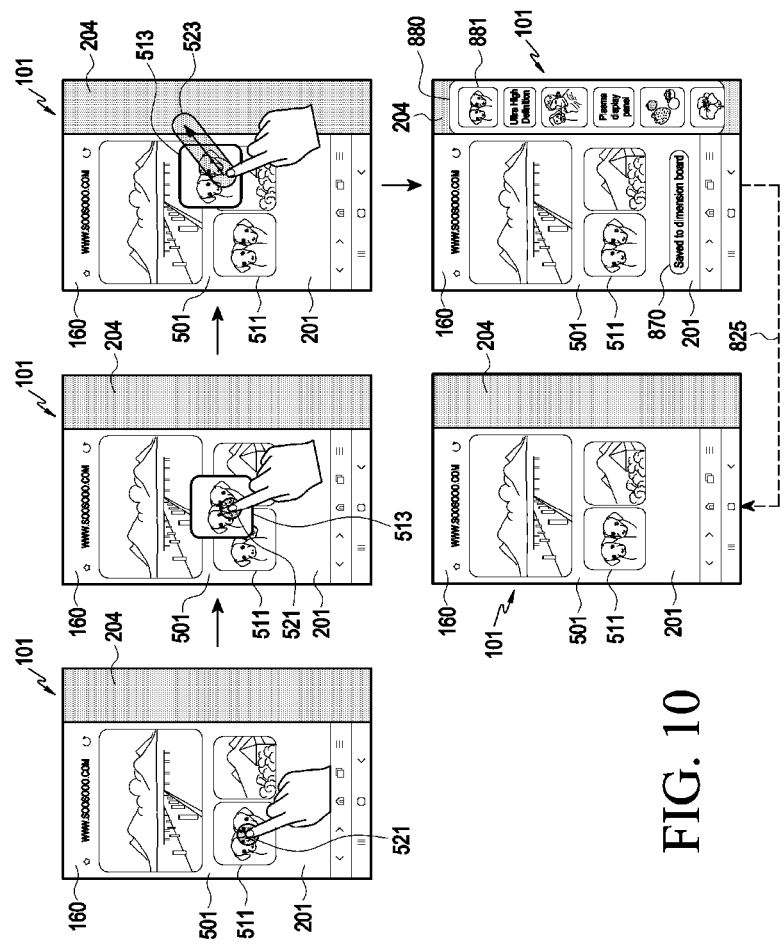
FIG. 10 is a view illustrating operations of an electronic device according to an example embodiment.

FIG. 9 is a flowchart illustrating a method for operating an electronic device according to an embodiment. The embodiment of FIG. 9 is described with reference to FIG. 10. FIG. 10 is a view illustrating operations of an electronic device according to an embodiment.

According to an embodiment, referring to FIGS. 9 and 10, in operation 901, the electronic device 101 (e.g., the processor 120 of FIG. 1) may display a first execution screen 501 of a first application on the display module 160 when the hinge structure (e.g., the first hinge structure 304 or the second hinge structure 305 of FIG. 3A) provided in the electronic device 101 is in a first state. For example, operation 901 may be described similarly to operation 401 of FIG. 4.

According to an embodiment, referring to FIGS. 9 and 10, in operation 903, the electronic device 101 may detect a touch drag input (e.g., 523) to the first foldable area 204 from the object (e.g., the first object 511) included in the first execution screen 501 of the first application while the first foldable area 204 is in the folded state. For example, operation 903 may be described similarly to operation 403 of FIG. 4.

According to an embodiment, referring to FIGS. 9 and 10, in operation 905, the electronic device 101 may display, in the first foldable area 204, a list (e.g., the list 880) including an icon (e.g., the first icon 881) corresponding to the object (e.g., the first object 511), based on detecting the touch drag input 523 to the first foldable area 204 from the object (e.g., the first object 511) included in the first execution screen 501 of the first application and detecting the folded state of the first foldable area 204. For example, operation 905 may be described similarly to operation 705 of FIG. 7.

According to an embodiment, referring to FIGS. 9 and 10, in operation 907, the electronic device 101 may control not to display the list 880 displayed in the first foldable area 204, based on the state of the hinge structure (e.g., the first hinge structure 304 or the second hinge structure 305 of FIG. 3A) being maintained as the first state, e.g., a state in which the first hinge structure (e.g., the first hinge structure 304 of FIG. 3A) and the second hinge structure (e.g., the second hinge structure 305 of FIG. 3A) both are folded, during a preset time, after detecting the touch drag input 523 to the first foldable area 204 from the object (e.g., the first object 511) included in the first execution screen 501 of the first application. For example, the preset time is exemplary, and may be set by the user.

Figure 11:
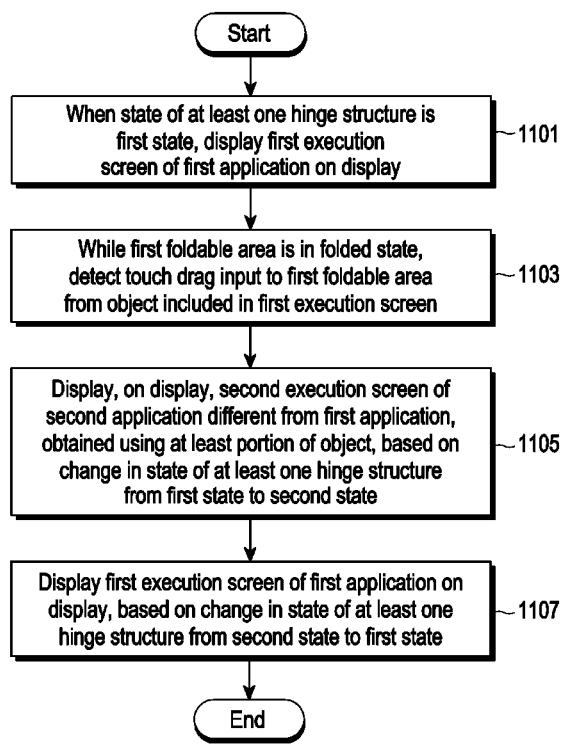
FIG. 11 is a flowchart illustrating a method for operating an electronic device according to an example embodiment.
Figure 12:
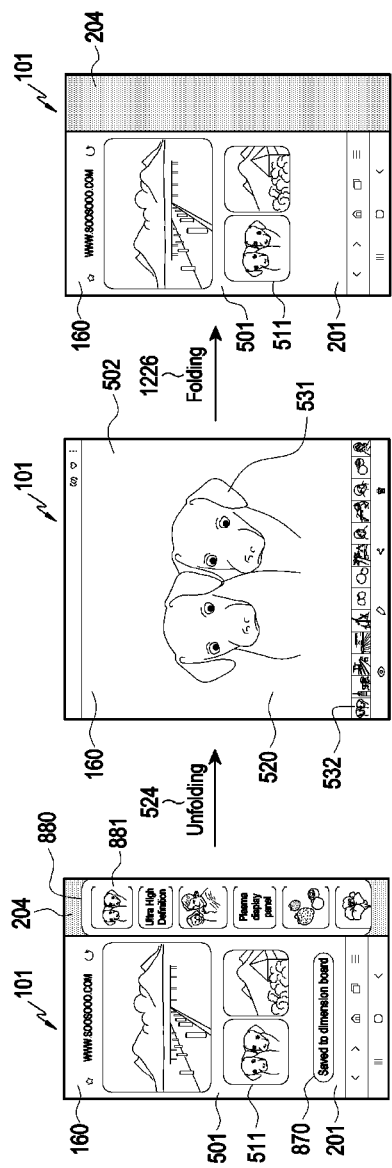
FIG. 12 is a view illustrating operations of an electronic device according to an example embodiment.

FIG. 11 is a flowchart illustrating a method for operating an electronic device according to an embodiment. The embodiment of FIG. 11 is described with reference to FIG. 12. FIG. 12 is a view illustrating operations of an electronic device according to an embodiment.

According to an embodiment, referring to FIGS. 11 and 12, in operation 1101, the electronic device 101 (e.g., the processor 120 of FIG. 1) may display a first execution screen 501 of a first application on the display module 160 when the hinge structure (e.g., the first hinge structure 304 or the second hinge structure 305 of FIG. 3A) provided in the electronic device 101 is in a first state. For example, operation 1101 may be described similarly to operation 401 of FIG. 4, referring to FIG. 5.

According to an embodiment, referring to FIGS. 11 and 12, in operation 1103, the electronic device 101 may detect a touch drag input (e.g., 523 of FIG. 5) to the first foldable area 204 from the object (e.g., the first object 511) included in the first execution screen 501 of the first application while the first foldable area 204 is in the folded state. For example, operation 1103 may be described similarly to operation 403 of FIG. 4, referring to FIG. 5.

In an embodiment, referring to FIG. 12, after operation 1103, the electronic device 101 may additionally perform an operation for displaying the list 880. For example, the electronic device 101 may display, in the first foldable area 204, a list (e.g., the list 880) including an icon (e.g., the first icon 881) corresponding to the object (e.g., the first object 511), based on detecting the touch drag input (e.g., 523 of FIG. 5) to the first foldable area 204 from the object (e.g., the first object 511) included in the first execution screen 501 of the first application and detecting the folded state of the first foldable area 204. For example, the operation of displaying the list 880 may be described similarly to operation 705 of FIG. 7.

According to an embodiment, referring to FIGS. 11 and 12, in operation 1105, the electronic device 101 may display, on the display module 160, the second execution screen 502 of the second application different from the first application, obtained using at least a portion of the object (e.g., the first object 511), based on a change in the state of the hinge structure (e.g., the first hinge structure 304 or the second hinge structure 305 of FIG. 3A) from the first state to the second state. For example, operation 1105 may be described similarly to operation 405 of FIG. 4.

According to an embodiment, referring to FIGS. 11 and 12, in operation 1107, the electronic device 101 may display the first execution screen 501 of the first application on the display module 160 based on a change of the state of the hinge structure (e.g., the first hinge structure 304 or the second hinge structure 305 of FIG. 3A) from the second state to the first state, after displaying the second execution screen 502. For example, the electronic device 101 may display the first execution screen 501 of the first application in the first area 201 of the display module 160 based on a change (e.g., folding 1226) of the state of the hinge structure (e.g., the first hinge structure 304 or the second hinge structure 305 of FIG. 3A) from the second state, e.g., a state in which the first hinge structure (e.g., the first hinge structure 304 of FIG. 3A) is folded, and the second hinge structure (e.g., the second hinge structure 305 of FIG. 3A) is unfolded to the first state, e.g., a state in which the first hinge structure (e.g., the first hinge structure 304 of FIG. 3A) and the second hinge structure (e.g., the second hinge structure 305 of FIG. 3A) both are folded, after displaying the second execution screen 502 on the display module 160 by operation 1105.

Figure 13:
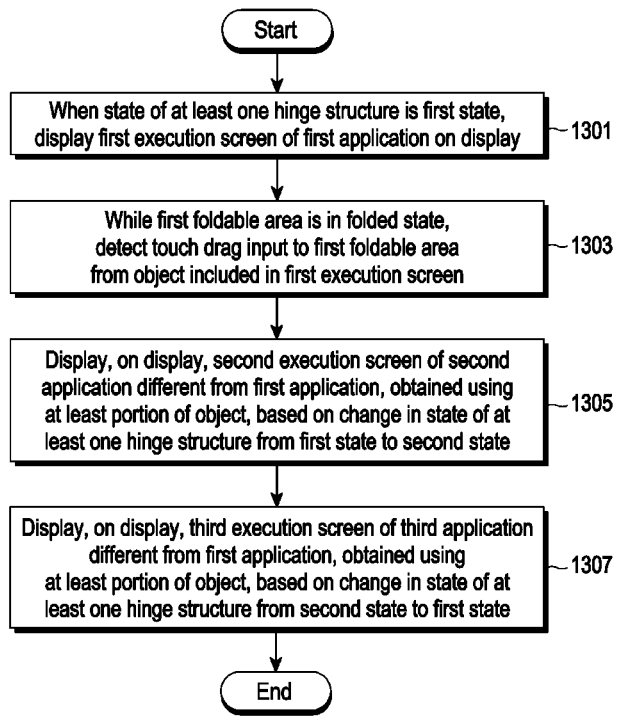
FIG. 13 is a flowchart illustrating a method for operating an electronic device according to an example embodiment.
Figure 14:
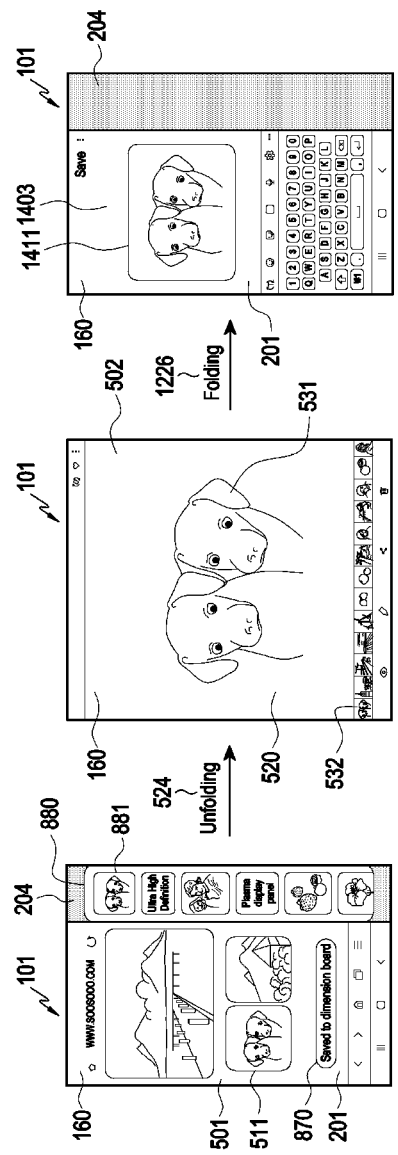
FIG. 14 is a view illustrating operations of an electronic device according to an example embodiment.

FIG. 13 is a flowchart illustrating a method for operating an electronic device according to an embodiment. The embodiment of FIG. 13 is described with reference to FIG. 14. FIG. 14 is a view illustrating operations of an electronic device according to an embodiment.

According to an embodiment, referring to FIGS. 13 and 14, in operation 1301, the electronic device 101 (e.g., the processor 120 of FIG. 1) may display a first execution screen 501 of a first application on the display module 160 when the hinge structure (e.g., the first hinge structure 304 or the second hinge structure 305 of FIG. 3A) provided in the electronic device 101 is in a first state. For example, operation 1301 may be described similarly to operation 401 of FIG. 4, referring to FIG. 5.

According to an embodiment, referring to FIGS. 13 and 14, in operation 1303, the electronic device 101 may detect a touch drag input (e.g., 523 of FIG. 5) to the first foldable area 204 from the object (e.g., the first object 511) included in the first execution screen 501 of the first application while the first foldable area 204 is in the folded state. For example, operation 1303 may be described similarly to operation 403 of FIG. 4, referring to FIG. 5.

In an embodiment, referring to FIG. 14, after operation 1303, the electronic device 101 may additionally perform an operation for displaying the list 880. For example, the electronic device 101 may display, in the first foldable area 204, a list (e.g., the list 880) including an icon (e.g., the first icon 881) corresponding to the object (e.g., the first object 511), based on detecting the touch drag input (e.g., 523 of FIG. 5) to the first foldable area 204 from the object (e.g., the first object 511) included in the first execution screen 501 of the first application and detecting the folded state of the first foldable area 204. For example, the operation of displaying the list 880 may be described similarly to operation 705 of FIG. 7.

According to an embodiment, referring to FIGS. 13 and 14, in operation 1305, the electronic device 101 may display, on the display module 160, the second execution screen 502 of the second application different from the first application, obtained using at least a portion of the object (e.g., the first object 511), based on a change in the state of the hinge structure (e.g., the first hinge structure 304 or the second hinge structure 305 of FIG. 3A) from the first state to the second state. For example, operation 1305 may be described similarly to operation 1105 of FIG. 11.

According to an embodiment, referring to FIGS. 13 and 14, in operation 1307, the electronic device 101 may display, on the display module 160, the third execution screen 1403 of the third application different from the first application, obtained using at least a portion of the object (e.g., the first object 511), based on a change in the state of the hinge structure (e.g., the first hinge structure 304 or the second hinge structure 305 of FIG. 3A) from the second state to the first state. For example, the electronic device 101 may display, in the first area 201 of the display module 160, the third execution screen 1403 of the third application different from the first application, obtained using at least a portion of the first object 511, based on a change (e.g., folding 1226) of the state of the hinge structure (e.g., the first hinge structure 304 or the second hinge structure 305 of FIG. 3A) from the second state, e.g., a state in which the first hinge structure (e.g., the first hinge structure 304 of FIG. 3A) is folded, and the second hinge structure (e.g., the second hinge structure 305 of FIG. 3A) is unfolded to the first state, e.g., a state in which the first hinge structure (e.g., the first hinge structure 304 of FIG. 3A) and the second hinge structure (e.g., the second hinge structure 305 of FIG. 3A) both are folded, after displaying the second execution screen 502 on the display module 160 by operation 1305. For example, the electronic device 101 may execute the third application and allocate the selected object, e.g., the first object 511, to the third application. The third application may configure the third execution screen 1403 using the allocated first object 511, and the electronic device 101 may display the configured third execution screen 1403. For example, as disclosed in detail in the description of operation 405 of FIG. 4, in the embodiment of FIG. 14, the first object 511, e.g., an image file, included in the first execution screen 501 of the first application which is a web browsing application may be selected. The electronic device 101 may allocate the first object 511, e.g., an image file, to a second application, e.g., a gallery application. The gallery application may configure the second execution screen 502 including the first object 511, e.g., an image file, and the electronic device 101 may display the configured second execution screen 502. The electronic device 101 may allocate the first object 511, e.g., an image file, to a third application, e.g., a message application. The message application may configure a third execution screen 1403 including a message input screen including the allocated image file and a virtual keyboard screen used for message input, and the electronic device 101 may display the configured third execution screen 1403. The third application may configure the third application execution screen using the selected object, e.g., entire information about the first object 511 or partial information. Meanwhile, the above-described scheme of processing the allocated object of the message application is merely an example, and it will be appreciated by one of ordinary skill in the art that the scheme of processing the allocated object may be configured to differ per application.

Figure 15:
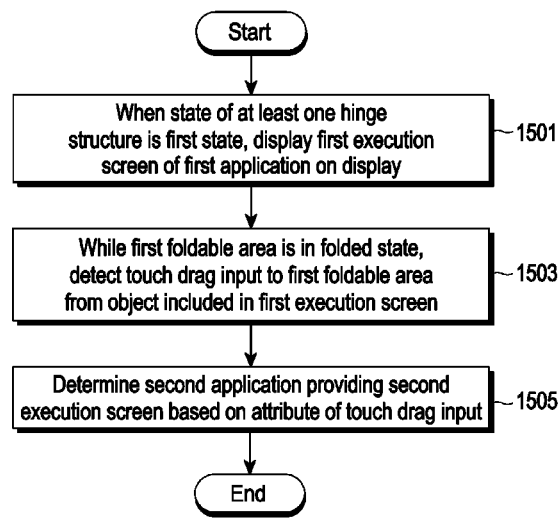
FIG. 15 is a flowchart illustrating a method for operating an electronic device according to an example embodiment.
Figure 17A:
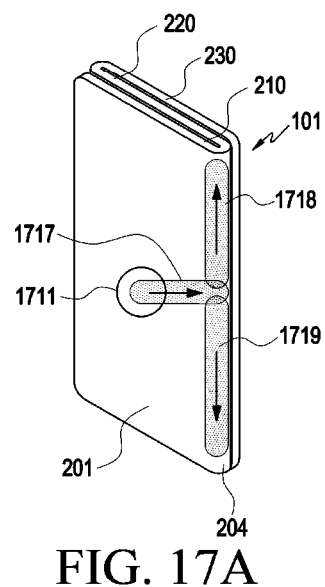
FIG. 17A is a view illustrating operations of an electronic device according to an example embodiment.

FIG. 15 is a flowchart illustrating a method for operating an electronic device according to an embodiment. The embodiment of FIG. 15 is described with reference to FIG. 17A. FIG. 17A is a view illustrating operations of an electronic device according to an embodiment.

According to an embodiment, referring to FIG. 15, in operation 1501, the electronic device 101 (e.g., the processor 120 of FIG. 1) may display a first execution screen (e.g., the first execution screen 501 of FIG. 5) of a first application on the display module 160 when the hinge structure (e.g., the first hinge structure 304 or the second hinge structure 305 of FIG. 3A) provided in the electronic device 101 is in a first state. For example, operation 1501 may be described similarly to operation 401 of FIG. 4.

According to an embodiment, referring to FIG. 15, in operation 1503, the electronic device 101 may detect a touch drag input (e.g., 523 of FIG. 5) to the first foldable area (e.g., the first foldable area 204 of FIG. 5) from the object (e.g., the first object 511 of FIG. 5) included in the first execution screen (e.g., the first execution screen 501 of FIG. 5) of the first application while the first foldable area (e.g., the first foldable area 204 of FIG. 5) is in the folded state. For example, operation 1503 may be described similarly to operation 403 of FIG. 4.

According to an embodiment, referring to FIG. 15, in operation 1505, the electronic device 101 may determine a second application providing the second execution screen (e.g., the second execution screen 502 of FIG. 5) based on the attribute of the touch drag input (e.g., 523 of FIG. 5) to the first foldable area (e.g., the first foldable area 204 of FIG. 5) from the object (e.g., the first object 511 of FIG. 5) included in the first execution screen (e.g., the first execution screen 501 of FIG. 5) of the first application.

For example, referring to FIG. 17A, according to an embodiment, the electronic device 101 may determine the second application providing the second execution screen (e.g., the second execution screen 502 of FIG. 5) based on the direction (e.g., 1718 or 1719) where the touch drag input 1717 to the first foldable area 204 from the object (e.g., the first object 1711) included in the first execution screen (e.g., the first execution screen 501 of FIG. 5) of the first application displayed in the first area 201 of the display module 160 is detected. For example, an execution application corresponding to the direction (e.g., 1718 or 1719) where the touch drag input 1717 to the first foldable area 204 from the object (e.g., the first object 1711) is detected may be preset. For example, the execution application may be preset based on the attribute type (e.g., text, image, or link attribute) of the object or may be set or changed by the user. For example, in the embodiment of FIG. 17A, when the gallery application is preset as the execution application corresponding to the first direction 1718, the electronic device 101 may determine that the gallery application is the second application providing the second execution screen (e.g., the second execution screen 502 of FIG. 5) based on the direction where the touch drag input 1717 to the first foldable area 204 from the first object 1711 is detected being the first direction 1718. The electronic device 101 may execute the gallery application and allocate an object, e.g., the first object 1711, to the gallery application. The gallery application may configure an execution screen using the allocated object, e.g., the first object 1711, and the electronic device 101 may display the configured execution screen.

Figure 16:
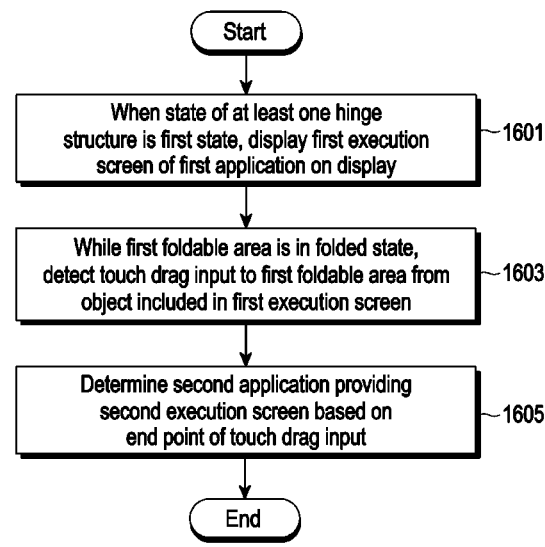
FIG. 16 is a flowchart illustrating a method for operating an electronic device according to an example embodiment.
Figure 17B:
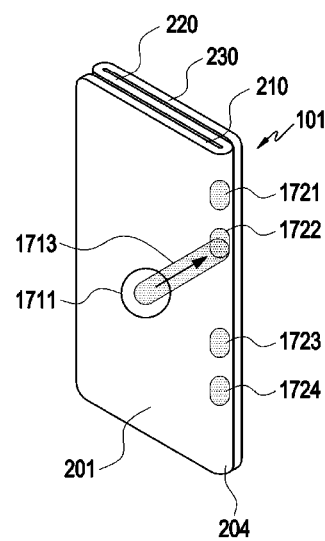
FIG. 17B is a view illustrating operations of an electronic device according to an example embodiment.

FIG. 16 is a flowchart illustrating a method for operating an electronic device according to an embodiment. The embodiment of FIG. 16 is described with reference to FIG. 17B. FIG. 17B is a view illustrating operations of an electronic device according to an embodiment.

According to an embodiment, referring to FIG. 16, in operation 1601, the electronic device 101 (e.g., the processor 120 of FIG. 1) may display a first execution screen (e.g., the first execution screen 501 of FIG. 5) of a first application on the display module 160 when the hinge structure (e.g., the first hinge structure 304 or the second hinge structure 305 of FIG. 3A) provided in the electronic device 101 is in a first state. For example, operation 1601 may be described similarly to operation 401 of FIG. 4.

According to an embodiment, referring to FIG. 16, in operation 1603, the electronic device 101 may detect a touch drag input (e.g., 523 of FIG. 5) to the first foldable area (e.g., the first foldable area 204 of FIG. 5) from the object (e.g., the first object 511 of FIG. 5) included in the first execution screen (e.g., the first execution screen 501 of FIG. 5) of the first application while the first foldable area (e.g., the first foldable area 204 of FIG. 5) is in the folded state. For example, operation 1603 may be described similarly to operation 403 of FIG. 4.

According to an embodiment, referring to FIG. 16, in operation 1605, the electronic device 101 may determine a second application providing the second execution screen (e.g., the second execution screen 502 of FIG. 5) based on the attribute of the touch drag input (e.g., 523 of FIG. 5) to the first foldable area (e.g., the first foldable area 204 of FIG. 5) from the object (e.g., the first object 511 of FIG. 5) included in the first execution screen (e.g., the first execution screen 501 of FIG. 5) of the first application.

For example, referring to FIG. 17B, according to an embodiment, the electronic device 101 may determine the second application providing the second execution screen (e.g., the second execution screen 502 of FIG. 5) based on the attribute of the touch drag input 1713 to the first foldable area 204 from the object (e.g., the first object 1711) included in the first execution screen (e.g., the first execution screen 501 of FIG. 5) of the first application displayed in the first area 201 of the display module 160, e.g., the end point of the touch drag input 1713 Meanwhile, the electronic device 101 may be configured to determine an application based on a position associated with the touch drag input 1713, e.g., the end point. For example, the first foldable area 204 of the display module 160 may include at least one set area (e.g., first set area 1721, second set area 1722, third set area 1723, or fourth set area 1724). At least one execution application (e.g., first execution application, second execution application, third execution application, or fourth execution application) respectively corresponding to the at least one set area (e.g., first set area 1721, second set area 1722, third set area 1723, or fourth set area 1724) may be preset. For example, the at least one execution application may be preset based on the attribute type (e.g., text, image, or link attribute) of the object and be set or changed by the user. When the touch drag input 1713 is a touch drag input to a specific set area (e.g., the second set area 1722) from the first object 1711, the electronic device 101 may determine that a specific execution application (e.g., the second execution application) preset corresponding to the specific set area (e.g., the second set area 1722) is the second application providing the second execution screen (e.g., the second execution screen 502 of FIG. 5). For example, in the embodiment of FIG. 17B, when the message application is the execution application corresponding to the second set area 1722, the electronic device 101 may determine that the message application is the second application providing the second execution screen (e.g., the second execution screen 502 of FIG. 5) based on detecting the touch drag input 1713 to the second set area 1722 from the first object 1711. The message application may configure an execution screen including a message input screen including the first object 1711 and a virtual keyboard screen, and the electronic device 101 may display the configured execution screen. Meanwhile, the above-described scheme of processing the allocated object of the message application is merely an example, and it will be appreciated by one of ordinary skill in the art that the scheme of processing the allocated object may be configured to differ per application.

Figure 17C:
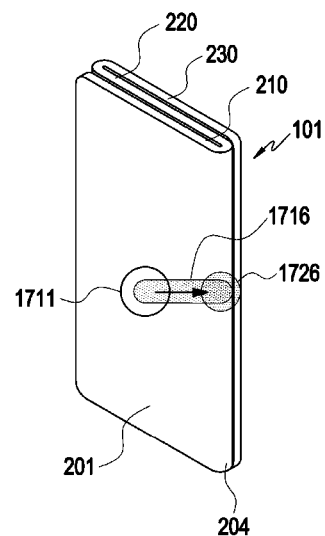
FIG. 17C is a view illustrating operations of an electronic device according to an example embodiment.

FIG. 17C is a view illustrating operations of an electronic device according to an embodiment.

In an embodiment, referring to FIG. 17C, the electronic device 101 may detect a touch drag input (e.g., 1716) to the first foldable area 204 from the object (e.g., the first object 1711) included in the first execution screen (e.g., the first execution screen 501 of FIG. 5) of the first application displayed in the first area 201 of the display module 160 and detect a long touch input (e.g., 1726) to the first foldable area 204. For example, the electronic device 101 may store information related to the first object 1711 in the temporary storage of the electronic device 101 based on detecting the touch drag input (e.g., 1716) to the first foldable area 204 from the first object 1711 and detecting the long touch input (e.g., 1726) to the first foldable area 204. Or, for example, the electronic device 101 may display, in the first foldable area 204, a list (e.g., 880 of FIG. 8) including the icon corresponding to the first object 1711 based on detecting the touch drag input (e.g., 1716) to the first foldable area 204 from the first object 1711 and detecting the long touch input (e.g., 1726) to the first foldable area 204. Further, for example, detecting the touch drag input 523 of FIG. 5 may include detecting the touch drag input 1716 and long touch input 1726 of FIG. 17C.

Figure 17D:
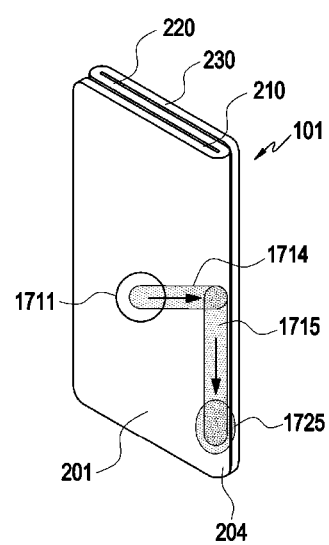
FIG. 17D is a view illustrating operations of an electronic device according to an example embodiment.

FIG. 17D is a view illustrating operations of an electronic device according to an embodiment.

In an embodiment, referring to FIG. 17D, the electronic device 101 may detect a touch drag input (e.g., 1714) to the first foldable area 204 from the object (e.g., the first object 1711) included in the first execution screen (e.g., the first execution screen 501 of FIG. 5) of the first application displayed in the first area 201 of the display module 160, detect a touch drag input (e.g., 1715) to the first foldable area 204, and detect a long touch input to a specific area (e.g., 1725) included in the first foldable area 204. For example, the electronic device 101 may store information related to the first object 1711 in the temporary storage of the electronic device 101, based on detecting a touch drag input (e.g., 1714) to the first foldable area 204 from the first object 1711, detecting a touch drag input (e.g., 1715) to the first foldable area 204, and detecting the long touch input to the specific area (e.g., 1725) included in the first foldable area 204. Or, for example, the electronic device 101 may display, in the first foldable area 204, a list (e.g., 880 of FIG. 8) including the icon corresponding to the first object 1711 based on detecting the touch drag input (e.g., 1714) to the first foldable area 204 from the first object 1711, detecting the touch drag input (e.g., 1715) to the first foldable area 204, and detecting the long touch input to the specific area (e.g., 1725) included in the first foldable area 204. Further, for example, detecting the touch drag input 523 of FIG. 5 may include detecting the touch drag input 1714, the touch drag input 1715, and the long touch input (e.g., long touch input to the specific area 1725) of FIG. 17D.

Figure 18:
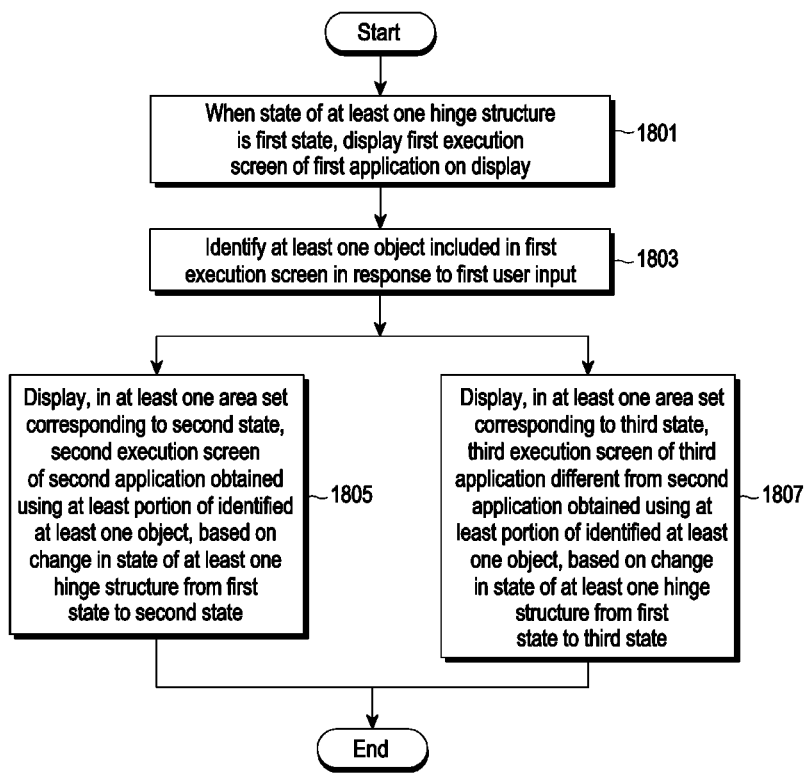
FIG. 18 is a flowchart illustrating a method for operating an electronic device according to an example embodiment.
Figure 19:
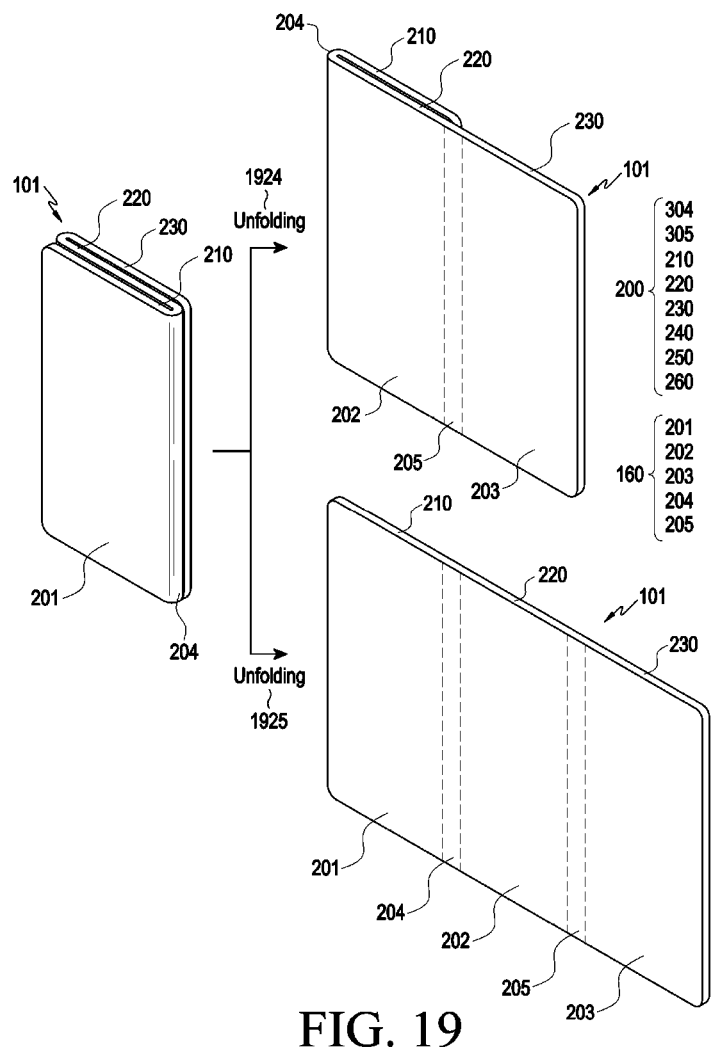
FIG. 19 is a perspective view illustrating operations of an electronic device according to an example embodiment.
Figure 20:
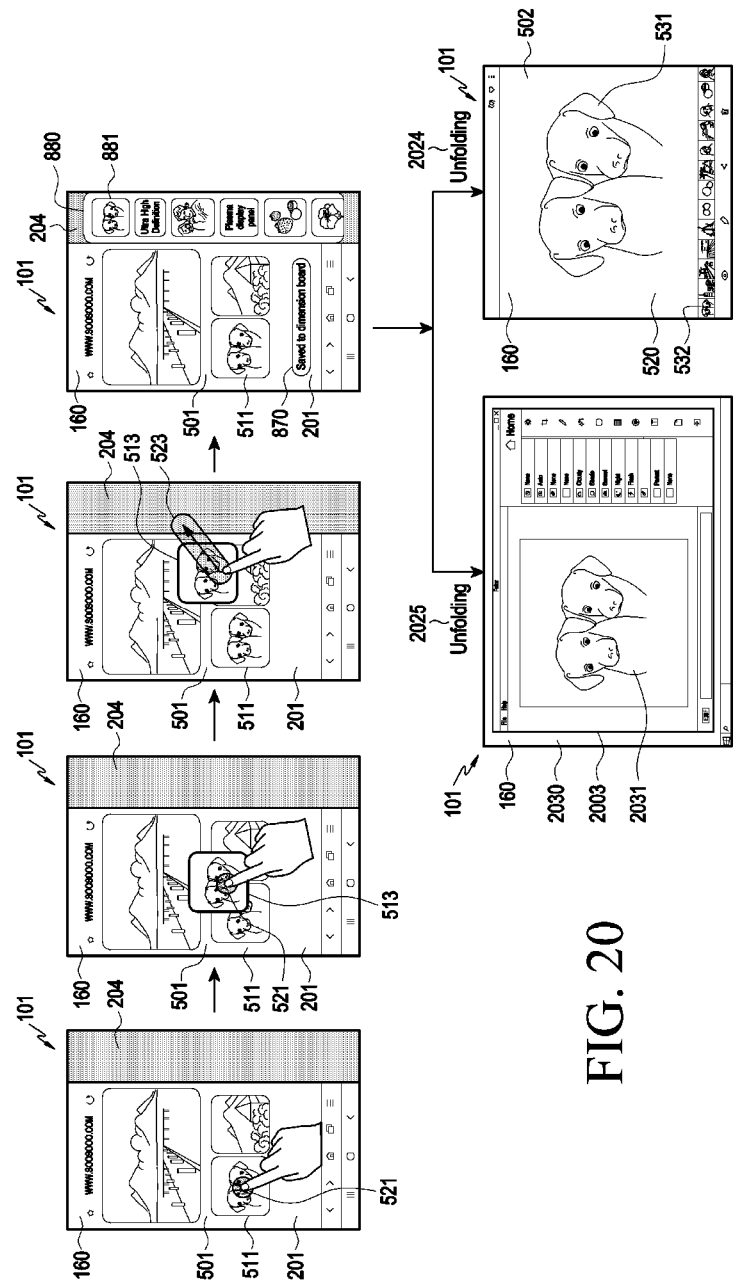
FIG. 20 is a view illustrating operations of an electronic device according to an example embodiment.
Figure 21:
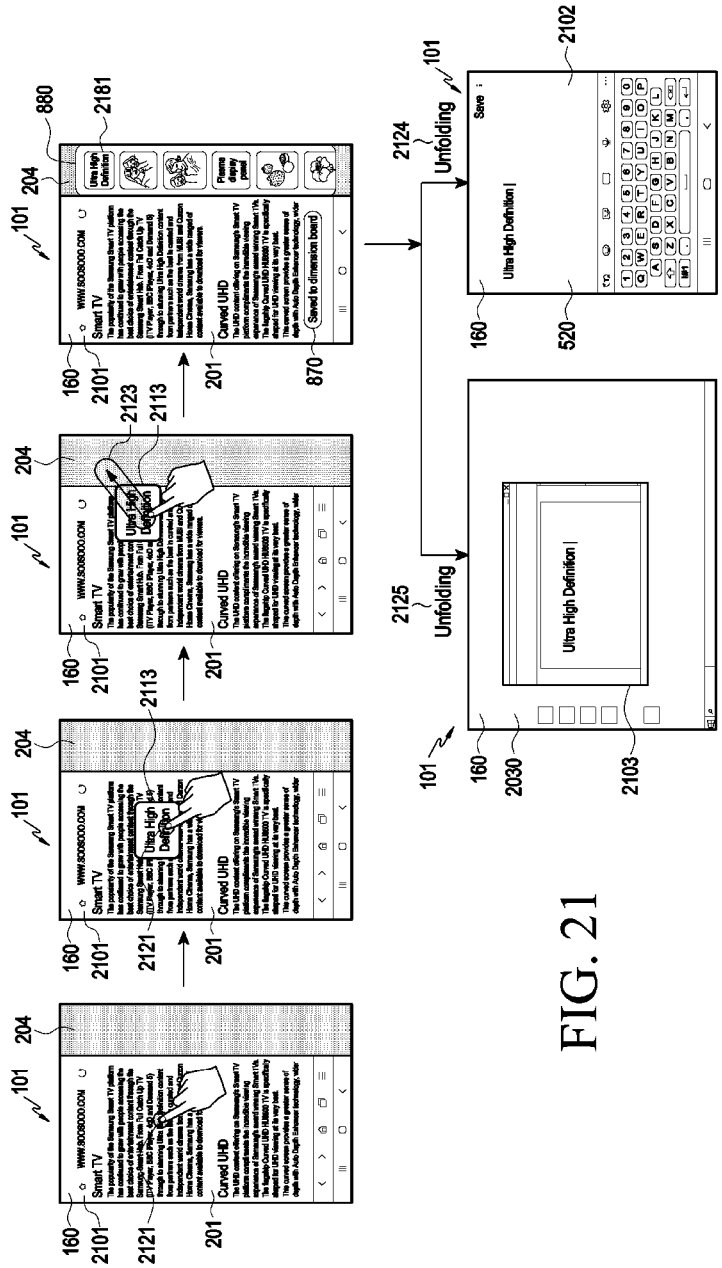
FIG. 21 is a view illustrating operations of an electronic device according to an example embodiment.

FIG. 18 is a flowchart illustrating a method for operating an electronic device according to an embodiment. The embodiment of FIG. 18 is described with reference to FIGS. 19, 20, and 21. FIG. 19 is a perspective view illustrating operations of an electronic device according to an embodiment. FIG. 20 is a view illustrating operations of an electronic device according to an embodiment. FIG. 21 is a view illustrating operations of an electronic device according to an embodiment.

According to an embodiment, referring to FIG. 19, the specific area of the display module 160 exposed to the front surface of the electronic device 101 viewed by the user is determined depending on the unfolded state or folded state of the hinge structure (e.g., the first hinge structure 304 or the second hinge structure 305 of FIG. 3A), and the scheme of determining the specific area of the display module 160 exposed to the front surface of the electronic device 101 viewed by the user may easily be understood from the above-described embodiments. For example, the electronic device 101 may activate the specific area of the display module 160 and deactivate another specific area of the display module 160 depending on the unfolded state or folded state of the hinge structure (e.g., the first hinge structure 304 or the second hinge structure 305 of FIG. 3A). For example, deactivating the specific area of the display module 160 may indicate deactivating the touch sensing and/or screen display in the specific area of the display module 160, and activating the specific area of the display module 160 may indicate activating the touch sensing and/or screen display in the specific area of the display module 160. For example, when the first hinge structure (e.g., the first hinge structure 304 of FIG. 3A) and the second hinge structure (e.g., the second hinge structure 305 of FIG. 3A) both are in the folded state, the electronic device 101 may deactivate the second area 202, third area 203, and second foldable area 205 of the display module 160. For example, when the first hinge structure (e.g., the first hinge structure 304 of FIG. 3A) is in the folded state, and the second hinge structure (e.g., the second hinge structure 305 of FIG. 3A) is in the unfolded state, the electronic device 101 may deactivate the first area 201 of the display module 160. For example, the electronic device 101 may deactivate the second area 202, third area 203, and second foldable area 205 of the display module 160 and activate the entire or partial area of the first area 201 and first foldable area 204 of the display module 160 in the state in which the first hinge structure (e.g., the first hinge structure 304 of FIG. 3A) and the second hinge structure (e.g., the second hinge structure 305 of FIG. 3A) both are folded and then, based on a change (unfolding) in the state of the hinge structure (e.g., the first hinge structure 304 or the second hinge structure 305 of FIG. 3A) into a state in which the first hinge structure (e.g., the first hinge structure 304 of FIG. 3A) is folded, and the second hinge structure (e.g., the second hinge structure 305 of FIG. 3A) is unfolded, deactivate the first area 201 of the display module 160 and activate the entire or partial area of the second area 202, third area 203, second foldable area 205, and first foldable area 204 of the display module 160. Meanwhile, activating and deactivating the specific area of the display module 160 is an exemplary embodiment, and it will be appreciated by one of ordinary skill in the art that activation and deactivation of the specific area of the display module 160 may be performed depending on the change of the state of the hinge structure (e.g., the first hinge structure 304 or the second hinge structure 305 of FIG. 3A) of the electronic device 101.

According to an embodiment, referring to FIGS. 18, 19, 20, and 21, in operation 1801, the electronic device 101 (e.g., the processor 120 of FIG. 1) may display the first execution screen 501 of the first application on the display module 160 when the state of the hinge structure (e.g., the first hinge structure 304 or the second hinge structure 305 of FIG. 3A) provided in the electronic device 101 is the first state. For example, operation 1801 may be described similarly to operation 401 of FIG. 4.

According to an embodiment, referring to FIGS. 18, 19, 20, and 21, in operation 1803, while the first foldable area 204 is in the folded state, the electronic device 101 may identify the object (e.g., the first object 511) included in the first execution screen 501 of the first application. For example, the electronic device 101 may identify the object (e.g., the first object 511) included in the first execution screen 501 of the first application in response to a user input. For example, the electronic device 101 may identify the object (e.g., the first object 511) included in the first execution screen 501 of the first application in response to a user input, e.g., the touch drag input to the edge area of the first area 201 from the object (e.g., the first object 511) or the touch drag input to the foldable area (e.g., the first foldable area 204) adjacent to the first area 201 where the first execution screen 501 is displayed from the object (e.g., the first object 511). For example, the touch drag input to the folding area (e.g., the first foldable area 204) adjacent to the first area 201 where the first execution screen 501 is displayed from the object (e.g., the first object 511) may be described similarly to the description of the touch drag input (e.g., 523 of FIG. 5) associated with operation 403 of FIG. 4. Further, a specific embodiment of the touch drag input to the foldable area (e.g., the first foldable area 204) or the touch drag input to the edge area is described below with reference to FIG. 22.

According to an embodiment, referring to FIGS. 18, 19, 20, and 21, after operation 1803 is performed, the electronic device 101 may display, in the first foldable area 204, a list (e.g., the list 880) including an icon (e.g., the first icon 881) corresponding to the object (e.g., the first object 511), based on detecting the touch drag input 523 to the first foldable area 204 from the object (e.g., the first object 511) included in the first execution screen 501 of the first application and detecting the folded state of the first foldable area 204. For example, the operation of displaying a list (e.g., the list 880) including the icon (e.g., the first icon 881) corresponding to the object (e.g., the first object 511) in the first foldable area 204 may be described similarly to operation 705 of FIG. 7. Meanwhile, the operation of displaying the list (e.g., the list 880) including the icon (e.g., the first icon 881) corresponding to the above-described object (e.g., the first object 511) after performing operation 1803 and before performing operation 1805 may be performed or be omitted.

According to an embodiment, referring to FIGS. 18, 19, 20, and 21, in operation 1805, the electronic device 101 may display, on the display module 160, the second execution screen 502 of the second application different from the first application, obtained using at least a portion of the object (e.g., the first object 511) identified, based on a change of the state of the hinge structure (e.g., the first hinge structure 304 or the second hinge structure 305 of FIG. 3A) from the first state to the second state. For example, in response to a user input, the electronic device 101 may identify the object (e.g., the first object 511) included in the first execution screen 501 of the first application and then, based on a change (e.g., unfolding 2024) of the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the second state, e.g., a state in which the first hinge structure (e.g., the first hinge structure 304 of FIG. 3A) is folded, and the second hinge structure (e.g., the second hinge structure 305 of FIG. 3A) is unfolded, display the second execution screen 502 of the second application different from the first application, obtained using at least a portion of the identified object (e.g., the first object 511) in a specific area 520, e.g., an area including the second area 202, third area 203, and second foldable area 205 of the display module 160, of the display module 160 set corresponding to the second state of the hinge structure (e.g., the first hinge structure 304 or the second hinge structure 305 of FIG. 3A), a state in which the first hinge structure (e.g., the first hinge structure 304 of FIG. 3A) is folded, and the second hinge structure (e.g., the second hinge structure 305 of FIG. 3A) is unfolded. Meanwhile, the specific area (e.g., 520) of the display module 160 set corresponding to the second state of the hinge structure (e.g., the first hinge structure 304 or the second hinge structure 305 of FIG. 3A), e.g., a state in which the first hinge structure (e.g., the first hinge structure 304 of FIG. 3A)

is folded, and the second hinge structure (e.g., the second hinge structure 305 of FIG. 3A) is unfolded may include the whole or part of the first foldable area 204. In the embodiment of FIG. 20, e.g., the operation of displaying the second execution screen 502 of the second application different from the first application on the display module 160 may be described similarly to the operation of displaying the second execution screen 502 of the second application different from the first application on the display module 160 in operation 405 of FIG. 4. For example, in the embodiment of FIG. 21, a specific object, e.g., specific text, included in the first execution screen 501 of the first application which is the web browsing application may be identified. In response to a touch 2121, the electronic device 101 may display another object 2113 indicating that the specific object, e.g., specific text, is identified, corresponding to the position of the touch 2121. The other object 2113 is an object including the identified specific object, e.g., identified text, but its implementation is not limited. The operation of displaying and moving the other object 2113 by the electronic device 101 in FIG. 21 may be described similarly to the operation of displaying and moving the other object 2113 by the electronic device 101 in FIG. 5. The electronic device 101 may display a list 880 including the icon 2181 corresponding to the specific object, e.g., specific text, in the first foldable area 204, based on detecting the touch drag input 2123 to the first foldable area 204 from the specific object, e.g., specific text. The electronic device 101 may allocate the specific object, e.g., specific text to the second application, e.g., the message application. The message application may configure a second execution screen 2102 including a message input screen including the allocated specific text and a virtual keyboard screen used for message input, and the electronic device 101 may display the configured second execution screen 2102 in the specific area (e.g., 520) of the display module 160.

According to an embodiment, referring to FIGS. 18, 19, 20, and 21, in operation 1807, the electronic device 101 may display, on the display module 160, the third execution screen 502 of the third application different from the second application, obtained using at least a portion of the object (e.g., the first object 511) identified, based on a change of the state of the hinge structure (e.g., the first hinge structure 304 or the second hinge structure 305 of FIG. 3A) from the first state to the third state. For example, in response to a user input, the electronic device 101 may identify the object (e.g., the first object 511) included in the first execution screen 501 of the first application and then, based on a change (e.g., unfolding 2025) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the third state, e.g., a state in which the first hinge structure (e.g., the first hinge structure 304 of FIG. 3A) and the second hinge structure (e.g., the second hinge structure 305 of FIG. 3A) both are unfolded, display the third execution screen 2003 of the third application different from the second application obtained using at least a portion of the identified object (e.g., the first object 511), in the specific area 2030 (e.g., an area including the first area 201, second area 202, third area 203, first foldable area 204, and second foldable area 205 of the display module 160) of the display module 160 set corresponding to the third state of the hinge structure (e.g., the first hinge structure 304 or the second hinge structure 305 of FIG. 3A), e.g., a state in which the first hinge structure (e.g., the first hinge structure 304 of FIG. 3A) and the second hinge structure (e.g., the second hinge structure 305 of FIG. 3A) both are unfolded. For example, the electronic device 101 may execute the third application and allocate the identified object, e.g., the first object 511, to the third application. The third application may configure the third execution screen 2003 using the allocated first object 511, and the electronic device 101 may display the configured third execution screen 2003. For example, in the embodiment of FIG. 20, the first object 511, e.g., an image file, included in the first execution screen 501 of the first application which is a web browsing application may be identified. The electronic device 101 may allocate the first object 511, e.g., an image file, to a third application, e.g., an image editing application. The image editing application may configure a third execution screen 2003 including a tool including the icon for modifying the image file and the allocated image file as the entire screen 2031, and the electronic device 101 may display the configured third execution screen 2003. The third application may configure the third application execution screen using the identified object, e.g., entire information about the first object 511 or partial information. For example, in the embodiment of FIG. 21, a specific object, e.g., specific text, included in the first execution screen 501 of the first application which is the web browsing application may be identified. The electronic device 101 may allocate the specific object, e.g., specific text to the third application, e.g., the text editing application. The text editing application may configure a third execution screen 2003 including a tool including the icon for modifying text and the allocated specific text, and the electronic device 101 may display the configured third execution screen 2003. Meanwhile, the third application may configure the third application execution screen using the identified object, e.g., entire information about the text or partial information.

Figure 22:
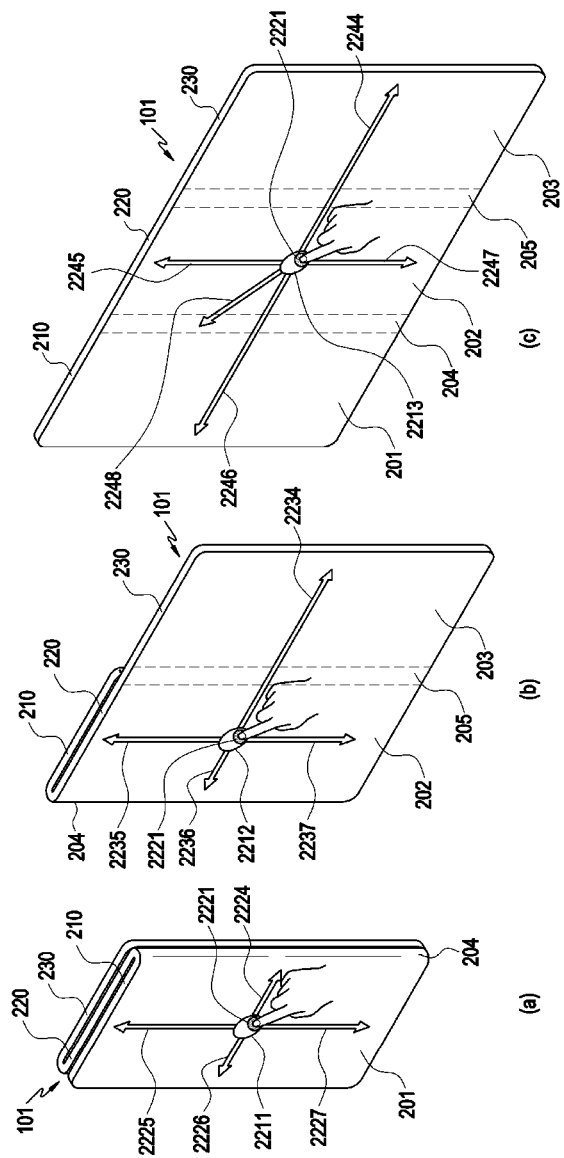
FIG. 22 is a view illustrating operations of an electronic device according to an example embodiment.

FIG. 22 is a view illustrating operations of an electronic device according to an embodiment. For example, referring to FIG. 22, a specific embodiment of the touch drag input (e.g., 523) disclosed in FIGS. 4 and 5 or a specific embodiment of the user input disclosed in the embodiment of FIGS. 18 and 20 may be understood.

According to an embodiment, referring to FIG. 22, the electronic device 101 may detect a touch drag input to the foldable area (e.g., the first foldable area 204 or second foldable area 205) or edge area included in the active area of the display module 160. The edge area of the display area 160 may indicate an area positioned at the edge in the specific area of the display area 160 exposed to the front surface of the electronic device 101 viewed by the user depending on the state of the hinge structure (e.g., the first hinge structure 304 or the second hinge structure 305 of FIG. 3A), and when the exposed area of the display area 160 has a substantially rectangular shape, the edge area may include at least one of an upper edge area, a lower edge area, a right edge area, or a left edge area. Further, based on the shape of the exposed area of the display area 160, the edge area may include an upper edge area, a lower edge area, a right edge area, a left edge area, an upper-left edge area, an upper-right edge area, a lower-left edge area, or a lower-right edge area.

According to an embodiment, referring to FIG. 22(*a*), the electronic device 101 may activate the entire or partial area of the first area 201 and first foldable area 204 of the display module 160 when the state of the hinge structure (e.g., the first hinge structure 304 or the second hinge structure 305 of FIG. 3A) is the first state, e.g., a state in which the first hinge structure (e.g., the first hinge structure 304 of FIG. 3A) and the second hinge structure (e.g., the second hinge structure 305 of FIG. 3A) both are folded. For example, in the embodiment of FIG. 22(a), the electronic device 101 may detect a touch drag input 2224 to the first foldable area 204 of the display module 160 from the object (e.g., the object 2211) included in the activated area (e.g., the first area 201) of the display module 160 and detect a touch drag input to the edge area of the display module 160 (e.g., a touch drag input 2225 to the upper edge area, a touch drag input 2226 to the left edge area, or a touch drag input 2227 to the lower edge area) from the object (e.g., the object 2211) included in the activated area (e.g., the first area 201) of the display module 160. For example, in the embodiment of FIG. 22(a), the electronic device 101 may identify a touch drag input 2224 to the first foldable area 204 of the display module 160 from the object (e.g., the object 2211) included in the activated area (e.g., the first area 201) of the display module 160 or a touch drag input to the edge area of the display module 160 (e.g., a touch drag input 2225 to the upper edge area, a touch drag input 2226 to the left edge area, or a touch drag input 2227 to the lower edge area) from the object (e.g., the object 2211) included in the activated area (e.g., the first area 201) of the display module 160, as a user input for identifying the object (e.g., the object 2211). For example, the electronic device 101 may perform operation 1803 of FIG. 18 based on identifying the touch drag input (e.g., 2224, 2225, 2226, or 2227) as the user input for identifying an object (e.g., the object 2211).

According to an embodiment, referring to FIG. 22(b), the electronic device 101 may activate the entire or partial area of the second area 202, third area 203, second foldable area 205, and first foldable area 204 of the display module 160 when the state of the hinge structure (e.g., the first hinge structure 304 or the second hinge structure 305 of FIG. 3A) is the second state, e.g., a state in which the first hinge structure (e.g., the first hinge structure 304 of FIG. 3A) is folded, and the second hinge structure (e.g., the second hinge structure 305 of FIG. 3A) is unfolded. For example, in the embodiment of FIG. 22(b), the electronic device 101 may detect a touch drag input 2236 to the first foldable area 204 of the display module 160 from the object (e.g., the object 2212) included in the activated area (e.g., the second area 202) of the display module 160 and detect a touch drag input to the edge area of the display module 160 (e.g., a touch drag input 2235 to the upper edge area, a touch drag input 2234 to the right edge area, or a touch drag input 2237 to the lower edge area) from the object (e.g., the object 2212) included in the activated area (e.g., the second area 202) of the display module 160. For example, in the embodiment of FIG. 22(b), the electronic device 101 may identify a touch drag input 2236 to the first foldable area 204 of the display module 160 from the object (e.g., the object 2212) included in the activated area (e.g., the second area 202) of the display module 160 or a touch drag input to the edge area of the display module 160 (e.g., a touch drag input 2235 to the upper edge area, a touch drag input 2234 to the right edge area, or a touch drag input 2237 to the lower edge area) from the object (e.g., the object 2212) included in the activated area (e.g., the second area 202) of the display module 160, as a user input for identifying the object (e.g., the object 2212). For example, the electronic device 101 may perform operation 1803 of FIG. 18 based on identifying the touch drag input (e.g., 2234, 2235, 2236, or 2237) as the user input for identifying an object (e.g., the object 2212).

According to an embodiment, referring to FIG. 22(c), the electronic device 101 may activate the first area 201, second area 202, third area 203, first foldable area 204, and second foldable area 205 of the display module 160 when the state of the hinge structure (e.g., the first hinge structure 304 or the second hinge structure 305 of FIG. 3A) is the third state, e.g., a state in which the first hinge structure (e.g., the first hinge structure 304 of FIG. 3A) and the second hinge structure (e.g., the second hinge structure 305 of FIG. 3A) both are unfolded. For example, in the embodiment of FIG. 22(c), the electronic device 101 may detect a touch drag input to the edge area of the display module 160 (e.g., a touch drag input 2245 to the upper edge area, a touch drag input 2244 to the right edge area, a touch drag input 2246 to the left edge area, or a touch drag input 2247 to the lower edge area) from the object (e.g., the object 2213) included in the activated area (e.g., the second area 202) of the display module 160. For example, in the embodiment of FIG. 22(c), the electronic device 101 may identify the touch drag input to the edge area of the display module 160 (e.g., the touch drag input 2245 to the upper edge area, the touch drag input 2244 to the right edge area, the touch drag input 2246 to the left edge area, or the touch drag input 2247 to the lower edge area) from the object (e.g., the object 2213) included in the activated area (e.g., the second area 202) of the display module 160, as a user input for identifying the object (e.g., the object 2213). For example, the electronic device 101 may perform operation 1803 of FIG. 18 based on identifying the touch drag input (e.g., 2244, 2245, 2246, or 2247) as the user input for identifying an object (e.g., the object 2213).

Meanwhile, according to an embodiment, referring to FIGS. 22(a), (b), and (c), the electronic device 101 may determine the operation to be performed corresponding to the touch drag input (e.g., 2224 of FIG. 22(a), 2236 of FIG. 22(b), or 2248 of FIG. 22(c)) to the first foldable area 204 from the object (e.g., the object 2211 of FIG. 22(a), the object 2212 of FIG. 22(b), or the object 2213 of FIG. 22(c)) based on the state of the hinge structure (e.g., the first hinge structure 304 or the second hinge structure 305 of FIG. 3A). For example, in the embodiment of FIG. 22(a), the electronic device 101 may perform operation 1803 of FIG. 18, based on identifying the touch drag input 2224 to the first foldable area 204 of the display module 160 from the object (e.g., the object 2211) included in the activated area (e.g., the first area 201) of the display module 160 as a user input for identifying the object (e.g., the object 2211). For example, in the embodiment of FIG. 22(b), the electronic device 101 may perform operation 1803 of FIG. 18, based on identifying the touch drag input 2236 to the first foldable area 204 of the display module 160 from the object (e.g., the object 2212) included in the activated area (e.g., the second area 202) of the display module 160 as a user input for identifying the object (e.g., the object 2212). Meanwhile, in the embodiment of FIG. 22(c), the electronic device 101 may display the object (e.g., the object 2213) in the position corresponding to the end point of the touch drag input 2248, based on detecting the touch drag input 2248 to the first foldable area 204 of the display module 160 from the object (e.g., the object 2213) included in the activated area (e.g., the second area 202) of the display module 160.

Figure 23:
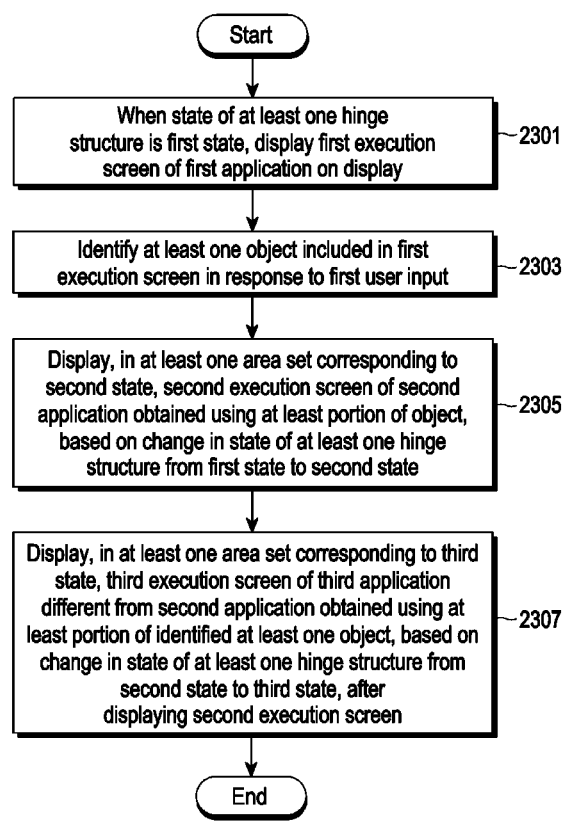
FIG. 23 is a flowchart illustrating a method for operating an electronic device according to an example embodiment.
Figure 24:
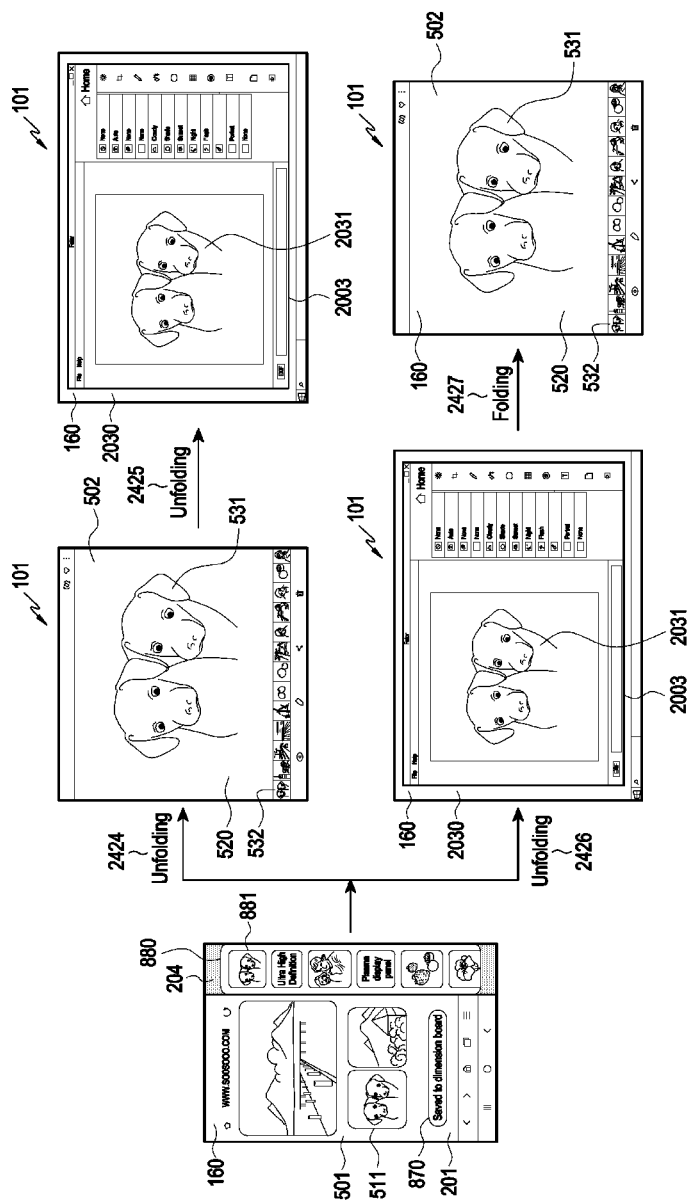
FIG. 24 is a view illustrating operations of an electronic device according to an example embodiment.

FIG. 23 is a flowchart illustrating a method for operating an electronic device according to an embodiment. The embodiment of FIG. 23 is described with reference to FIG. 24. FIG. 24 is a view illustrating operations of an electronic device according to an embodiment.

According to an embodiment, referring to FIGS. 23 and 24, in operation 2301, the electronic device 101 (e.g., the processor 120 of FIG. 1) may display a first execution screen 501 of a first application on the display module 160 when the hinge structure (e.g., the first hinge structure 304 or the second hinge structure 305 of FIG. 3A) provided in the electronic device 101 is in a first state. For example, operation 2301 may be described similarly to operation 401 of FIG. 4.

According to an embodiment, referring to FIGS. 23 and 24, in operation 2303, while the first foldable area 204 is in the folded state, the electronic device 101 may identify the object (e.g., the first object 511) included in the first execution screen 501 of the first application. For example, the electronic device 101 may identify the object (e.g., the first object 511) included in the first execution screen 501 of the first application in response to a user input. For example, operation 1803 may be described similarly to operation 402 of FIG. 4.

According to an embodiment, referring to FIGS. 23 and 24, the electronic device 101 may display, in the first foldable area 204, a list (e.g., the list 880) including the icon (e.g., the first icon 881) corresponding to the object (e.g., the first object 511), based on detecting the folded state of the first foldable area 204 and detecting the touch drag input (e.g., 523 of FIG. 5) to the first foldable area 204 from the object (e.g., the first object 511) included in the first execution screen 501 of the first application after performing operation 2203. For example, the operation of displaying a list (e.g., the list 880) including the icon (e.g., the first icon 881) corresponding to the object (e.g., the first object 511) in the first foldable area 204 may be described similarly to operation 705 of FIG. 7. Meanwhile, the operation of displaying the list (e.g., the list 880) including the icon (e.g., the first icon 881) corresponding to the above-described object (e.g., the first object 511) after performing operation 2303 and before performing operation 1805 may be performed or be omitted.

According to an embodiment, referring to FIGS. 23 and 24, in operation 2305, the electronic device 101 may display the second execution screen 502 of the second application from the first application, obtained using at least a portion of the identified object (e.g., the first object 511), based on a change in the state of the hinge structure (e.g., the first hinge structure 304 or the second hinge structure 305 of FIG. 3A) from the first state to the second state, in the specific area 520 of the display module 160 set corresponding to the second state of the hinge structure (e.g., the first hinge structure 304 or the second hinge structure 305 of FIG. 3A). For example, operation 2305 may be described similarly to operation 1805 of FIG. 18.

According to an embodiment, referring to FIGS. 23 and 24, in operation 2307, the electronic device 101 may display the third execution screen 2003 of the third application different from the second application, obtained using at least a portion of the identified object (e.g., the first object 511) in the specific area 2030 of the display module 160 set corresponding to the third state of the hinge structure (e.g., the first hinge structure 304 or the second hinge structure 305 of FIG. 3A), based on a change in the state of the hinge structure (e.g., the first hinge structure 304 or the second hinge structure 305 of FIG. 3A) from the second state to the third state after displaying the second execution screen 502 of the second application on the display module 160. For example, after displaying the second execution screen 502 of the second application on the display module 160, based on a change (e.g., unfolding 2425) in the state of the hinge structure (e.g., the first hinge structure 304 or the second hinge structure 305 of FIG. 3A) from the second state, e.g., a state in which the first hinge structure (e.g., the first hinge structure 304 of FIG. 3A) is folded, and the second hinge structure (e.g., the second hinge structure 305 of FIG. 3A) is unfolded to the third state, e.g., a state in which the first hinge structure (e.g., the first hinge structure 304 of FIG. 3A) and the second hinge structure (e.g., the second hinge structure 305 of FIG. 3A) both are unfolded, the electronic device 101 may display the third execution screen 2003 of the third application different from the second application, obtained using at least a portion of the identified object (e.g., the first object 511), in the specific area 2030 (e.g., an area including the first area 201, second area 202, third area 203, first foldable area 204, and second foldable area 205 of the display module 160) of the display module 160 set corresponding to the third state of the hinge structure (e.g., the first hinge structure 304 or the second hinge structure 305 of FIG. 3A), e.g., a state in which the first hinge structure (e.g., the first hinge structure 304 of FIG. 3A) and the second hinge structure (e.g., the second hinge structure 305 of FIG. 3A) both are unfolded.

Figure 25:
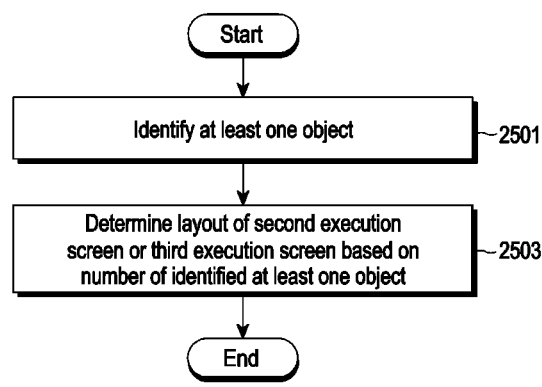
FIG. 25 is a flowchart illustrating a method for operating an electronic device according to an example embodiment.
Figure 26:
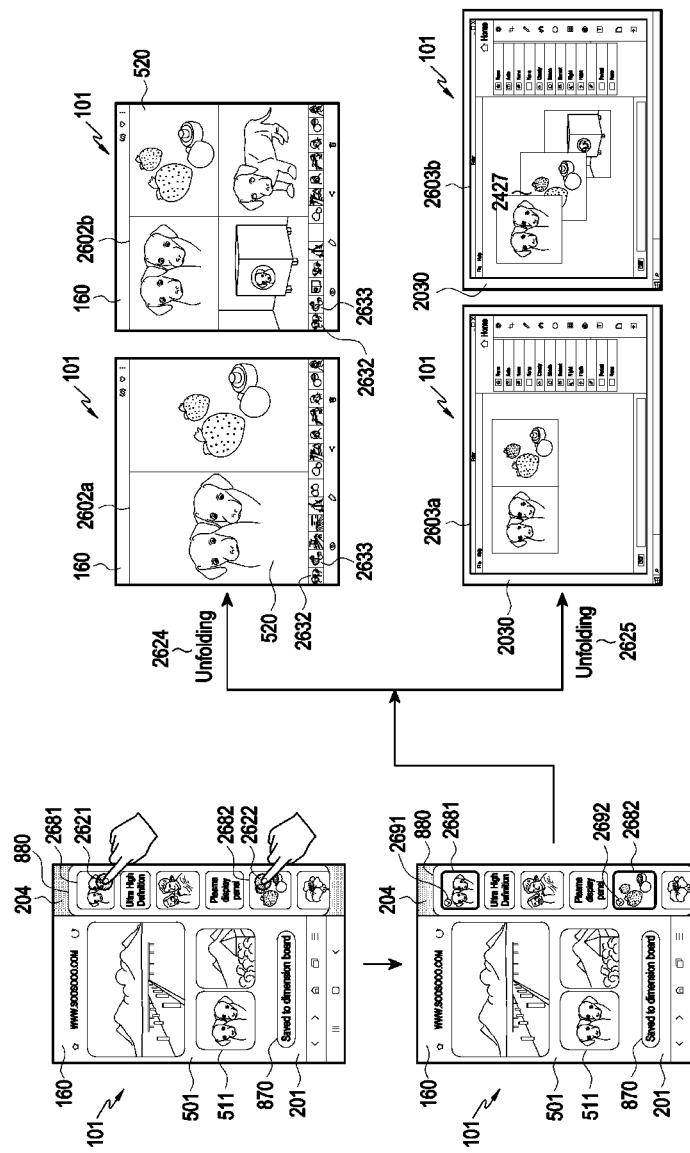
FIG. 26 is a view illustrating operations of an electronic device according to an example embodiment.

FIG. 25 is a flowchart illustrating a method for operating an electronic device according to an embodiment. The embodiment of FIG. 25 is described with reference to FIG. 26. FIG. 26 is a view illustrating operations of an electronic device according to an embodiment.

According to an embodiment, referring to FIGS. 25 and 26, in operation 2501, the electronic device 101 (e.g., the processor 120 of FIG. 1) may identify at least one object. For example, the electronic device 101 may display a list 880 in a specific area (e.g., the first foldable area 204) of the display module 160 in response to a user input. For example, the electronic device 101 may display the list 880 in the specific area (e.g., the first foldable area 204) of the display module 160 in response to a touch drag input (e.g., 523 of FIG. 5) to the specific area (e.g., the first foldable area 204) of the display module 160 from the object (e.g., the first object 511) or in response to an invoke command described below. For example, the list 880 may include at least one icon (e.g., the first icon 2681 or second icon 2682). For example, the first icon 2681 may be an icon corresponding to the first object 511, e.g., an icon indicating that the object (e.g., the first object 511) is stored in the temporary storage, and the second icon 2682 may be an icon corresponding to the second object (not shown), e.g., an icon indicating the second object (not shown) is stored in the temporary storage. Meanwhile, the electronic device 101 may identify at least one object (e.g., the first object 511) in response to a touch 2621 to the icon (e.g., the first icon 2681) corresponding to at least one object (e.g., the first object 511), included in the list 880 displayed in the specific area (e.g., the first foldable area 204) of the display module 160. For example, upon identifying at least one object (e.g., the first object 511) in response to the touch 2621 to the icon (e.g., the first icon 2681) corresponding to the at least one object (e.g., the first object 511) included in the list 880, the electronic device 101 may display an identification mark (e.g., the first identification mark 2691) on the touched icon (e.g., the first icon 2681) included in the list 880. For example, in the embodiment of FIG. 26, the electronic device 101 may display the first identification mark 2691 on the first icon 2681 in response to the touch 2621 to the first icon 2681 included in the list 880 or may display the second identification mark 2692 on the second icon 2682 in response to the touch 2622 to the second icon 2682 included in the list 880.

According to an embodiment, referring to FIGS. 25 and 26, in operation 2503, the electronic device 101 may determine a layout of the third execution screen (e.g., 2603a or 2603b) of the third application, obtained using at least a portion of the identified at least one object or the second execution screen (e.g., 2602a or 2602b) of the second application, obtained using at least a portion of the identified at least one object (e.g., the first object 511, the second object (not shown), the third object (not shown), or the fourth object (not shown)) based on the number of the identified at least one object (e.g., the first object 511, the second object (not shown), the third object (not shown), or the fourth object (not shown)).

For example, in the embodiment of FIG. 26, according to an embodiment, after identifying two objects, e.g., the first object 511 corresponding to the first icon 2681 and the second object (not shown) corresponding to the second icon 2682, in response to the touches 2621 and 2622 to the two icons, e.g., the first icon 2681 and the second icon 2682, based on a change (e.g., unfolding 2624) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the second state, e.g., a state in which the first hinge structure (e.g., the first hinge structure 304 of FIG. 3A) is folded, and the second hinge structure (e.g., the second hinge structure 305 of FIG. 3A) is unfolded, the electronic device 101 may determine layout of the second execution screen 2602*a* of the second application different from the first application in the form of being able to divide and display the first object 511 and the second object (not shown) or overlaying and displaying them and include the first object 511 and the second object (not shown) in the determined layout and display the layout. Likewise, after identifying four objects respectively corresponding to four icons in response to touches to the four icons, based on a change (e.g., unfolding 2624) in the state of the hinge structure (e.g., the first hinge structure 304 or the second hinge structure 305 of FIG. 3A), the electronic device 101 may determine the layout of the second execution screen 2602*b* of the second application different from the first application in the form of being able to divide and display the four objects or overlay and display them and include the four objects in the determined layout and display the layout.

Further, for example, in the embodiment of FIG. 26, according to an embodiment, after identifying two objects, e.g., the first object 511 corresponding to the first icon 2681 and the second object (not shown) corresponding to the second icon 2682, in response to touches 2621 and 2622 to two icons, e.g., the first icon 2681 and the second icon 2682, based on a change (e.g., unfolding 2625) of the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the third state, e.g., a state in which the first hinge structure (e.g., the first hinge structure 304 of FIG. 3A) and the second hinge structure (e.g., the second hinge structure 305 of FIG. 3A) both are unfolded, the electronic device 101 may determine the layout of the third execution screen 2603*a* of the third application different from the second application in the form of being able to divide and display the first object 511 and the second object (not shown) or overlay and display them, include the first object 511 and the second object (not shown) in the determined layout and display the layout. Likewise, after identifying three objects respectively corresponding to three icons in response to touches to the three icons, based on a change (e.g., unfolding 2625) of the state of the hinge structure (e.g., the first hinge structure 304 or the second hinge structure 305 of FIG. 3A), the electronic device 101 may determine the layout of the third execution screen 2603*b* of the second application different from the first application in the form of being able to divide and display three objects or overlay and display them, include the three objects in the determined layout, and display the layout. Meanwhile, the layout of the execution screen is not limited to the embodiment disclosed in FIG. 26, and when the number of the identified objects exceeds a preset number, a notification indicating that a proper layout may not be supported may be displayed.

Figure 27:
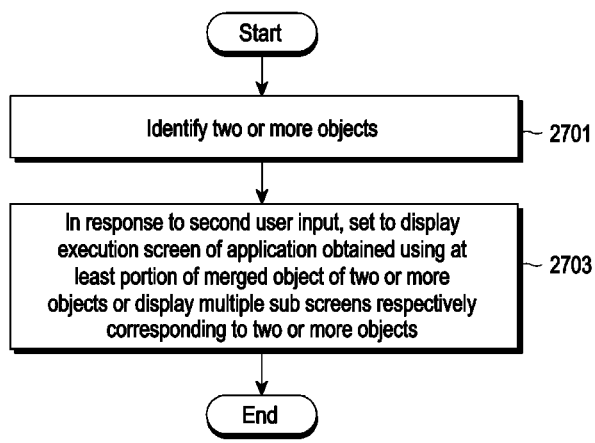
FIG. 27 is a flowchart illustrating a method for operating an electronic device according to an example embodiment.
Figure 28:
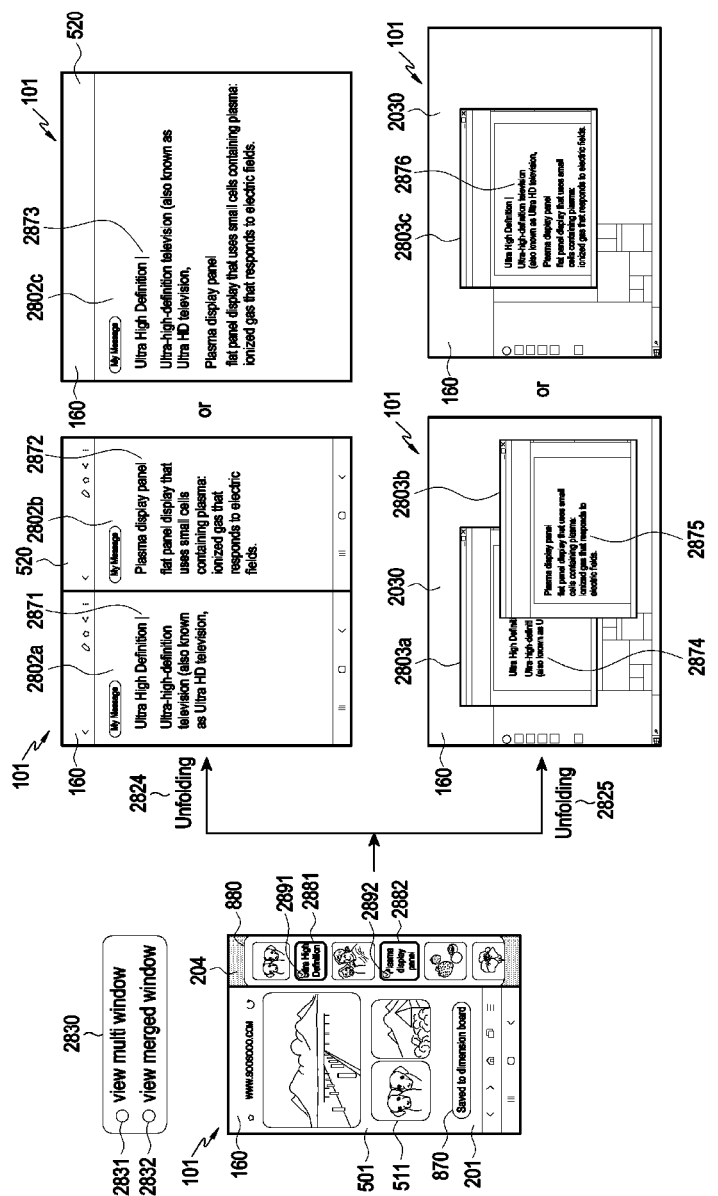
FIG. 28 is a view illustrating operations of an electronic device according to an example embodiment.
Figure 29:
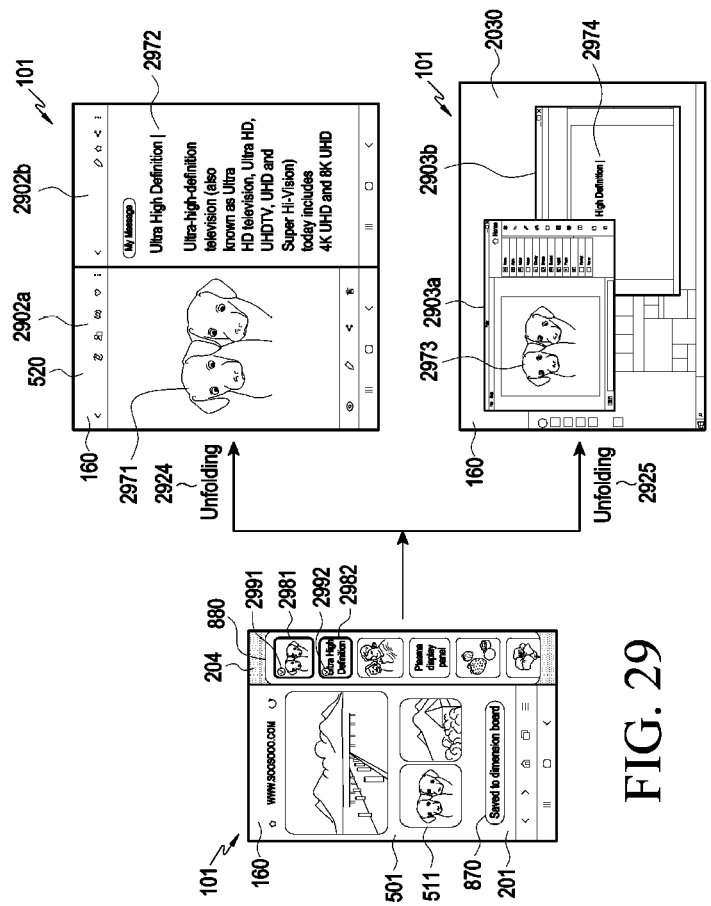
FIG. 29 is a view illustrating operations of an electronic device according to an example embodiment.

FIG. 27 is a flowchart illustrating a method for operating an electronic device according to an embodiment. The embodiment of FIG. 27 is described with reference to FIGS. 28 and 29. FIG. 28 is a view illustrating operations of an electronic device according to an embodiment. FIG. 29 is a view illustrating operations of an electronic device according to an embodiment.

According to an embodiment, referring to FIGS. 27, 28, and 29, in operation 2701, the electronic device 101 (e.g., the processor 120 of FIG. 1) may identify two or more objects. For example, operation 2701 may be described similarly to operation 2501 of FIG. 25.

According to an embodiment, referring to FIGS. 27, 28, and 29, in operation 2703, the electronic device 101 may display an execution screen of the application obtained using at least a portion of the merged object of the identified two or more objects or display a plurality of sub screens respectively corresponding to the identified two or more objects, in response to a user input. For example, upon identifying two or more objects corresponding to the same identification type, the electronic device 101 may display a popup window 2830 for selecting a display method (e.g., multi-window display 2831 or merged window display 2832) on the display module 160 and, in response to a user input (e.g., a touch input) for selecting the display method (e.g., multi-window display 2831 or merged window display 2832), display the execution screen of the application obtained using at least a portion of the merged object of the identified two or more objects or display a plurality of sub screens respectively corresponding to the identified two or more objects. For example, the electronic device 101 may display the popup window 2830 for selecting the display method (e.g., multi-window display 2831 or merged window display 2832) after the state of the hinge structure (e.g., the first hinge structure 304 or the second hinge structure 305 of FIG. 3A) is changed or display it after two or more objects are identified and before the state of the hinge structure (e.g., the first hinge structure 304 or the second hinge structure 305 of FIG. 3A) is changed.

According to an embodiment, in the embodiment of FIG. 28, a case in which identified two or more objects (e.g., the first object 2881 and the second object 2882) have the same identification type is exemplarily disclosed. For example, when the identification type of the first object 2881 and the identification type of the second object 2882 are text types, and the first object 2881 and the second object 2882 are identified, the electronic device 101 may display the popup window 2830 for selecting the display method (e.g., multi-window display 2831 or merged window display 2832) on the display module 160 based on a change (e.g., unfolding 2824) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the second state, e.g., a state in which the first hinge structure (e.g., the first hinge structure 304 of FIG. 3A) is folded, and the second hinge structure (e.g., the second hinge structure 305 of FIG. 3A) is unfolded. For example, when the multi-window display 2831 is selected in response to a user input, the first sub screen 2802a corresponding to the identified first object 2881 and the second sub screen 2802b corresponding to the identified second object 2882 may be displayed on the display module 160. In this case, the first sub screen 2802a and the second sub screen 2802b may be generated by one application. Further, for example, when the merged window display 2832 is selected in response to a user input, the application execution screen 2802c obtained using at least a portion of the merged object 2873 of the first object 2881 and the second object 2882 may be displayed on the display module 160. Meanwhile, an embodiment in which the state of the hinge structure changes to the third state (e.g., unfolding 2825) may also be described similarly to the above-described embodiment.

According to an embodiment, in the embodiment of FIG. 29, a case in which identified two or more objects (e.g., the first object 2981 and the second object 2982) have different identification types is exemplarily disclosed. For example, when the identification type of the first object 2981 is an image type, and the identification type of the second object 2982 is a text type, and the first object 2981 and the second object 2982 are identified, the electronic device 101 may display the first sub screen 2902a corresponding to the first object 2981 and the second sub screen 2902b corresponding to the second object 2982 on the display module 160, based on a change (e.g., unfolding 2924) in the state of the hinge structure (e.g., the first hinge structure 304 or the second hinge structure 305 of FIG. 3A) from the first state, e.g., a state in which the first hinge structure (e.g., the first hinge structure 304 of FIG. 3A) and the second hinge structure (e.g., the second hinge structure 305 of FIG. 3A) both are folded to the second state, e.g., a state in which the first hinge structure (e.g., the first hinge structure 304 of FIG. 3A) is folded, and the second hinge structure (e.g., the second hinge structure 305 of FIG. 3A) is unfolded. In this case, the first sub screen 2902a and the second sub screen 2902b may be generated by different applications, respectively, and the application for generating the first sub screen 2902a and the application for generating the second sub screen 2902b may be determined by the identification type of the first object 2981 and the identification type of the second object 2982, respectively. Meanwhile, an embodiment in which the state of the hinge structure changes to the third state (e.g., unfolding 2925) may also be described similarly to the above-described embodiment.

Figure 30:
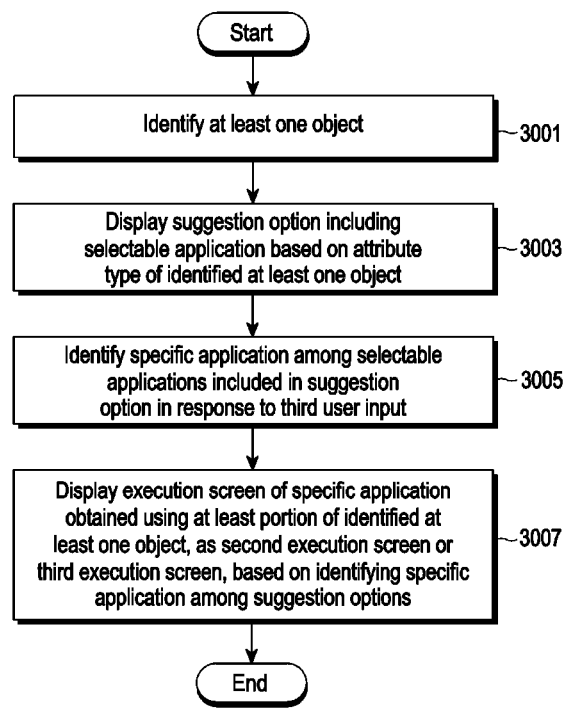
FIG. 30 is a flowchart illustrating a method for operating an electronic device according to an example embodiment.
Figure 32:
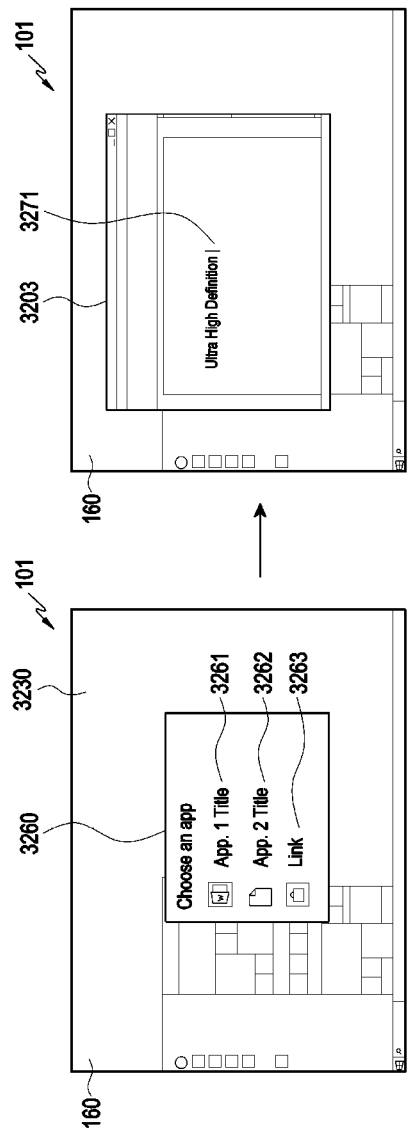
FIG. 32 is a view illustrating operations of an electronic device according to an example embodiment.

FIG. 30 is a flowchart illustrating a method for operating an electronic device according to an embodiment. The embodiment of FIG. 30 is described with reference to FIG. 32. FIG. 32 is a view illustrating operations of an electronic device according to an embodiment.

According to an embodiment, referring to FIGS. 30 and 32, in operation 3001, the electronic device 101 (e.g., the processor 120 of FIG. 1) may identify the object displayed on the display module 160. For example, the electronic device 101 may identify the object based on detecting a touch on the object displayed on the display module 160. For example, the electronic device 101 may identify the object (e.g., the first object 511) corresponding to the icon (e.g., the first icon 881), based on detecting a touch on the icon (e.g., the first icon 881) included in the list (e.g., 880 of FIG. 8) displayed on the display module 160. Or, for example, the electronic device 101 may identify the object (e.g., the first object 511 of FIG. 5) based on detecting a touch drag input (e.g., 523 of FIG. 5) on the object (e.g., the first object 511 of FIG. 5) displayed on the display module 160.

According to an embodiment, referring to FIGS. 30 and 32, in operation 3003, the electronic device 101 may display a suggestion option (e.g., the suggestion option 3260 of FIG. 32) including a selectable application (or icon and/or application title corresponding to the selectable application (e.g., the icon and/or title 3261 corresponding to the first application or the icon and/or title 3262 corresponding to the second application) based on the attribute type of the identified object. For example, in the embodiment of FIG. 32, when the attribute type of the identified object is the text type, the electronic device 101 may display the suggestion option 3260 including the icon and/or title 3261 corresponding to the text editing application and the icon and/or title 3262 corresponding to the message application. Meanwhile, the selectable application included in the suggestion option (e.g., the suggestion option 3260) disclosed in FIG. 32 is exemplary, and may be preset based on the attribute type of the identified object or be set or changed by the user. For example, the selectable application included in the suggestion option (e.g., the suggestion option 3260) may include an application installed on the electronic device 101 or a cloud application. Further, the selectable application included in the suggestion option (e.g., the suggestion option 3260) may be preset depending on the attribute type of the identified object and the state of the hinge structure (e.g., the first hinge structure 304 or the second hinge structure 305 of FIG. 3A) of the electronic device 101.

According to an embodiment, referring to FIGS. 30 and 32, in operation 3005, the electronic device 101 may identify a specific application among selectable applications included in the suggestion option (e.g., the suggestion option 3260) in response to a user input. For example, in the embodiment of FIG. 32, the electronic device 101 may identify the text editing application 3261 among the selectable applications included in the suggestion option (e.g., the suggestion option 3260) in response to a user input.

According to an embodiment, referring to FIGS. 30 and 32, in operation 3007, the electronic device 101 may display the execution screen of a specific application obtained using at least a portion of the identified object on the display module 160, based on identifying that the specific application is identified among the selectable applications included in the suggestion option (e.g., the suggestion option 3260). For example, in the embodiment of FIG. 32, the electronic device 101 may display the execution screen 3203 of the text editing application 3262 obtained using the identified object, based on identifying that the text editing application 3261 is identified among the selectable applications included in the suggestion option (e.g., the suggestion option 3260) in response to a user input.

Figure 31:
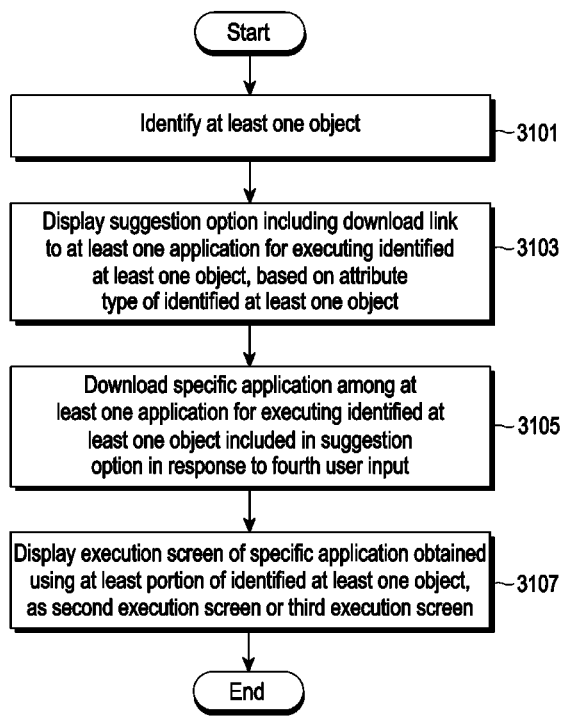
FIG. 31 is a flowchart illustrating a method for operating an electronic device according to an example embodiment.

FIG. 31 is a flowchart illustrating a method for operating an electronic device according to an embodiment. The embodiment of FIG. 31 is described with reference to FIG. 32. FIG. 32 is a view illustrating operations of an electronic device according to an embodiment.

According to an embodiment, referring to FIGS. 31 and 32, in operation 3101, the electronic device 101 (e.g., the processor 120 of FIG. 1) may identify the object displayed on the display module 160. For example, operation 3101 may be described similarly to operation 3001 of FIG. 30.

According to an embodiment, referring to FIGS. 31 and 32, in operation 3103, the electronic device 101 may display a suggestion option (e.g., the suggestion option 3260 of FIG.

32) including a download link (e.g., 3263) of the application for executing the identified object, based on the attribute type of the identified object.

According to an embodiment, referring to FIGS. 31 and 32, in operation 3105, the electronic device 101 may download a specific application among the applications for executing the identified object, included in the suggestion option (e.g., the suggestion option 3260 of FIG. 32) in response to a user input. For example, in the embodiment of FIG. 32, the electronic device 101 may download the specific application corresponding to the download link 3263 in response to a user input, e.g., touch input, to the download link 3263 of the application for executing the identified object, included in the suggestion option 3260.

According to an embodiment, referring to FIGS. 31 and 32, in operation 3107, the electronic device 101 may display the execution screen of the specific application obtained using at least a portion of the identified object. For example, in the embodiment of FIG. 32, the electronic device 101 may download the specific application corresponding to the download link 3263 in response to a user input, e.g., touch input, to the download link 3263 of the application for executing the identified object, included in the suggestion option 3260 and display the execution screen obtained using at least a portion of the identified object, using the downloaded specific application.

Figure 33:
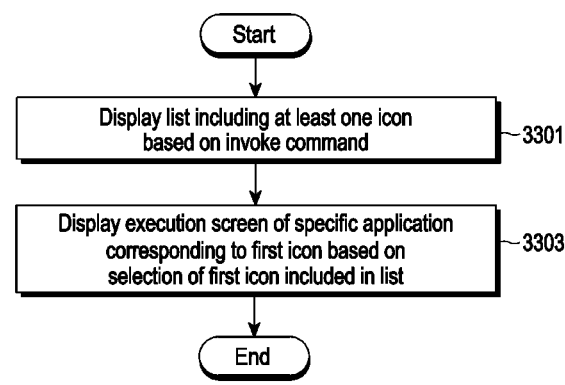
FIG. 33 is a flowchart illustrating a method for operating an electronic device according to an example embodiment.
Figure 34:
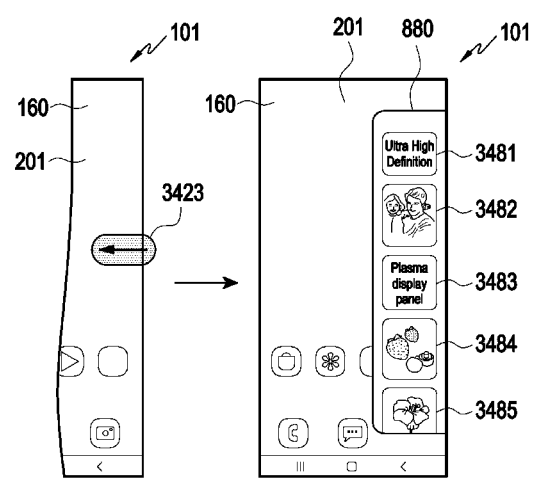
FIG. 34 is a view illustrating operations of an electronic device according to an example embodiment.

FIG. 33 is a flowchart illustrating a method for operating an electronic device according to an embodiment. The embodiment of FIG. 33 is described with reference to FIG. 34. FIG. 34 is a view illustrating operations of an electronic device according to an embodiment.

According to an embodiment, referring to FIGS. 33 and 34, in operation 3301, the electronic device 101 (e.g., the processor 120 of FIG. 1) may display a list (e.g., the list 880) including at least one icon (e.g., the first icon 3481) based on an invoke command. For example, in the embodiment of FIG. 34, the electronic device 101 may display the list (e.g., the list 880) including at least one icon (e.g., the first icon 3481) based on an invoke command, e.g., a user input (e.g., swipe input 3423) to the specific area (e.g., the first area 201) of the display module 160 from the foldable area (e.g., the first foldable area 204) or the edge area (e.g., the edge area of FIG. 22) of the display module 160.

According to an embodiment, referring to FIGS. 33 and 34, in operation 3303, the electronic device 101 may display the execution screen of the specific application obtained using at least a portion of the specific object corresponding to the first icon (e.g., the first icon 3481) based on selection of the first icon (e.g., the first icon 3481) included in the list (e.g., the list 880). For example, the operation of displaying the execution screen of the specific application obtained using at least a portion of the specific object corresponding to the first icon (e.g., the first icon 3481) may easily be understood by the above-described embodiments.

FIGS. 35A, 35B, 35C, 35D, 35E, and 35F are views illustrating a display format of a list displayed by an electronic device according to an embodiment.

Figure 35A:
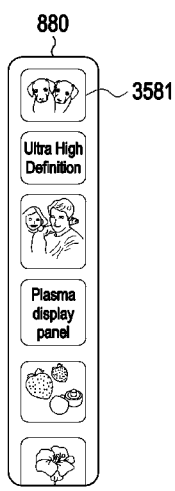
FIG. 35A is a view illustrating a display format of a list displayed by an electronic device according to an example embodiment.

According to an embodiment, referring to FIG. 35A, the electronic device 101 (e.g., the processor 120 of FIG. 1) may display a list 880 including an icon (e.g., the first icon 3581) corresponding to the first object, and the icon (e.g., the first icon 3581) may be described similarly to the description of the icon (e.g., the first icon 881) for operation 705 of FIG. 7.

Figure 35B:
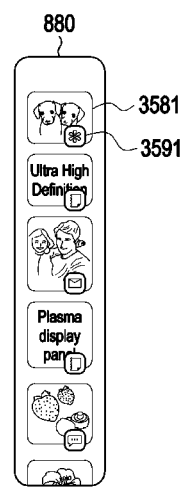
FIG. 35B is a view illustrating a display format of a list displayed by an electronic device according to an example embodiment.

According to an embodiment, referring to FIG. 35B, the electronic device 101 (e.g., the processor 120 of FIG. 1) may display the list 880 including the icon (e.g., the first application icon 3591) corresponding to the application for executing the first object and the icon (e.g., the first icon 3581) corresponding to the first object.

Figure 35C:
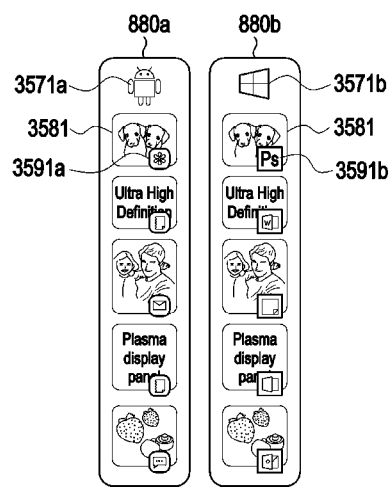
FIG. 35C is a view illustrating a display format of a list displayed by an electronic device according to an example embodiment.

According to an embodiment, referring to FIG. 35C, the electronic device 101 (e.g., the processor 120 of FIG. 1) may display a list (e.g., the list 880a or list 880b) including an indication (e.g., 3571a or 3571b) for the operating system being currently running, the icon (e.g., the first icon 3581) corresponding to the first object, and the icon (e.g., the first application icon 3591a or the second application icon 3591b) corresponding to the application supported by the currently running operating system to execute the first object.

Figure 35D:
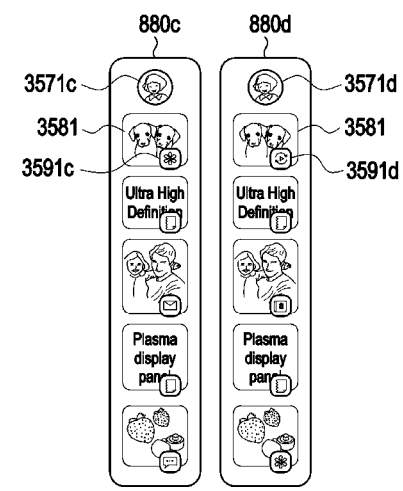
FIG. 35D is a view illustrating a display format of a list displayed by an electronic device according to an example embodiment.
Figure 35E:
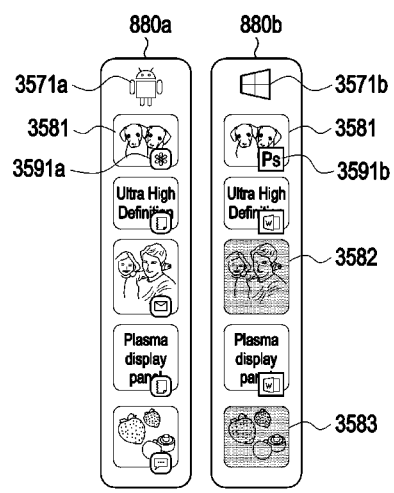
FIG. 35E is a view illustrating a display format of a list displayed by an electronic device according to an example embodiment.
Figure 35F:
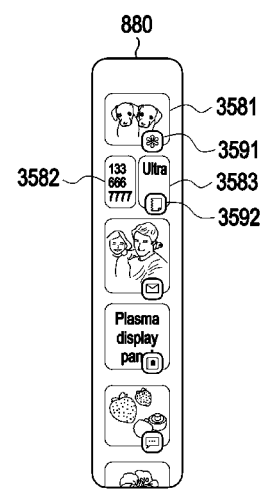
FIG. 35F is a view illustrating a display format of a list displayed by an electronic device according to an example embodiment.

According to an embodiment, referring to FIG. 35D, the electronic device 101 (e.g., the processor 120 of FIG. 1) may display a list (e.g., the list 880c or list 880d) including an indication (e.g., 3571c or 3571d) for the user account being currently used, the icon (e.g., the first icon 3581) corresponding to the first object, and the icon (e.g., the first application icon 3591c or the second application icon 3591d) corresponding to the application set in conjunction with the user account being currently used, for executing the first object.

According to an embodiment, referring to FIG. 35D, the electronic device 101 (e.g., the processor 120 of FIG. 1) may display a list (e.g., the list 880a or list 880b) including an indication (e.g., 3571a or 3571b) for the operating system being currently running, the icon (e.g., the first icon 3581) corresponding to the first object, and the icon (e.g., the first application icon 3591a or the second application icon 3591b) corresponding to the application supported by the currently running operating system to execute the first object. When the currently running operating system does not support the specific application for executing the specific object, the icon (e.g., the second icon 3582 or the third icon 3583) corresponding to the specific object, along with an indication (e.g., shading) indicating that there is no application supported, may be displayed.

According to an embodiment, referring to FIG. 35D, the electronic device 101 (e.g., the processor 120 of FIG. 1) may display the list 880 including the icon (e.g., the first icon 3581) corresponding to the first object and the icon (e.g., the first application icon 3591) corresponding to the application for executing the first object. When the second object (not shown) and the third object (not shown) are set to be executed by the same type of specific application, the electronic device 101 (e.g., the processor 120 of FIG. 1) may display the second icon 3582 corresponding to the second object (not shown) and the third icon 3583 corresponding to the third object (not shown) in parallel on the list and may display the icon (e.g., the second application icon 3592) corresponding to the specific application for executing the second object (not shown) and the third object (not shown) on the list 880.

Figure 36:
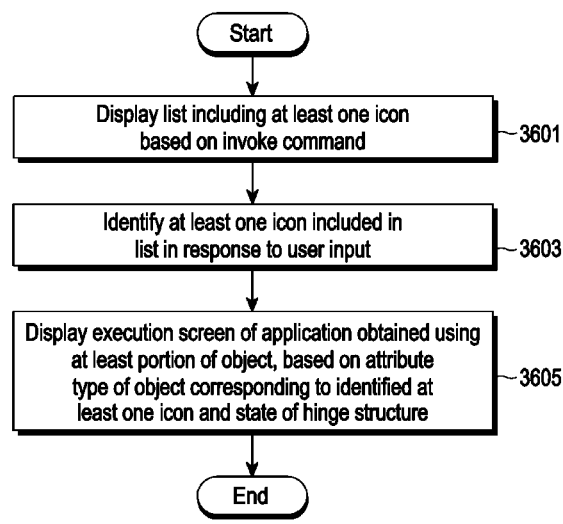
FIG. 36 is a flowchart illustrating a method for operating an electronic device according to an example embodiment.
Figure 37:
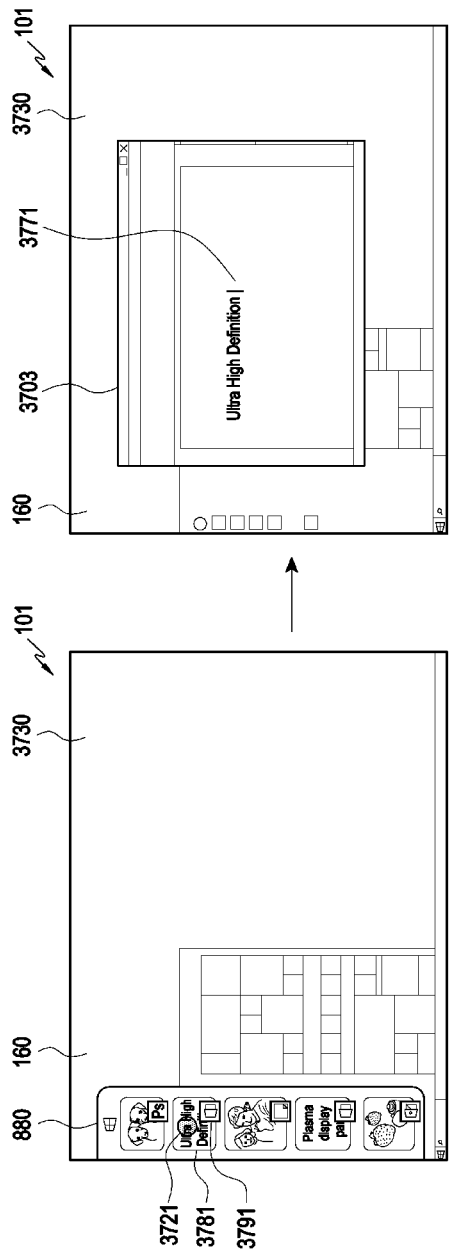
FIG. 37 is a view illustrating operations of an electronic device according to an example embodiment.

FIG. 36 is a flowchart illustrating a method for operating an electronic device according to an embodiment. The embodiment of FIG. 36 is described with reference to FIG. 37. FIG. 37 is a view illustrating operations of an electronic device according to an embodiment.

According to an embodiment, referring to FIGS. 36 and 37, in operation 3601, the electronic device 101 (e.g., the processor 120 of FIG. 1) may display a list (e.g., the list 880) including at least one icon (e.g., the first icon 3781) based on an invoke command. For example, operation 3601 may be described similarly to operation 3301 of FIG. 33. Further, the electronic device 101 may include and display, in the list (e.g., the list 880), the icon (e.g., the first icon 3791)

corresponding to the specific application for executing the object (e.g., the first object 3771) indicated by at least one icon (e.g., the first icon 3781).

According to an embodiment, referring to FIGS. 36 and 37, in operation 3603, the electronic device 101 may identify at least one icon (e.g., the first icon 3781) included in the list (e.g., the list 880) in response to a user input. For example, in the embodiment of FIG. 37, the electronic device 101 may identify at least one icon (e.g., the first icon 3781) included in the list (e.g., the list 880) in response to a user input, e.g., touch input 3721, to the first icon 3781.

According to an embodiment, referring to FIGS. 36 and 37, in operation 3605, the electronic device 101 may execute a preset specific application based on the attribute type of the object (e.g., the first object 3771) corresponding to the identified at least one icon (e.g., the first icon 3781) and the state of the hinge structure (e.g., the first hinge structure 304 or the second hinge structure 305 of FIG. 3A) and display the execution screen of the specific application obtained using at least a portion of the object (e.g., the first object 3771). For example, in the embodiment of FIG. 37, the electronic device 101 may execute a preset specific application, e.g., the text editing application, based on the attribute type of the object, e.g., the first object 3771, corresponding to the identified icon, e.g., the first icon 3781 being the text type, and the state of the hinge structure (e.g., the first hinge structure 304 or the second hinge structure 305 of FIG. 3A) being a state in which the first hinge structure (e.g., the first hinge structure 304 of FIG. 3A) and the second hinge structure (e.g., the second hinge structure 305 of FIG. 3A) both are unfolded and display the execution screen 3703 of the text editing application including the first object 3771 on the display module 160. Meanwhile, executing the text editing application in the embodiment of FIG. 37 is exemplary, and the specific application for executing the object may be set to differ depending on the attribute type of the object and the state of the hinge structure (e.g., the first hinge structure 304 or the second hinge structure 305 of FIG. 3A).

Figure 38:
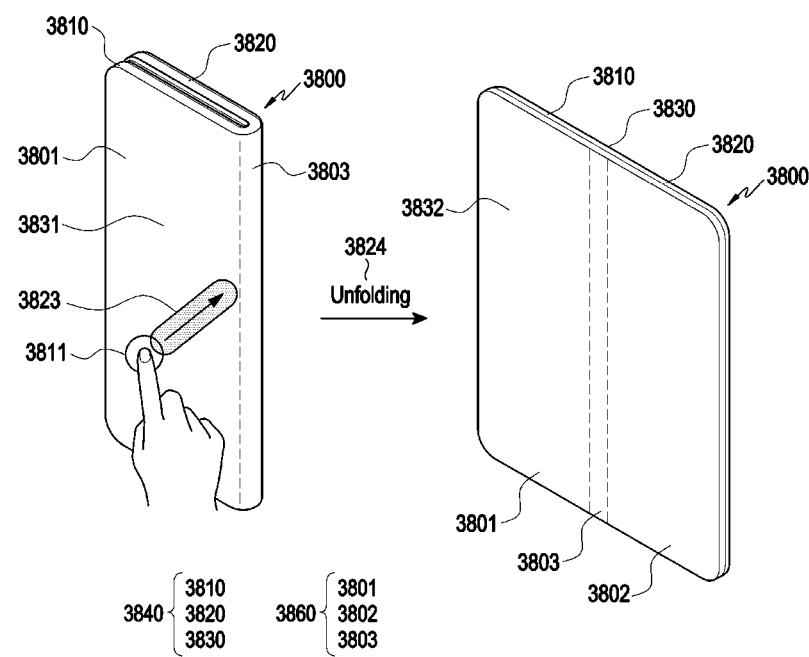
FIG. 38 is a view illustrating a form factor of an electronic device according to another example embodiment.

FIG. 38 is a view illustrating a form factor of an electronic device according to another embodiment.

According to another embodiment, referring to FIG. 38, the electronic device 3800 may be operated similarly to the electronic device 101 of FIG. 2 but may be configured in a different form factor. For example, the electronic device 3800 may include a foldable housing 3840 and a display module 3860 disposed in a space formed by the foldable housing 3840. At least a portion of the display module 3860 may be flexible or foldable. The surface where the display module 3860 is disposed (or the surface where the display module 3860 is viewed from the outside of the electronic device 3800) may be the front surface of the electronic device 3800. The opposite surface of the front surface may be a rear surface of the electronic device 3800. The surface surrounding the space between the front and back surfaces may be a side surface of the electronic device 3800.

According to an embodiment, referring to FIG. 38, the foldable housing 3840 may include a first housing structure 3810, a second housing structure 3820, and a hinge structure 3830 disposed between at least the first housing structure 3810 and the second housing structure 3820. The foldable housing 3840 of FIG. 38 may be described similarly to the foldable housing 200 of FIG. 2.

According to an embodiment, referring to FIG. 38, the display 3860 may be a display module including at least one display, at least a portion of which may be transformed into a flat or curved surface. For example, the display module 3860 may include a first area 3801, a second area 3802, and a foldable area 3803 disposed between at least the first area 3801 and the second area 3802. The display module 3860 of FIG. 38 may be described similarly to the display module 160 of FIG. 2.

According to an embodiment, referring to FIG. 38, the foldable area 3803 of the display module 3860 may correspond to an area where the hinge structure 3830 is positioned. For example, the foldable area 3803 may be folded corresponding to the folding of the hinge structure 3830 and be unfolded corresponding to the unfolding. The foldable area 3803 of FIG. 38 may be described similarly to the first foldable area 204 of FIG. 2.

According to an embodiment, referring to FIG. 38, in the folded state of the hinge structure 3830 of the electronic device 3800, the rear surface of the first housing structure 3810 and the rear surface of the second housing structure 3820 may face each other, and the first area 3801 of the display module 3860 and the whole or part of the foldable area 3803 may be exposed to the front surface of the electronic device 3800 viewed by the user. Further, in the unfolded state of the hinge structure 3830 of the electronic device 3800, the first area 3801, the second area 3802, and the foldable area 3803 of the display module 3860 may be coplanar with each other.

According to an embodiment, referring to FIG. 38, in the folded state of the hinge structure 3830, the electronic device 3800 (e.g., the processor 120 of FIG. 1) may deactivate the second area 3802 of the display module 3860. For example, the specific area of the display module 3860, activated or deactivated depending on the state of the hinge structure 3830 of the electronic device 3800 may be described similarly to the description of the activation or deactivation of the specific area of the display module 160 of FIG. 19.

According to an embodiment, referring to FIG. 38, in the folded state of the hinge structure 3830, the electronic device 3800 (e.g., the processor 120 of FIG. 1) may display the first execution screen 3831 of the first application in the first area 3801 of the display module 3860. For example, the operation of displaying the first execution screen 3831 of the first application in the first area 3801 of the display module 3860 may be described similarly to operation 401 of FIG. 4.

According to an embodiment, referring to FIG. 38, while the foldable area 3803 is in the folded state, the electronic device 3800 (e.g., the processor 120 of FIG. 1) may detect a touch drag input (e.g., 3823) to the foldable area 3803 from the object (e.g., the first object 3811) included in the first execution screen 3831 of the first application. For example, the operation of detecting a touch drag input (e.g., 3823) to the foldable area 3803 from the object (e.g., the first object 3811) included in the first execution screen 3831 of the first application may be described similarly to operation 403 of FIG. 4.

According to an embodiment, referring to FIG. 38, the electronic device 3800 (e.g., the processor 120 of FIG. 1) may display the second execution screen 3832 of the second application different from the first application, obtained using at least a portion of the object (e.g., the first object 3811) on the display module 3860, based on a change (e.g., unfolding 3824) in the state of the hinge structure 3830 from the folded state to the unfolded state. For example, the operation of displaying the second execution screen 3832 of the second application different from the first application on the display module 3860 may be described similarly to operation 405 of FIG. 4.

According to an embodiment, the electronic device 3800 disclosed in FIG. 38 may be operated similarly to the electronic device 101 of FIG. 2.

For example, according to an embodiment, referring to FIG. 38, the electronic device 3800 (e.g., the processor 120 of FIG. 1) may perform the operation of displaying a list including the icon corresponding to the object 3811 in the first foldable area 3803. For example, the displaying operation by the electronic device 3800 may be described similarly to operation 705 of FIG. 7.

Further, for example, according to an embodiment, referring to FIG. 38, the electronic device 3800 (e.g., the processor 120 of FIG. 1) may perform the operation of controlling not to display the list based on maintaining the folded state of the hinge structure 3803 during a preset time. For example, the controlling operation by the electronic device 3800 may be described similarly to operation 907 of FIG. 9.

Further, for example, according to an embodiment, referring to FIG. 38, the electronic device 3800 (e.g., the processor 120 of FIG. 1) may perform the operation of displaying the first execution screen (e.g., the first execution screen 3831) of the first application in the first area 3801 of the display module 3860 based on a change in the state of the hinge structure 3830 from the unfolded state to the folded state after displaying the second execution screen (e.g., the second execution screen 3832). For example, the displaying operation by the electronic device 3800 may be described similarly to operation 1107 of FIG. 11.

Further, for example, according to an embodiment, referring to FIG. 38, the electronic device 3800 (e.g., the processor 120 of FIG. 1) may perform the operation of displaying the third execution screen of the third application different from the first application in the first area 3801 of the display module 3860 based on a change of the state of the hinge structure 3830 from the unfolded state to the folded state after displaying the second execution screen (e.g., the second execution screen 3832). For example, the displaying operation by the electronic device 3800 may be described similarly to operation 1307 of FIG. 13.

Further, for example, according to an embodiment, referring to FIG. 38, the electronic device 3800 (e.g., the processor 120 of FIG. 1) may perform the operation of determining the second application providing the second execution screen (e.g., the second execution screen 3832) based on the direction or end point of the touch drag input 3823. For example, the determining operation by the electronic device 3800 may be described similarly to operation 1505 of FIG. 15 or operation 1605 of FIG. 16.

Further, for example, according to an embodiment, referring to FIG. 38, the electronic device 3800 (e.g., the processor 120 of FIG. 1) may perform the operation of detecting a touch drag input (e.g., the touch drag input 3823) to the edge area or the foldable area (e.g., the foldable area 3803). For example, the detecting operation by the electronic device 3800 may be described similarly to the embodiment of FIG. 22.

Further, for example, according to an embodiment, referring to FIG. 38, the electronic device 3800 (e.g., the processor 120 of FIG. 1) may perform the operation of determining the layout of the execution screen based on the number of identified objects. For example, the determining operation by the electronic device 3800 may be described similarly to operation 2503 of FIG. 25.

Further, for example, according to an embodiment, referring to FIG. 38, the electronic device 3800 (e.g., the processor 120 of FIG. 1) may perform the operation of displaying the application execution screen obtained using at least a portion of the merged object of two or more objects or displaying a plurality of sub screens respectively corresponding to two or more objects, in response to a user input. For example, the displaying operation by the electronic device 3800 may be described similarly to operation 2703 of FIG. 27.

Further, for example, according to an embodiment, referring to FIG. 38, the electronic device 3800 (e.g., the processor 120 of FIG. 1) may perform the operation of displaying a suggestion option including a download link to a specific application for executing the identified object or selectable application, based on the attribute type of the identified object. For example, the displaying operation by the electronic device 3800 may be described similarly to operation 3003 of FIG. 30 or operation 3103 of FIG. 31.

Further, for example, according to an embodiment, referring to FIG. 38, the electronic device 3800 (e.g., the processor 120 of FIG. 1) may perform the operation of displaying a list including an icon based on an invoke command. For example, the displaying operation by the electronic device 3800 may be described similarly to operation 3301 of FIG. 33.

Further, for example, according to an embodiment, referring to FIG. 38, the electronic device 3800 (e.g., the processor 120 of FIG. 1) may perform the operation of displaying the application execution screen obtained using at least a portion of the object based on the attribute type of the object corresponding to the identified icon and the state of the hinge structure 3830. For example, the displaying operation by the electronic device 3800 may be described similarly to operation 3605 of FIG. 36.

Figure 39:
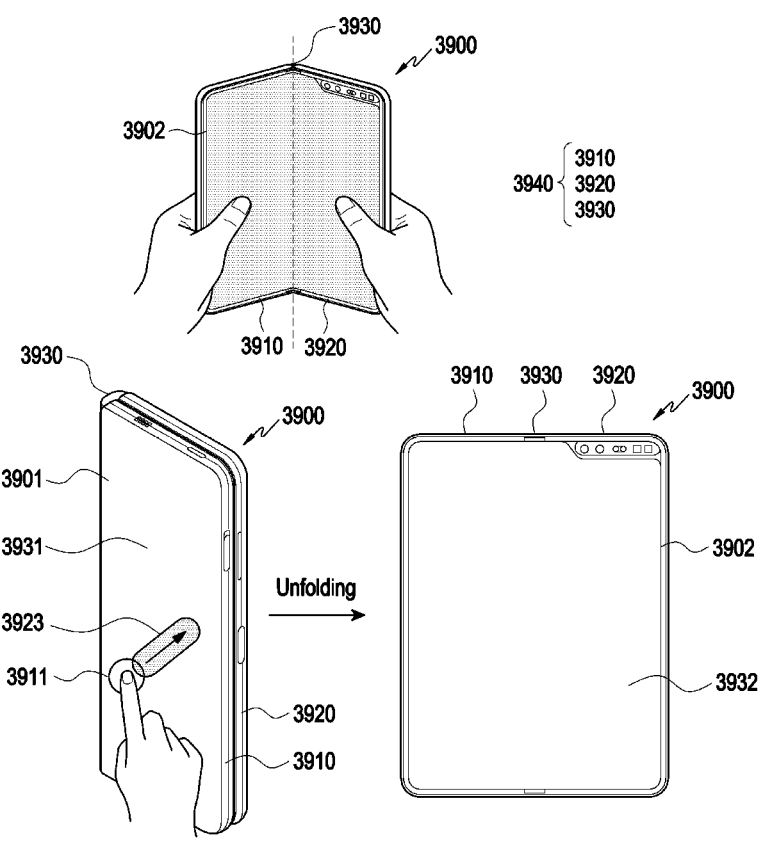
FIG. 39 is a view illustrating a form factor of an electronic device according to another example embodiment.

FIG. 39 is a view illustrating a form factor of an electronic device according to another embodiment.

According to another embodiment, referring to FIG. 39, the electronic device 3900 may be operated similarly to the electronic device 101 of FIG. 2 but may be configured in a different form factor. For example, an electronic device 3900 may include a foldable housing 3940, a first display module 3901 viewed through at least a portion of the foldable housing 3940, and a second display module 3902 disposed in a space formed by the foldable housing 3940. At least a portion of the second display module 3902 may be flexible or foldable.

According to an embodiment, referring to FIG. 39, the foldable housing 3940 may include a first housing including a first surface facing in a first direction and a second surface facing in a second direction opposite to the first direction, a second housing structure 3920 including a third surface facing in a third direction and a fourth surface facing in a fourth direction opposite the third direction, and a hinge structure 3930 disposed between at least the first housing structure 3910 and the second housing structure 3920. In the folded state of the hinge structure 3930, the second surface of the first housing structure 3910 may face the fourth surface of the second housing structure 3920 and, in the unfolded state of the hinge structure 3930, the first direction of the first housing structure 3910 and the third direction of the second housing structure 3920 may be substantially the same.

According to an embodiment, referring to FIG. 39, the first display module 3901 may be viewed through at least a portion of the first surface of the first housing structure 3910. The second display module 3902 may be a display module including at least one display, at least a portion of which may be transformed into a flat or curved surface. For example, the second display module 3902 may extend from the second surface of the first housing structure 3910 through the hinge structure 3930 to the fourth surface of the second housing structure 3920, and may include a flexible area corresponding to the hinge structure 3930. The second display module 3902 may include a first area corresponding to the second surface of the first housing structure 3910 and a second area corresponding to the fourth surface of the second housing structure 3920. In the folded state of the hinge structure 3930, the first area and second area of the second display module 3902 may face each other and, in the unfolded state of the hinge structure 3930, the first area, second area, and flexible area of the second display module 3902 may be substantially coplanar with each other. For example, in the folded state of the hinge structure 3930, the first display module 3901 may be exposed to the front surface of the electronic device 3900 viewed by the user. Further, in the unfolded state of the hinge structure 3930, the second display module 3902 may be exposed to the front surface of the electronic device 3900 viewed by the user.

According to an embodiment, referring to FIG. 39, in the folded state of the hinge structure 3930, the electronic device 3900 (e.g., the processor 120 of FIG. 1) may deactivate the second display module 3902 and, in the unfolded state of the hinge structure 3930, deactivate the first display module 3901. For example, the display module (e.g., the first display module 3901 or the second display module 3902) activated or deactivated according to the state of the hinge structure 3930 of the electronic device 3900 may be described similarly to the description of activation or deactivation of the specific area of the display module 160 of FIG. 19.

According to an embodiment, referring to FIG. 39, in the folded state of the hinge structure 3930, the electronic device 3900 may display the first execution screen 3931 of the first application on the first display module 3901. For example, the operation of displaying the first execution screen 3931 of the first application on the first display module 3901 may be described similarly to operation 401 of FIG. 4.

According to an embodiment, referring to FIG. 39, while the hinge structure 3930 is in the folded state, the electronic device 3900 may detect a touch drag input (e.g., 3923) to the edge area of the first display module 3901 from the object (e.g., the first object 3911) included in the first execution screen 3931 of the first application. For example, the operation of detecting the touch drag input (e.g., 3923) to the edge area of the first display module 3901 from the object (e.g., the first object 3911) included in the first execution screen 3931 of the first application may be described similarly to operation 403 of FIG. 4 and the embodiment of FIG. 22.

According to an embodiment, referring to FIG. 39, the electronic device 3900 may display, on the second display module 3902, the second execution screen 3932 of the second application different from the first area 201, obtained using at least a portion of the object (e.g., the first object 3911) based on a change (e.g., unfolding) of the state of the hinge structure 3930 from the folded state to the unfolded state. For example, the operation of displaying the second execution screen 3932 of the second application different from the first application on the second display module 3902 may be described similarly to operation 405 of FIG. 4.

According to an embodiment, the electronic device 3900 disclosed in FIG. 39 may be operated similarly to the electronic device 101 of FIG. 2.

For example, according to an embodiment, referring to FIG. 39, the electronic device 3900 (e.g., the processor 120 of FIG. 1) may perform the operation of displaying a list including the icon corresponding to the object 3911 in the edge area of the first display module 3901. For example, the displaying operation by the electronic device 3900 may be described similarly to operation 705 of FIG. 7.

Further, for example, according to an embodiment, referring to FIG. 39, the electronic device 3900 (e.g., the processor 120 of FIG. 1) may perform the operation of controlling not to display the list based on maintaining the folded state of the hinge structure 3903 during a preset time. For example, the controlling operation by the electronic device 3900 may be described similarly to operation 907 of FIG. 9.

Further, for example, according to an embodiment, referring to FIG. 39, the electronic device 3900 (e.g., the processor 120 of FIG. 1) may perform the operation of displaying the first execution screen (e.g., the first execution screen 3931) of the first application on the first display module (e.g., the first display module 3901) based on a change in the state of the hinge structure 3930 from the unfolded state to the folded state after displaying the second execution screen (e.g., the second execution screen 3932). For example, the displaying operation by the electronic device 3900 may be described similarly to operation 1107 of FIG. 11.

Further, for example, according to an embodiment, referring to FIG. 39, the electronic device 3900 (e.g., the processor 120 of FIG. 1) may perform the operation of displaying the third execution screen of the third application different from the first application on the first display module (e.g., the first display module 3901) based on a change of the state of the hinge structure 3930 from the unfolded state to the folded state after displaying the second execution screen (e.g., the second execution screen 3932). For example, the displaying operation by the electronic device 3900 may be described similarly to operation 1307 of FIG. 13.

Further, for example, according to an embodiment, referring to FIG. 39, the electronic device 3900 (e.g., the processor 120 of FIG. 1) may perform the operation of determining the second application providing the second execution screen (e.g., the second execution screen 3932) based on the direction or end point of the touch drag input 3923. For example, the determining operation by the electronic device 3900 may be described similarly to operation 1505 of FIG. 15 or operation 1605 of FIG. 16.

Further, for example, according to an embodiment, referring to FIG. 39, the electronic device 3900 (e.g., the processor 120 of FIG. 1) may perform the operation of detecting a touch drag input (e.g., the touch drag input 3923) to the edge area. For example, the detecting operation by the electronic device 3900 may be described similarly to the embodiment of FIG. 22.

Further, for example, according to an embodiment, referring to FIG. 39, the electronic device 3900 (e.g., the processor 120 of FIG. 1) may perform the operation of determining the layout of the execution screen based on the number of identified objects. For example, the determining operation by the electronic device 3900 may be described similarly to operation 2503 of FIG. 25.

Further, for example, according to an embodiment, referring to FIG. 39, the electronic device 3900 (e.g., the processor 120 of FIG. 1) may perform the operation of displaying the application execution screen obtained using at least a portion of the merged object of two or more objects or displaying a plurality of sub screens respectively corresponding to two or more objects, in response to a user input. For example, the displaying operation by the electronic device 3900 may be described similarly to operation 2703 of FIG. 27.

Further, for example, according to an embodiment, referring to FIG. 39, the electronic device 3900 (e.g., the processor 120 of FIG. 1) may perform the operation of displaying a suggestion option including a download link to a specific application for executing the identified object or selectable application, based on the attribute type of the identified object. For example, the displaying operation by the electronic device 3900 may be described similarly to operation 3003 of FIG. 30 or operation 3103 of FIG. 31.

Further, for example, according to an embodiment, referring to FIG. 39, the electronic device 3900 (e.g., the processor 120 of FIG. 1) may perform the operation of displaying a list including an icon based on an invoke command. For example, the displaying operation by the electronic device 3900 may be described similarly to operation 3301 of FIG. 33.

Further, for example, according to an embodiment, referring to FIG. 39, the electronic device 3900 (e.g., the processor 120 of FIG. 1) may perform the operation of displaying the application execution screen obtained using at least a portion of the object based on the attribute type of the object corresponding to the identified icon and the state of the hinge structure 3930. For example, the displaying operation by the electronic device 3900 may be described similarly to operation 3605 of FIG. 36.

Figure 40:
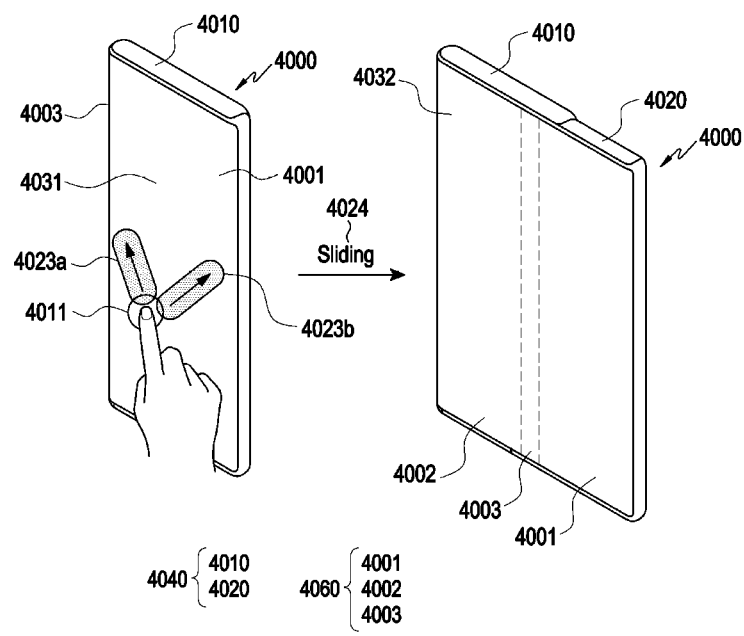
FIG. 40 is a view illustrating a form factor of an electronic device according to another example embodiment.

FIG. 40 is a view illustrating a form factor of an electronic device according to another embodiment.

According to another embodiment, referring to FIG. 40, the electronic device 4000 may be operated similarly to the electronic device 101 of FIG. 2 but may be configured in a different form factor. For example, an electronic device 4000 may include a slidable housing 4040 and a display module 4060 disposed in a space formed by the slidable housing 4040. At least a portion of the display module 4060 may be flexible or rollable. The surface where the display module 4060 is disposed (or the surface where the display module 4060 is viewed from the outside of the electronic device 4000) may be the front surface of the electronic device 4000. The opposite surface of the front surface may be a rear surface of the electronic device 4000. The surface surrounding the space between at least the front and back surfaces may be a side surface of the electronic device 4000.

According to an embodiment, referring to FIG. 40, the slidable housing 4040 may include a first housing structure 4010 and a second housing structure 4020. The second housing structure 4020 may be embedded in the first housing structure 4010 or be drawn out from the first housing structure 4010.

According to an embodiment, referring to FIG. 40, the display 4060 may be a display module at least a portion of which may be transformed into a flat or curved surface. For example, the display module 4060 may include a first area 4001, a second area 4002, and a third area 4003 disposed between at least the first area 4001 and the second area 4002. For example, when the second housing structure 4020 is embedded in the first housing structure 4010, the first area 4001 and the third area 4003 of the display module 4060 may be exposed to the front surface of the electronic device 4000 viewed by the user, and the second area 4002 of the display module 4060 may be embedded in the first housing structure 4010. For example, when the second housing structure 4020 is embedded in the first housing structure 4010, according to the shape of the first housing structure 4010, the third area 4003 of the display module 4060 may be at least partially curved and be substantially coplanar with the first area 4001 of the display module 4060. Further, for example, when the second housing structure 4020 is drawn out from the first housing structure 4010, the first area 4001, the second area 4002, and the third area of the display module 4060 may be exposed to the front surface of the electronic device 4000 viewed by the user and be substantially coplanar with each other.

According to an embodiment, referring to FIG. 40, in a state in which the second housing structure 4020 is embedded in the first housing structure 4010, the electronic device 4000 (e.g., the processor 120 of FIG. 1) may deactivate the second area 4002 of the display module 4060. For example, the specific area of the display module 4060 activated or deactivated according to the state in which the second housing structure 4020 is embedded in the first housing structure 4010 or the state in which the second housing structure 4020 is drawn out from the first housing structure 4010 may be described similarly to the description of the activation or deactivation of the specific area of the display module 160 of FIG. 19.

According to an embodiment, referring to FIG. 40, in a state in which the second housing structure 4020 is embedded in the first housing structure 4010, the electronic device 4000 (e.g., the processor 120 of FIG. 1) may display the first execution screen 4031 of the first application in the first area 4001 of the display module 4060. For example, the operation of displaying the first execution screen 4031 of the first application in the first area 4001 of the display module 4060 may be described similarly to operation 401 of FIG. 4.

According to an embodiment, referring to FIG. 40, while the second housing structure 4020 is embedded in the first housing structure 4010, the electronic device 4000 (e.g., the processor 120 of FIG. 1) may detect a touch drag input (e.g., 4023a) to the third area 4003 of the display module 4060 from the object (e.g., the first object 4011) included in the first execution screen 4031 of the first application. For example, the operation of detecting the touch drag input (e.g., 4023a) to the third area 4003 of the display module 4060 from the object (e.g., the first object 4011) included in the first execution screen 4031 of the first application may be described similarly to operation 403 of FIG. 4.

According to an embodiment, referring to FIG. 40, the electronic device 4000 (e.g., the processor 120 of FIG. 1) may display the second execution screen 4032 of the second application different from the first application, obtained using at least a portion of the object (e.g., the first object 4011) on the display module 4060, based on a change (e.g., sliding 4024) from the state in which the second housing structure 4020 is embedded in the first housing structure 4010 to the state in which the second housing structure 4020 is drawn out from the first housing structure 4010. For example, the operation of displaying the second execution screen 4032 of the second application different from the first application on the display module 4060 may be described similarly to operation 405 of FIG. 4.

According to an embodiment, the electronic device 4000 disclosed in FIG. 40 may be operated similarly to the electronic device 101 of FIG. 2.

For example, according to an embodiment, referring to FIG. 40, the electronic device 4000 (e.g., the processor 120 of FIG. 1) may perform the operation of displaying a list including the icon corresponding to the object 4011 in the third area 4003 of the display module 4060. For example, the displaying operation by the electronic device 4000 may be described similarly to operation 705 of FIG. 7.

Further, for example, according to an embodiment, referring to FIG. 40, the electronic device 4000 (e.g., the processor 120 of FIG. 1) may perform the operation of controlling not to display the list based on maintaining the state in which the second housing structure 4020 is embedded in the first housing structure 4010 during a preset time. For example, the controlling operation by the electronic device 4000 may be described similarly to operation 907 of FIG. 9.

Further, for example, according to an embodiment, referring to FIG. 40, the electronic device 4000 (e.g., the processor 120 of FIG. 1) may perform the operation of displaying the first execution screen (e.g., the first execution screen 4031) of the first application in the first area 4001 of the display module 4060 based on a change from the state in which the second housing structure 4020 is drawn out from the first housing structure 4010 to the state in which the second housing structure 4020 is embedded in the first housing structure 4010 after displaying the second execution screen (e.g., the second execution screen 4032). For example, the displaying operation by the electronic device 4000 may be described similarly to operation 1107 of FIG. 11.

Further, for example, according to an embodiment, referring to FIG. 40, the electronic device 4000 (e.g., the processor 120 of FIG. 1) may perform the operation of displaying the third execution screen of the third application different from the first application in the first area 4001 of the display module 4060 based on a change from the state in which the second housing structure 4020 is drawn out from the first housing structure 4010 to the state in which the second housing structure 4020 is embedded in the first housing structure 4010. For example, the displaying operation by the electronic device 4000 may be described similarly to operation 1307 of FIG. 13.

Further, for example, according to an embodiment, referring to FIG. 40, the electronic device 4000 (e.g., the processor 120 of FIG. 1) may perform the operation of determining the second application providing the second execution screen (e.g., the second execution screen 4032) based on the direction or end point of the touch drag input 4023*a*. For example, the determining operation by the electronic device 4000 may be described similarly to operation 1505 of FIG. 15 or operation 1605 of FIG. 16.

Further, for example, according to an embodiment, referring to FIG. 40, the electronic device 4000 (e.g., the processor 120 of FIG. 1) may perform the operation of detecting a touch drag input (e.g., the touch drag input 4023*b*) to the edge area of the first area 4001 or a touch drag input (e.g., the touch drag input 4023*a*) to the third area of the display module 4060. For example, the detecting operation by the electronic device 4000 may be described similarly to the embodiment of FIG. 22.

Further, for example, according to an embodiment, referring to FIG. 40, the electronic device 4000 (e.g., the processor 120 of FIG. 1) may perform the operation of determining the layout of the execution screen based on the number of identified objects. For example, the determining operation by the electronic device 4000 may be described similarly to operation 2503 of FIG. 25.

Further, for example, according to an embodiment, referring to FIG. 40, the electronic device 4000 (e.g., the processor 120 of FIG. 1) may perform the operation of displaying the application execution screen obtained using at least a portion of the merged object of two or more objects or displaying a plurality of sub screens respectively corresponding to two or more objects, in response to a user input. For example, the displaying operation by the electronic device 4000 may be described similarly to operation 2703 of FIG. 27.

Further, for example, according to an embodiment, referring to FIG. 40, the electronic device 4000 (e.g., the processor 120 of FIG. 1) may perform the operation of displaying a suggestion option including a download link to a specific application for executing the identified object or selectable application, based on the attribute type of the identified object. For example, the displaying operation by the electronic device 4000 may be described similarly to operation 3003 of FIG. 30 or operation 3103 of FIG. 31.

Further, for example, according to an embodiment, referring to FIG. 40, the electronic device 4000 (e.g., the processor 120 of FIG. 1) may perform the operation of displaying a list including an icon based on an invoke command. For example, the displaying operation by the electronic device 4000 may be described similarly to operation 3301 of FIG. 33.

Further, for example, according to an embodiment, referring to FIG. 40, the electronic device 4000 (e.g., the processor 120 of FIG. 1) may perform the operation of displaying the application execution screen obtained using at least a portion of the object based on the attribute type of the object corresponding to the identified icon and the state of the hinge structure 3830. For example, the displaying operation by the electronic device 4000 may be described similarly to operation 3605 of FIG. 36.

Figure 41:
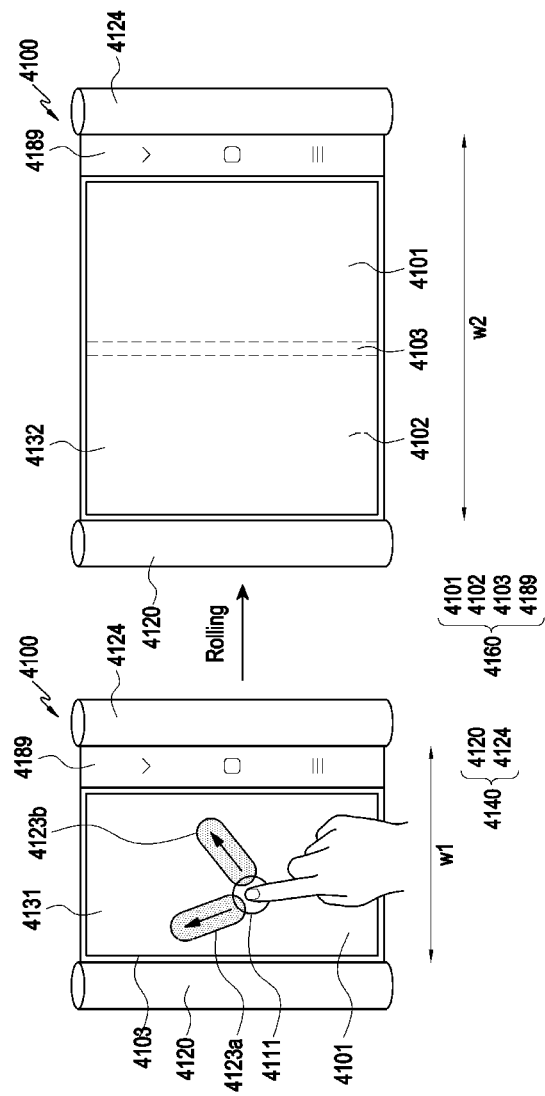
FIG. 41 is a view illustrating a form factor of an electronic device according to another example embodiment.

FIG. 41 is a view illustrating a form factor of an electronic device according to another embodiment.

According to another embodiment, referring to FIG. 41, the electronic device 4100 may be operated similarly to the electronic device 101 of FIG. 2 but may be configured in a different form factor. For example, an electronic device 4100 may include a housing 4140 and a display module 4160 that may be drawn out from the housing 4140. At least a portion of the display module 4160 may be flexible or rollable.

According to an embodiment, referring to FIG. 41, the housing 4140 may include a first housing structure 4120 and a second housing structure 4124. For example, the first housing structure 4120 may embed at least a portion of the display module 4160. For example, the second housing structure 4124 may move while being connected, directly or indirectly, to the display module 4160.

According to an embodiment, referring to FIG. 41, the display 4160 may be a display module at least a portion of which may be transformed into a flat or curved surface. For example, the display module 4160 may include a first area 4101, a second area 4102, a third area 4103 disposed between at least the first area 4101 and the second area 4102, and a fourth area 4189 connected, directly or indirectly, to the second housing structure 4124. For example, in proportion to the distance between at least the second housing structure 4124 and the first housing structure 4120, a partial area of the display module 4160 may be embedded in the first housing structure 4120, and another partial area may be drawn out from the first housing structure 4120. For example, when the distance between the first housing structure 4120 and the second housing structure 4124 is a first distance w1, the first area 4101, the third area 4103, and the fourth area 4189 of the display module 4160 may be drawn out from the first housing structure 4120 to form substantially the same plane. The second area 4102 of the display module 4160 may be embedded in the first housing structure 4120 and may be curved. For example, when the distance between the first housing structure 4120 and the second housing structure 4124 is a second distance w2, the first area 4101, the second area 4102, the third area 4103, and the fourth area 4189 of the display module 4160 may be drawn out from the first housing structure 4120 to form substantially the same plane. Further, for example, when the distance between the first housing structure 4120 and the second housing structure 4124 is the first distance w1, the third area 4103 and the fourth area 4189 of the display module 4160 may form an edge area of the first area 4101.

According to an embodiment, referring to FIG. 41, when the distance between the first housing structure 4120 and the second housing structure 4124 is the first distance w1, the electronic device 4100 (e.g., the processor 120 of FIG. 1) may deactivate the second area 4102 of the display module 4160. For example, the specific area of the display module 4160 activated or deactivated according to the distance between the first housing structure 4120 and the second housing structure 4124 may be described similarly to the description of activation or deactivation of the specific area of the display module 160 of FIG. 19.

According to an embodiment, referring to FIG. 41, when the distance between the first housing structure 4120 and the second housing structure 4124 is the first distance w1, the electronic device 4100 (e.g., the processor 120 of FIG. 1) may display the first execution screen 4131 of the first application in the first area 4101 of the display module 4160. For example, the operation of displaying the first execution screen 4131 of the first application in the first area 4101 of the display module 4160 may be described similarly to operation 401 of FIG. 4.

According to an embodiment, referring to FIG. 41, while the distance between the first housing structure 4120 and the second housing structure 4124 is the first distance w1, the electronic device 4100 (e.g., the processor 120 of FIG. 1) may detect a touch drag input (e.g., 4123a) to the third area 4103 of the display module 4160 from the object (e.g., the first object 4111) included in the first execution screen 4131 of the first application. For example, the operation of detecting the touch drag input (e.g., 4123a) to the third area 4103 of the display module 4160 from the object (e.g., the first object 4111) included in the first execution screen 4131 of the first application may be described similarly to operation 403 of FIG. 4.

According to an embodiment, referring to FIG. 41, the electronic device 4100 (e.g., the processor 120 of FIG. 1) may display the second execution screen 4132 of the second application different from the first application, obtained using at least a portion of the object (e.g., the first object 4111) on the display module 4160, based on a change (e.g., rolling) from the state in which the distance between the first housing structure 4120 and the second housing structure 4124 is the first distance w1 to the state in which the distance between the first housing structure 4120 and the second housing structure 4124 is the second distance w2. For example, the operation of displaying the second execution screen 4132 of the second application different from the first application on the display module 4160 may be described similarly to operation 405 of FIG. 4.

According to an embodiment, the electronic device 4100 disclosed in FIG. 41 may be operated similarly to the electronic device 101 of FIG. 2.

For example, according to an embodiment, referring to FIG. 41, the electronic device 4100 (e.g., the processor 120 of FIG. 1) may perform the operation of displaying a list including the icon corresponding to the object 4111 in the third area 4103 of the display module 4160. For example, the displaying operation by the electronic device 4100 may be described similarly to operation 705 of FIG. 7.

Further, for example, according to an embodiment, referring to FIG. 41, the electronic device 4100 (e.g., the processor 120 of FIG. 1) may perform the operation of controlling not to display the list based on maintaining the state in which the distance between the first housing structure 4120 and the second housing structure 4124 is the first distance w1 during a preset time. For example, the controlling operation by the electronic device 4100 may be described similarly to operation 907 of FIG. 9.

Further, for example, according to an embodiment, referring to FIG. 41, the electronic device 4100 (e.g., the processor 120 of FIG. 1) may perform the operation of displaying the first execution screen (e.g., the first execution screen 4131) of the first application in the first area 4101 of the display module 4160 based on a change from state in which the distance between the first housing structure 4120 and the second housing structure 4124 is the second distance w2 to the state in which the distance between the first housing structure 4120 and the second housing structure 4124 is the first distance w1 after displaying the second execution screen (e.g., the second execution screen 4132). For example, the displaying operation by the electronic device 4100 may be described similarly to operation 1107 of FIG. 11.

Further, for example, according to an embodiment, referring to FIG. 41, the electronic device 4100 (e.g., the processor 120 of FIG. 1) may perform the operation of displaying the third execution screen of the third application different from the first application in the first area 4101 of the display module 4160 based on a change from state in which the distance between the first housing structure 4120 and the second housing structure 4124 is the second distance w2 to the state in which the distance between the first housing structure 4120 and the second housing structure 4124 is the first distance w1 after displaying the second execution screen (e.g., the second execution screen 4132). For example, the displaying operation by the electronic device 4100 may be described similarly to operation 1307 of FIG. 13.

Further, for example, according to an embodiment, referring to FIG. 41, the electronic device 4100 (e.g., the processor 120 of FIG. 1) may perform the operation of determining the second application providing the second execution screen (e.g., the second execution screen 4132) based on the direction or end point of the touch drag input 4123a. For example, the determining operation by the electronic device 4100 may be described similarly to operation 1505 of FIG. 15 or operation 1605 of FIG. 16.

Further, for example, according to an embodiment, referring to FIG. 41, the electronic device 4100 (e.g., the processor 120 of FIG. 1) may perform the operation of detecting a touch drag input (e.g., the touch drag input 4123b) to the edge area of the first area 4001 or a touch drag input (e.g., the touch drag input 4123a) to the third area 4103 of the display module 4160. For example, the detecting operation by the electronic device 4100 may be described similarly to the embodiment of FIG. 22.

Further, for example, according to an embodiment, referring to FIG. 41, the electronic device 4100 (e.g., the processor 120 of FIG. 1) may perform the operation of determining the layout of the execution screen based on the number of identified objects. For example, the determining operation by the electronic device 4100 may be described similarly to operation 2503 of FIG. 25.

Further, for example, according to an embodiment, referring to FIG. 41, the electronic device 4100 (e.g., the processor 120 of FIG. 1) may perform the operation of displaying the application execution screen obtained using at least a portion of the merged object of two or more objects or displaying a plurality of sub screens respectively corresponding to two or more objects, in response to a user input.

For example, the displaying operation by the electronic device 4100 may be described similarly to operation 2703 of FIG. 27.

Further, for example, according to an embodiment, referring to FIG. 41, the electronic device 4100 (e.g., the processor 120 of FIG. 1) may perform the operation of displaying a suggestion option including a download link to a specific application for executing the identified object or selectable application, based on the attribute type of the identified object. For example, the displaying operation by the electronic device 4100 may be described similarly to operation 3003 of FIG. 30 or operation 3103 of FIG. 31.

Further, for example, according to an embodiment, referring to FIG. 41, the electronic device 4100 (e.g., the processor 120 of FIG. 1) may perform the operation of displaying a list including an icon based on an invoke command. For example, the displaying operation by the electronic device 4100 may be described similarly to operation 3301 of FIG. 33.

Further, for example, according to an embodiment, referring to FIG. 41, the electronic device 4100 (e.g., the processor 120 of FIG. 1) may perform the operation of displaying the application execution screen obtained using at least a portion of the object based on the attribute type of the object corresponding to the identified icon and the state of the hinge structure 3830. For example, the displaying operation by the electronic device 4100 may be described similarly to operation 3605 of FIG. 36.

According to various embodiments, an electronic device (e.g., the electronic device 101) may comprise a foldable housing (e.g., the foldable housing 200) including at least one hinge structure (e.g., the first hinge structure 304 or second hinge structure 305 of FIG. 3A), a flexible display module (e.g., the display module 160) having at least a partial area exposed through the foldable housing, and at least one processor (e.g., the processor 120) provided in the foldable housing. The display module may include a plurality of areas (e.g., the first area 201, the second area 202, or the third area 203) and at least one foldable area (e.g., the first foldable area 204 or second foldable area 205) disposed between at least the plurality of areas corresponding to the at least one hinge structure to be foldable according to a state of the at least one hinge structure. The at least one processor may be configured to, when a state of the at least one hinge structure is a first state, display a first execution screen of a first application on the display module, in the first state, a first foldable area (e.g., the first foldable area 204) among the at least one foldable area being in a folded state, while the first foldable area among the at least one foldable area is in the folded state, detect a touch drag input to the first foldable area from an object included in the first execution screen, and display, on the display module, a second execution screen of a second application different from the first application, obtained using at least a portion of the object, based on a change in the state of the at least one hinge structure from the first state to a second state after detecting the touch drag input.

According to various embodiments, the first execution screen may be displayed in an area adjacent to the first foldable area, and the second execution screen may be displayed in areas adjacent to two opposite sides of the foldable area not folded while the state of the at least one hinge structure is the second state and the non-folded foldable area. The foldable area not folded while being in the second state may be the first foldable area or another foldable area (e.g., the second foldable area 205).

According to various embodiments, the at least one processor may be configured to display, in the first foldable area in the folded state, a list including an icon corresponding to the object, based on detecting the folded state of the first foldable area and detecting the touch drag input to the first foldable area from the object.

According to various embodiments, the at least one processor may be configured to control not to display the list displayed in the first foldable area based on maintaining the state of the hinge structure as the first state during a preset time after detecting the touch drag input.

According to various embodiments, the at least one processor may be configured to display the first execution screen of the first application on the display module based on a change in the state of the at least one hinge structure from the second state to the first state after displaying the second execution screen.

According to various embodiments, the at least one processor may be configured to display, on the display module, a third execution screen of a third application different from the first application, obtained using at least a portion of the object, based on a change in the state of the at least one hinge structure from the second state to the first state after displaying the second execution screen.

According to various embodiments, the at least one processor may be configured to determine the second application providing the second execution screen based on an attribute of the touch drag input.

According to various embodiments, the at least one processor may be configured to determine the second application providing the second execution screen based on an end point of the touch drag input.

According to various embodiments, an electronic device (e.g., the electronic device 101) may comprise a foldable housing (e.g., the foldable housing 200) including at least one hinge structure (e.g., the first hinge structure 304 or second hinge structure 305 of FIG. 3A), a flexible display module (e.g., the display module 160) having at least a partial area exposed through the foldable housing, and at least one processor (e.g., the processor 120) provided in the foldable housing.

According to various embodiments, the display module may include a plurality of areas (e.g., the first area 201, the second area 202, or the third area 203) and at least one foldable area (e.g., the first foldable area 204 or second foldable area 205) disposed between at least the plurality of areas corresponding to the at least one hinge structure to be foldable according to a state of the at least one hinge structure.

According to various embodiments, the at least one processor may be configured to, when a state of the at least one hinge structure is a first state, display a first execution screen of a first application on the display module, in the first state, a first foldable area (e.g., the first foldable area 204) among the at least one foldable area being in a folded state, identify at least one object included in the first execution screen in response to a first user input, display a second execution screen of a second application obtained using at least a portion of the identified at least one object, in at least one area set corresponding to a second state, based on a change in the state of the at least one hinge structure from the first state to the second state, and display a third execution screen of a third application different from the second application, obtained using at least a portion of the identified at least one object, in at least one area set corresponding to a third state based on a change in the state of the at least one hinge structure from the first state to the third state.

According to various embodiments, the first user input may be a touch drag input to the first foldable area adjacent to a first area where the first execution screen from the at least one object is displayed or a touch drag input to an edge area of the first area from the at least one object.

According to various embodiments, the at least one processor may be configured to display the third execution screen of the third application different from the second application, obtained using at least a portion of the identified at least one object, in the at least one area set corresponding to the third state, based on a change in the state of the at least one hinge structure from the second state to the third state after displaying the second execution screen.

According to various embodiments, the at least one processor may be configured to recognize at least one additional object other than the at least one object from an execution screen of an application other than the first application or the first execution screen of the first application. The second execution screen or the third execution screen may be obtained using at least a portion of the at least one additional object and the at least one object.

According to various embodiments, the at least one processor may be configured to determine a layout of the second execution screen or the third execution screen based on a number of the identified at least one object.

According to various embodiments, the at least one processor may be configured to, when the identified at least one object is two or more objects, in response to a second user input, display an execution screen of an application obtained using at least a portion of a merged object of the two or more objects, or display a plurality of sub screens respectively corresponding to the two or more objects. The plurality of sub screens may be generated by one application or by different applications, respectively.

According to various embodiments, the at least one processor may be configured to display suggestion options including selectable applications based on an attribute type of the identified at least one object, identify a specific application among the selectable applications included in the suggestion option in response to a third user input, and display an execution screen of the specific application obtained using at least a portion of the identified at least one object, as the second execution screen or the third execution screen, based on identifying the specific application among suggestion options.

According to various embodiments, the at least one processor may be configured to, when an application for executing the identified at least one object may not be executed by the electronic device, display a suggestion option including a download link of at least one application for executing the identified at least one object based on the attribute type of the identified at least one object, download a specific application among at least one application for executing the identified at least one object included in the suggestion option in response to a fourth user input, and display the execution screen of the specific application obtained using at least a portion of the identified at least one object, as the second execution screen or the third execution screen.

According to various embodiments, the at least one processor may be further configured to display a list including at least one icon based on an invoke command and display the execution screen of the specific application corresponding to a first icon based on selection of the first icon included in the list.

According to various embodiments, the first icon may include a temporarily stored object corresponding to the first icon and an icon of a specific application set corresponding to the temporarily stored object.

According to various embodiments, an electronic device (e.g., the electronic device 4100) may include a housing (e.g., the housing 4140), a rollable display module (e.g., the display module 4160) that may be drawn out from the housing, and at least one processor (e.g., the processor 120) provided in the housing.

According to various embodiments, the at least one processor may be configured to display, on the display module, a first execution screen of a first application in a state in which a first area (e.g., the first area 4101) of the display module is drawn out from the housing to be exposed to an outside, detect a touch drag input to an edge area (e.g., the edge area 4130) of the first area from an object included in the first execution screen, and display, on the display module, a second execution screen of a second application different from the first application obtained using at least a portion of the object based on a second area (e.g., the second area 4102) of the display module being drawn out from the housing to be exposed to the outside after detecting the touch drag input.

According to various embodiments, the at least one processor may be configured to display, on the display module, the second execution screen of the second application different from the first application obtained using at least a portion of the object based on the second area of the display module being drawing out from the housing to be exposed to the outside within a preset time after detecting the touch drag input.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
    a foldable housing including at least one hinge structure, the hinge structure comprising at least one hinge;
    a flexible display module comprising at least one display, at least a partial area of the flexible display module configured to be viewable through the foldable housing, the display module including a plurality of areas and at least one foldable area disposed between at least the plurality of areas corresponding to the at least one hinge structure to be foldable according to a state of the at least one hinge structure;
    at least one processor; and
    memory storing instructions that, when executed by the at least one processor, cause the electronic device to:
    display a first execution screen of a first application on the display module when a state of the at least one hinge structure is a first state, in the first state a first foldable area among the at least one foldable area being in a folded state;
    detect a touch drag input to the first foldable area from an object included in the first execution screen when the first foldable area among the at least one foldable area is in the folded state; and
    display, on the display module when the first foldable area among the at least one foldable area is in an unfolded state, a second execution screen of a second application different from the first application, obtained using at least a portion of the object included in the first execution screen, based on a change in the state of the at least one hinge structure from the first state to a second state after detection of the touch drag input.

2. The electronic device of claim 1, wherein the instructions, when executed by the at least one processor, cause the electronic device to:
    display the first execution screen in an area adjacent to the first foldable area, and the second execution screen is displayed in areas adjacent to two opposite sides of the foldable area not folded while the state of the at least one hinge structure is the second state and the non-folded foldable area, and
    wherein the foldable area not folded while being in the second state is the first foldable area and/or another foldable area.

3. The electronic device of claim 1, wherein the instructions, when executed by the at least one processor, cause the electronic device to display, in the first foldable area, a list including an icon corresponding to the object, based on detecting the folded state of the first foldable area and detecting the touch drag input to the first foldable area from the object.

4. The electronic device of claim 3, wherein the instructions, when executed by the at least one processor, cause the electronic device processor is configured to control not to display the list displayed in the first foldable area based on maintaining the state of the hinge structure as the first state during a preset time after detecting the touch drag input.

5. The electronic device of claim 1, wherein the instructions, when executed by the at least one processor, cause the electronic device to display the first execution screen of the first application on the display module based on a change in the state of the at least one hinge structure from the second state to the first state after displaying the second execution screen.

6. The electronic device of claim 1, wherein the instructions, when executed by the at least one processor, cause the electronic device to display, on the display module, a third execution screen of a third application different from the first application, obtained using at least a portion of the object, based on a change in the state of the at least one hinge structure from the second state to the first state after displaying the second execution screen.

7. The electronic device of claim 1, wherein the instructions, when executed by the at least one processor, cause the electronic device to determine the second application providing the second execution screen based on an attribute of the touch drag input.

8. The electronic device of claim 7, wherein the wherein the instructions, when executed by the at least one processor, cause the electronic device to determine the second application providing the second execution screen based on an end point of the touch drag input.

9. An electronic device, comprising:
a foldable housing including at least one hinge structure, the hinge structure comprising at least one hinge;
a flexible display module comprising at least one display, at least a partial area of the flexible display module configured to be viewable through the foldable housing, the display module including a plurality of areas and at least one foldable area disposed between at least the plurality of areas corresponding to the at least one hinge structure to be foldable according to a state of the at least one hinge structure; and
at least one processor configured to:
display a first execution screen of a first application on the display module when a state of the at least one hinge structure is a first state, in the first state, a first foldable area among the at least one foldable area being in a folded state;
identify at least one object included in the first execution screen in response to a first user input in the first state;
display a second execution screen of a second application obtained using at least a portion of the identified at least one object, in at least one area set corresponding to a second state, based on a change in the state of the at least one hinge structure from the first state to the second state after identifying the at least one object included in the first execution screen in response to the first user input; and
display a third execution screen of a third application different from the second application, obtained using at least a portion of the identified at least one object, in at least one area set corresponding to a third state, based on a change in the state of the at least one hinge structure from the first state to the third state after identifying the at least one object included in the first execution screen in response to the first user input.

10. The electronic device of claim 9, wherein the at least one processor is configured to display the third execution screen of the third application different from the second application, obtained using at least a portion of the identified at least one object, in the at least one area set corresponding to the third state, based on a change in the state of the at least one hinge structure from the second state to the third state after displaying the second execution screen.

11. The electronic device of claim 9, wherein the at least one processor is configured to recognize at least one additional object other than the at least one object from an execution screen of an application other than the first application and/or the first execution screen of the first application, wherein the second execution screen and/or the third execution screen is obtained using at least a portion of the at least one additional object and the at least one object.

12. The electronic device of claim 9, wherein the at least one processor is configured to determine a layout of the second execution screen and/or the third execution screen based on a number of the identified at least one object.

13. The electronic device of claim 9, wherein the at least one processor is configured to, when the identified at least one object is two or more objects, in response to a second user input, display an execution screen of an application obtained using at least a portion of a merged object of the two or more objects, and/or display a plurality of sub screens respectively corresponding to the two or more objects, and wherein the plurality of sub screens are generated by one application or by different applications, respectively.

14. The electronic device of claim 9, wherein the at least one processor is further configured to:
display a list including at least one icon based on an invoke command; and
display an execution screen of a specific application corresponding to a first icon based on selection of the first icon included in the list.

15. The electronic device of claim 14, wherein the first icon includes a temporarily stored object corresponding to the first icon and an icon of a specific application set corresponding to the temporarily stored object.

16. A method performed by an electronic device comprising a foldable housing including at least one hinge structure, the hinge structure comprising at least one hinge and a flexible display, at least a partial area of the flexible display configured to be viewable through the foldable housing, the flexible display including a plurality of areas and at least one foldable area disposed between at least the plurality of areas corresponding to the at least one hinge structure to be foldable according to a state of the at least one hinge structure, the method comprising:
displaying a first execution screen of a first application on the flexible display when a state of the at least one hinge structure is a first state, in the first state a first foldable area among the at least one foldable area being in a folded state;
detecting a touch drag input to the first foldable area from an object included in the first execution screen when the first foldable area among the at least one foldable area is in the folded state; and
displaying, on the flexible display when the first foldable area among the at least one foldable area is in an unfolded state, a second execution screen of a second application different from the first application, obtained using at least a portion of the object included in the first execution screen, based on a change in the state of the at least one hinge structure from the first state to a second state after detection of the touch drag input.

17. The method of claim 16, wherein the first execution screen is displayed in an area adjacent to the first foldable area, and the second execution screen is displayed in areas adjacent to two opposite sides of the foldable area not folded while the state of the at least one hinge structure is the second state and the non-folded foldable area, and wherein the foldable area not folded while being in the second state is the first foldable area and/or another foldable area.

* * * * *